United States Patent
Nozaki et al.

(10) Patent No.: US 6,642,949 B2
(45) Date of Patent: *Nov. 4, 2003

(54) IMAGE FORMING WITH SYNCHRONIZED CONTROL

(75) Inventors: Tetsuya Nozaki, Numazu (JP); Shinobu Arimoto, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/427,557

(22) Filed: Oct. 27, 1999

(65) Prior Publication Data

US 2002/0063771 A1 May 30, 2002

(30) Foreign Application Priority Data

Oct. 27, 1998 (JP) ............................................ 10-305287
Oct. 27, 1998 (JP) ............................................ 10-305954

(51) Int. Cl.[7] .............................. B41J 2/435; B41J 2/47
(52) U.S. Cl. ........................ 347/235; 347/234; 347/248; 347/250
(58) Field of Search ................................. 347/116, 247, 347/248, 249, 250, 261, 234, 237; 358/296, 497; 399/76, 144, 151

(56) References Cited

U.S. PATENT DOCUMENTS 5,673,115 A  9/1997  Arimoto ..................... 358/296
6,049,351 A * 4/2000  Noguchi et al. ............ 347/249

* cited by examiner

Primary Examiner—Hai Pham
(74) Attorney, Agent, or Firm—Fitzpatrick, Cella, Harper & Scinto

(57) ABSTRACT

Forming an image by utilizing a scanning device for scanning a color image for each color element, a reading device for reading image data for each scanned line, a rotary polygon mirror for deflecting, in a main scan direction, a modulated light beam that is based on the image data for each read line, so that an image holding member that is rotated in a sub-scan direction is scanned by the deflected light beam and a latent image is formed thereon, a first generation device for determining whether the light beam deflected by the rotary polygon mirror has scanned a predetermined location, and for generating a main scan start reference signal, and a second generation device for generating a sub-scan start reference signal in synchronization with the rotation of the image holding member, a first control device that controls the rotary polygon mirror and the rotary image holding member, so as to maintain a phase difference between the sub-scan start reference signal and the main scan start reference signal, no matter how many times the rotary image holding member is rotated, a second control device, in synchronization with the sub-scan start reference signal, which starts to drive the scanning device, a third control device, in synchronization with the main scan start reference signal, starts the reading of an original document by the reading device, and a fourth control device, in synchronization with the main scan start reference signal, starts to use the light beam to form a latent image.

10 Claims, 42 Drawing Sheets

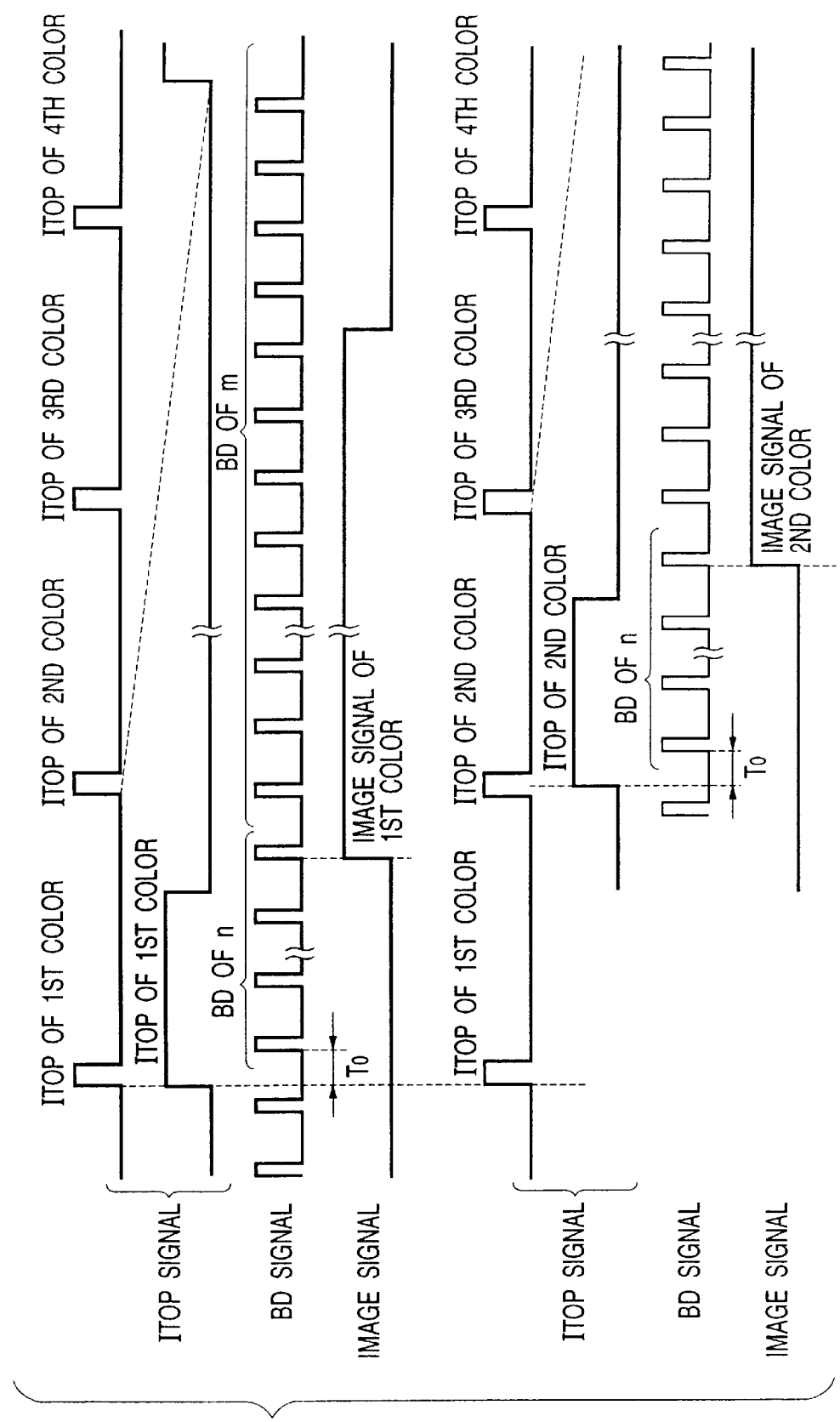

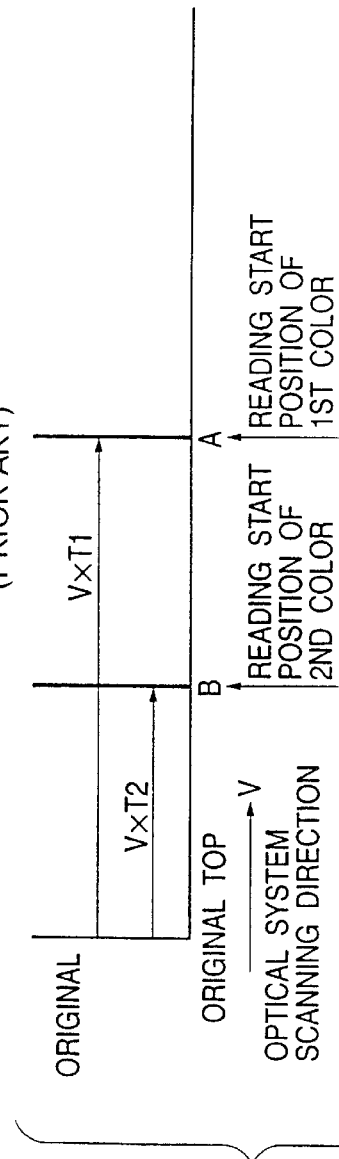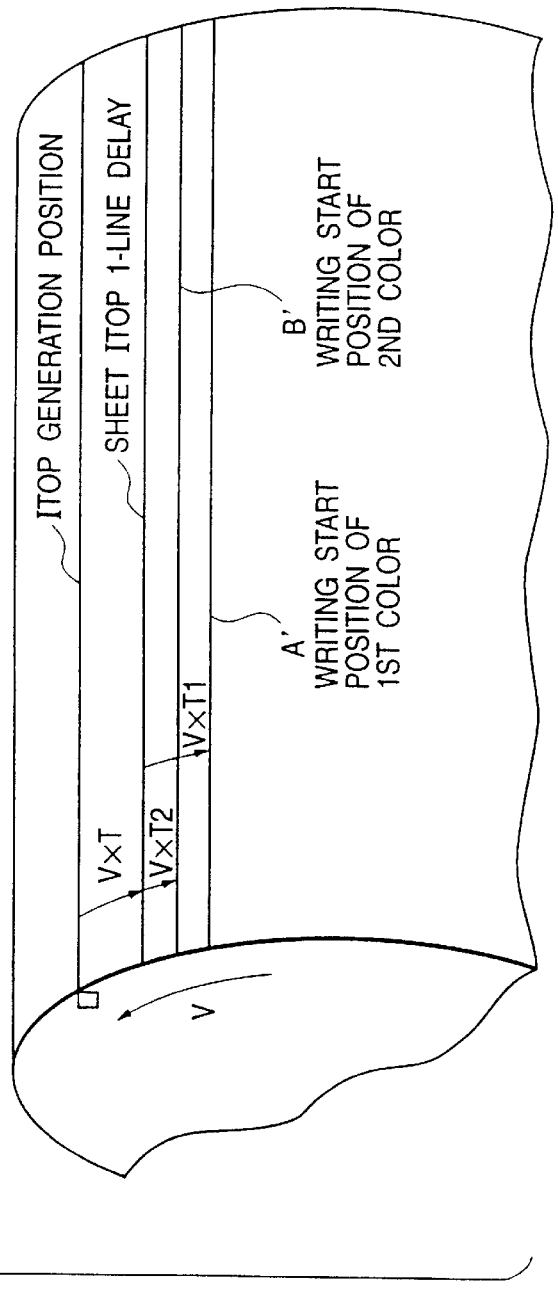
FIG. 15 (PRIOR ART)

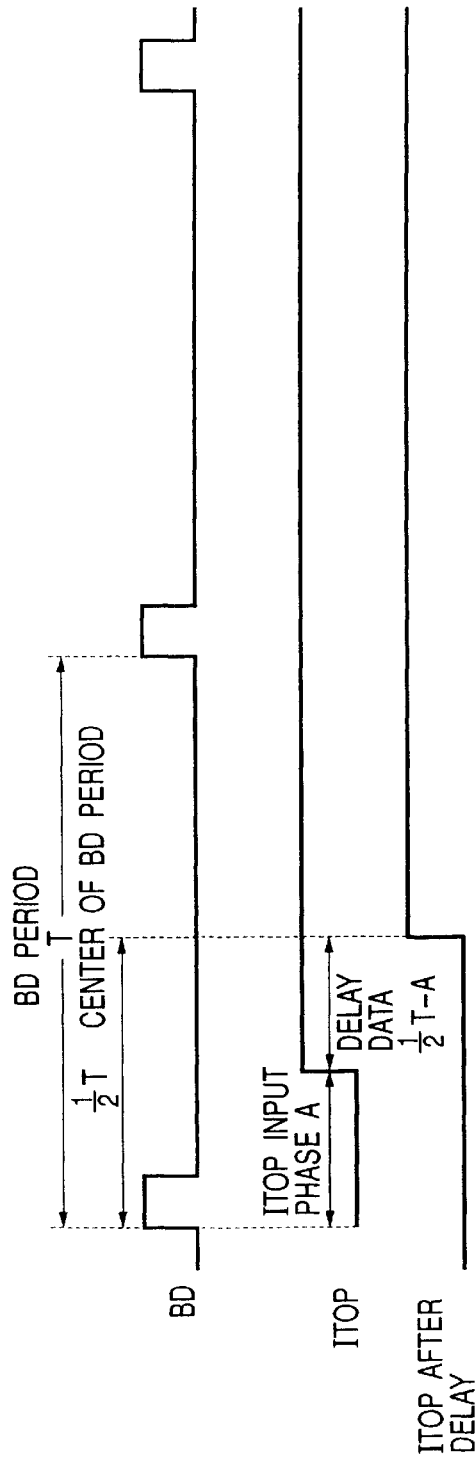
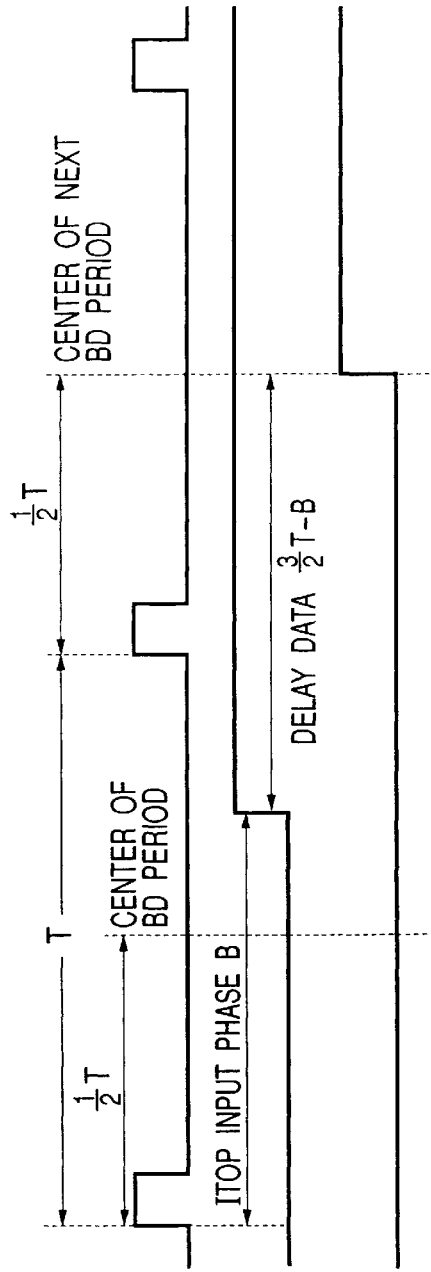
FIG. 24A
FIG. 24B

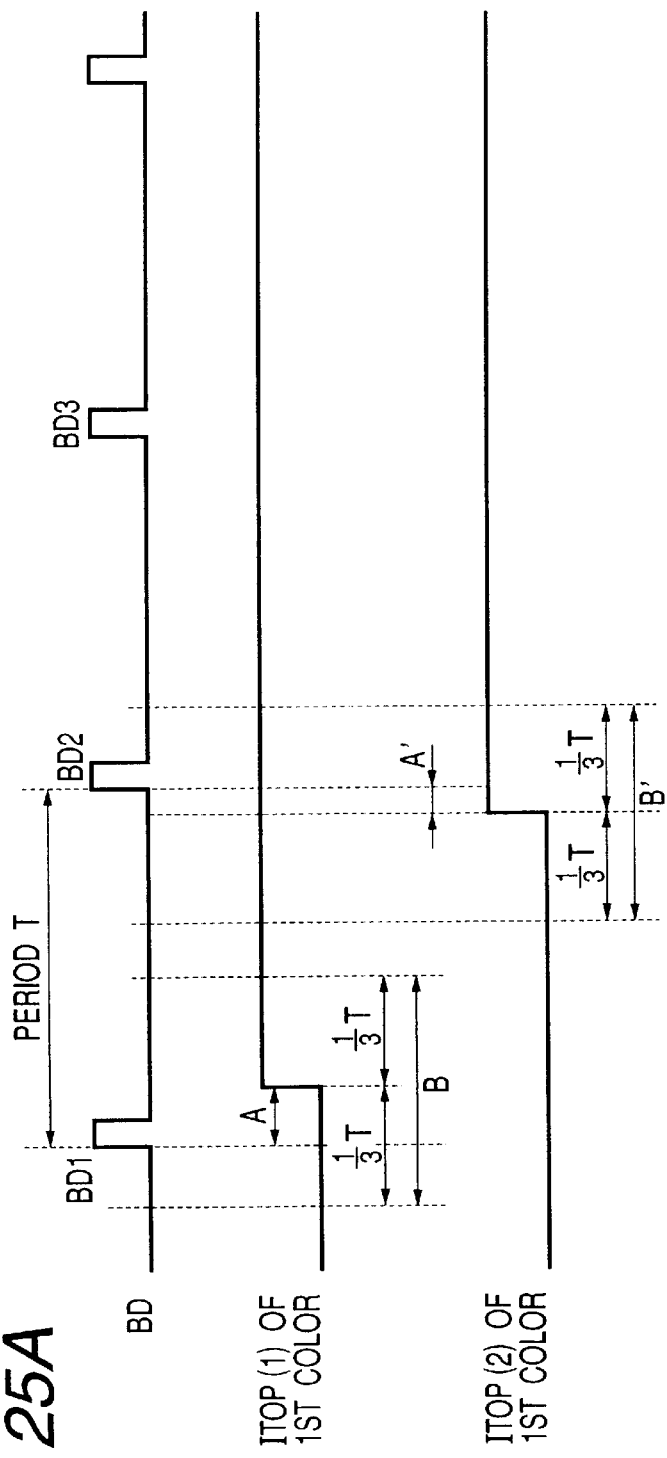
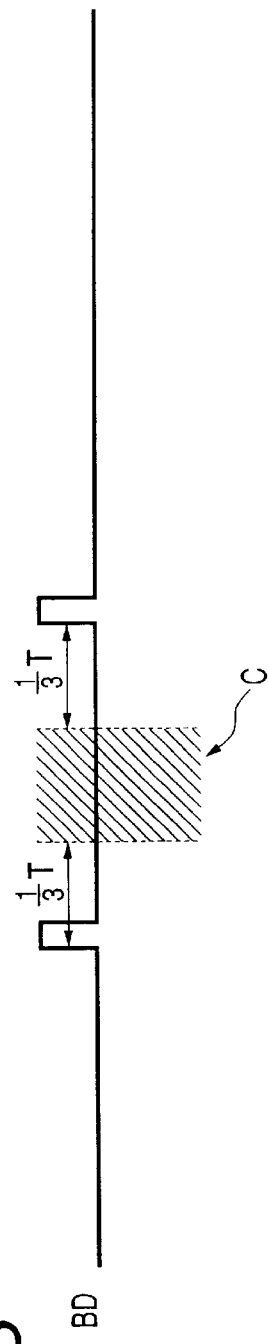
FIG. 25A
FIG. 25B

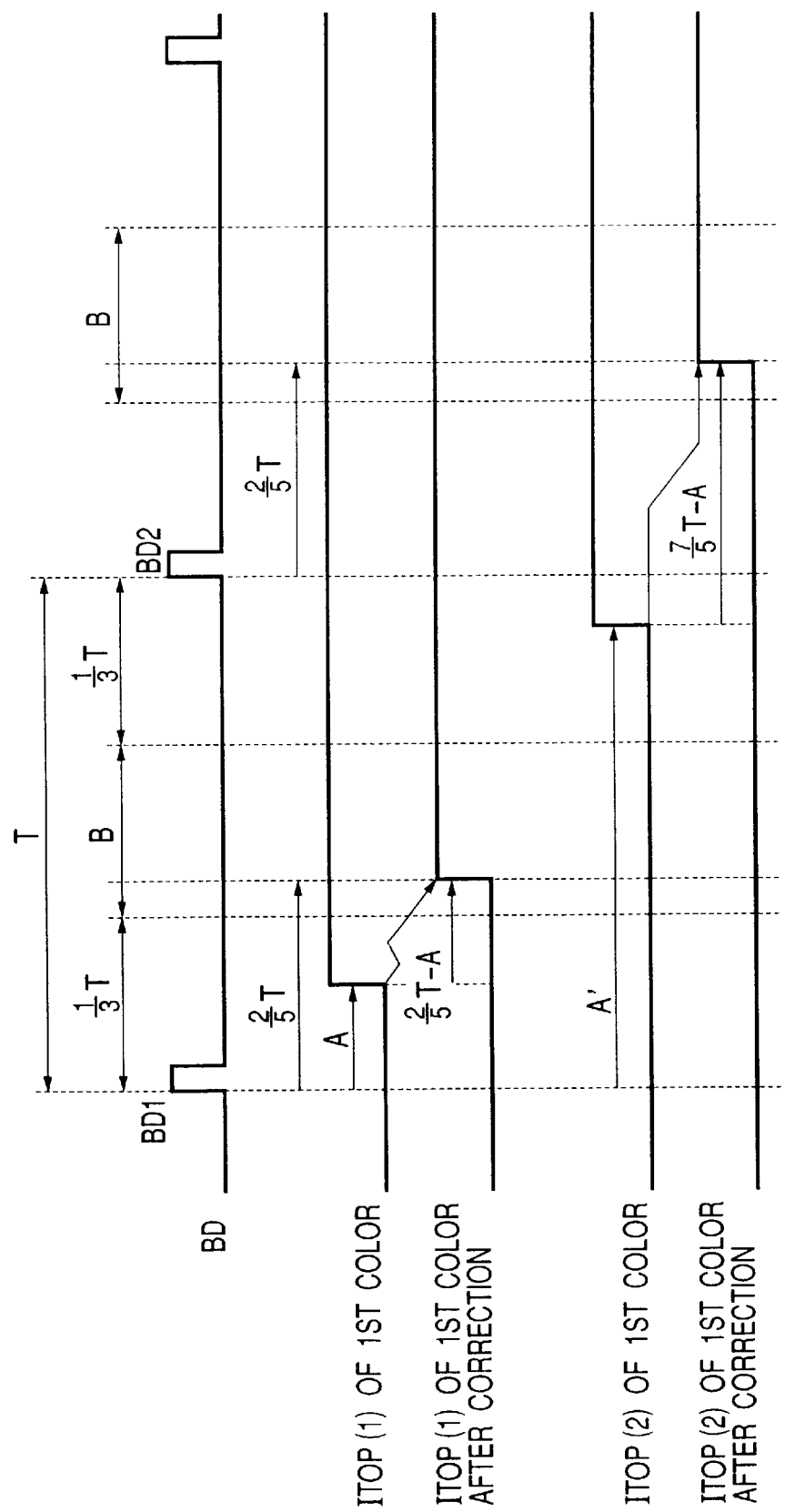

IMAGE FORMING WITH SYNCHRONIZED CONTROL

BACKGROUND OF THE INVENTION

1. Field of the Invention

The present invention relates to an image forming apparatus and method for forming a color image on a recording medium using recording agents of a plurality of colors.

2. Related Background Art

A laser beam printer (LBP) is a well known example of present-day conventional image forming apparatuses that use color image data for printing. When one type of laser beam printer is used to print a color image, for each of the colors that are to be printed a main scan means employs a laser beam, which uses a rotary polyhedron mirror, to expose a photosensitive member and to form on the member a latent image composed of a series of scan lines for a specific individual color. Then, again for each of the colors, the latent image is developed by using either a magenta (M), a cyan (C), a yellow (Y) or a black (BK) color developer to form an individually colored image that, subsequently, is transferred to a recording sheet, securely held on a transfer drum, on which all the individually colored images are superimposed, one on the other. Another type of color image apparatus temporarily transfers images for individual colors from a photosensitive member to an intermediate transfer member, superimposing the images thereon, and collectively transfers the color images from the intermediate transfer member to a recording sheet.

For these apparatuses, the photosensitive member and the transfer drum, and the intermediate member, if used, are moved at a constant speed in the direction (the sub-scan direction) perpendicular to the main scan direction, while an optical system scans an original document at the same speed.

When, at each revolution, the photosensitive drum, the transfer drum or the intermediate drum generates a sub-scan start reference signal, in synchronization with this signal, the optical system initiates the scanning of an original document, and a CCD (charge-coupled device) begins to read line data. Similarly, in synchronization with the sub-scan start reference signal, data for each color are recorded on a recording sheet held on the transfer drum, or on the intermediate member. In this manner, the timing for the data reading and for the data writing are synchronized.

For the additional image forming apparatus that transfers individually colored images to a photosensitive drum, superimposing them thereon, and collectively transfers the resultant image to a recording sheet, to prevent deterioration of the quality of a color image, which occurs when the positions are shifted at which images are read for the individual colors, a method that controls the position at which an image for each color is read is important.

According to a conventional reading position control method, rotation precision is increased for a polygon motor that generates, as a reference for main scan sync control, a main scan start reference signal (hereinafter referred to as a BD (beam detect) signal), and a drum motor that generates, as a reference for sub-scan sync control, a photosensitive drum rotation position signal (hereinafter referred to as a sub-scan start reference signal (an ITOP (image top) signal)). In addition, the drum motor and an optical motor that drives an original reader for scanning an original document are controlled at the same speed.

FIG. 12 is a diagram showing an example arrangement of a system for driving a polygon motor and a drum motor in a conventional image forming apparatus.

In FIG. 12, a photosensitive drum 1301 is rotated via a drive belt 1308 by a photosensitive drum drive motor 1307. A polygon motor 1302 rotates a polygon mirror 1303 that, for each line of a document, scans, the face of the photosensitive drum 1301 with a beam emitted by a laser 1304 and transmitted via a lens 1305.

A PLL (phase-locked loop) circuit 1310 drives the polygon motor 1302 at a constant speed based on a reference clock received from an oscillator 1311, and a PLL circuit 1309 drives the photosensitive drum drive motor 1307 at a constant speed based on a reference clock received from an oscillator 1312. The rotations of the polygon motor 1302 and of the photosensitive drum drive motor 1301 are matched in consonance with the precision of the frequencies generated by the oscillators 1311 and 1312.

With this arrangement, since the photosensitive drum 1301 and the polygon motor rotate at a controlled, constant speed, the ITOP signal, which is synchronized with the rotation of the photosensitive drum 1301, and the BD signal, which is synchronized with the rotation of the polygon motor 1302, are produced at predetermined frequencies.

Therefore, the conventional image forming apparatus employs the ITOP signal to control the original document scan start timing for the optical system, and the line data reading start timing and the image writing timing for a three-line sensor (hereinafter referred to as CCD), so that the reading positions for individual colors correspond. It should be noted that the CCD includes a light accumulation unit for acquiring, as data, light reflected from an original document that is being scanned, and a transfer unit for outputting, as writing data, the data that are acquired by the light accumulation unit.

An explanation will now be given, while referring to FIGS. 13 to 16A and 16B, for an example original document reading method employed by the conventional image forming apparatus.

FIG. 13 is a timing chart for explaining the line data fetching process performed by the CCD of the conventional image forming apparatus.

In FIG. 13, a CCD light accumulation/transfer control signal (hereinafter referred to as a control signal) is synchronized with a BD signal. Light is accumulated (line data are fetched) for a predetermined time period during an interval in which the control signal is at level H, and then, the accumulated line data are transmitted to the transfer unit during an interval in which the control signal is at level L. During the next light accumulation period, line data are output as writing data by the transfer unit at a delay, relative to the line accumulation process, of one line (one BD cycle).

Specifically, the control signal is synchronized with the BD cycle to repeat the light accumulation process (a level H interval) and the data transmission process (a level L interval).

First, at interval (1), during which the control signal is at level H, the CCD accumulates data for an original document that is being currently scanned by the optical system, i.e., "reading data 1" in FIG. 13. Then, at interval (2), during which the control signal is at level L, the CCD transfers the data acquired at interval (1) to the transfer unit.

At interval (3), during which the control signal goes to H again, data are accumulated for the original document that is currently being scanned by the optical system, i.e., "reading data 2" in FIG. 13, and the "reading data 1", which were transmitted to the transfer unit, are output as "writing data 1". The same process is repeated at interval (4) and the following intervals, and in synchronization with the BD signal, each line of the original document is read and the writing data are output.

FIG. 14 is a timing chart for explaining the original document reading timing for the conventional image forming apparatus, in which is shown a BD signal, and ITOP signals, the read data and the write data for a first and a second color.

In FIG. 14, the BD signal, which is a main scan start reference signal, is generated at cycle T in synchronization with the rotation of a polygon motor. The ITOP signal, which is a drum rotation position signal, is generated at an arbitrary time during a BD signal cycle.

When the ITOP signal is changed from level H to level L, the optical system begins scanning, and the CCD initiates the fetching of line data, synchronized with the generation of the next BD signal. The scanning speed of the optical system and the rotation speed of the photosensitive drum are indicated by "V".

Now, the reading/writing operation for the first color will be described.

When time T1 has elapsed, following the input of the ITOP signal for the first color, a main scan start reference signal (BD signal) is generated and the reading of data for the first line is begun. At this time, the scanning position of the optical system relative to the original document is shown in FIG. 15, which will be described later, as position "A", i.e., position "V×T1", calculated from the leading edge of the original document.

The data read for the first line are output, as first line writing data, by the CCD following a one line delay (i.e., when a time "T1+T" has elapsed following the entry of the ITOP signal for the first color). At this time, the beam is projected onto the photosensitive drum at position "V×T1+V×T (a one line delay relative to a CCD read)", separated from the ITOP signal generation position. The first line writing data are recorded on the drum beginning at the first color writing start position "A'" in FIG. 15, which will be described later.

The reading/writing process for the second color will now be described.

When time T2 has elapsed following the input of the ITOP signal for the second color, a main scan start reference signal (BD signal) is generated, and the reading of data for the first line is begun. At this time, the scanning position of the optical system on the original is position "B" in FIG. 15, i.e., position "V×T2" calculated from the leading edge of the original. The data read for the first line are output as first line writing data by the CCD following a one line delay (i.e., after the elapse of time "T2+T" following the entry of the ITOP signal for the second color). At this time, the beam is projected onto the photosensitive drum at position "V×T2+V×T (a one line delay relative to the CCD reading)", separated from the ITOP signal generation position. The first line writing data are recorded on the drum beginning at the second color writing start position "B1" in FIG. 15, which will be described later.

FIG. 15 is a specific diagram showing image reading positions and image writing positions for the conventional image forming apparatus.

As shown in FIG. 15, for the first color, data that are read beginning at point "A" on the original document are written beginning at point "A'" on the drum, and for the second color, data that are read beginning at point "B" of the original document are written beginning at point "B1" on the drum.

Assume that the left upper end of the original document is defined as an original document TOP, and position "V×T", separated from the ITOP signal generation position on the photosensitive drum, is defined as a sheet TOP. Then, the points "A" and "A'" and the points "B" and "B'" are identical as viewed from the original document TOP and the sheet TOP. Further, since in the following process the rotation speed of the photosensitive drum is the same as the scanning speed of the optical system, the original document that is read in the same manner is recorded on the photosensitive drum at a location that corresponds to the reading position.

It should be noted that the reading start time difference "T1−T2", between the first and the second colors, is only a shift of the write start position from the sheet TOP, i.e., only a difference corresponding to the margin, and a shift in the position of the complete image does not occur.

However, with the reading/writing technique of the conventional image forming apparatus, the MTF (modulation transfer function) for reading data for the individual colors is varied when the reading position on the original document differs for the first and the second colors (a detailed explanation of this will be given later while referring to FIGS. 16A and 16B).

Since the MTF for each color is changed, a defect occurs. For example, the reproduction of fine lines varies for each color, or the determination of edges, such as those of characters, is changed depending on the color.

FIGS. 16A and 16B are diagrams showing the relationship between the line reading position of the conventional image forming apparatus and data sampling. In FIG. 16A, the relationship between the original document reading timing and the original document reading position is shown, and in FIG. 16B, the relationship between the original document reading position and density data sampling values of the original document is shown.

In FIG. 16A, each pixel of the original document is divided into squares, and in each square the density data for a pixel is entered. Since actually, the color data to be read differs for the first and the second colors, basically, the density data for each pixel is different. However, for the sake of convenience, in this embodiment the pixel data for the first and the second colors are the same.

An explanation will now be given for the reading of the data for the first color.

As shown in FIG. 16A, the reading start timing for the first color begins after time T1 has elapsed following the generation of the ITOP signal. Actually, the reading of the original document begins at the point reached by a reader following the elapse of a time "V×T1", in which "V" is the speed of movement of the reader, i.e., the line for pixel C. At this time, the main scan start reference signal (BD signal), for reading the first color, is generated as shown in FIG. 16A, each line of the original is read, and the obtained line data are transmitted as print data to a printer.

An explanation will now be given for data read for the second color.

As shown in FIG. 16A, the reading start timing for the second color begins after time T2 has elapsed following the generation of the ITOP signal. Actually, the reading of the original document begins at the point reached by the reader following the elapse of a time "V×T2", in which "V" is the speed of movement of the reader, i.e., a position 0.5 line before the line for pixel C. At this time, the main scan start reference signal (BD signal) for reading the second color is generated as shown in FIG. 16A, each line of the original document is read, and the obtained line data are transmitted as print data to a printer.

Relative to the ITOP signal, the main scan start reference signal (a BD signal) for the second color is generated with a phase differing from that of the main scan start reference signal (a BD signal) for the first color.

In FIG. 16B, (b)-1 corresponds to a sampling value for image data read for the first color, and (b)-2 corresponds to a sampling value for image data read for the second color.

As shown in (b)-1, since for the first color the lines for pixels C and D in FIG. 16A have the same phase as the main scan start reference signal (a BD signal), data having the same density as that of the original document are read (sampled) at the same positions as are the data of the original document in FIG. 16A.

However, as shown in (b)-1, since for the second color the lines of pixels C and D in FIG. 16A are shifted 0.5 line away from the main scan start reference signal (a BD signal), one half of pixel C and one half of the preceding pixel are read as data for one pixel, the other half of pixel C and one half of pixel D are read as data for another pixel, and the other half of pixel D and one half of the succeeding pixel are read as data for one more pixel (sampling). The density data for the pixel obtained by reading (sampling) half of pixel C and half of the preceding pixel, or half of pixel D and half of the succeeding pixel, is "50," while the density data for the pixel obtained by reading (sampling) the halves of pixels C and D is "100".

It should be noted that the center density of the first color in (b)-1 is the same as that for the second color in (b)-2, and no color shifting occurs between the first and the second colors.

However, since the data "0", "100" and "100" are obtained for the first color in (b)-1, while the data "50", "100" and "50" are obtained for the second color in (b)-2, the resolution for the second color in (b)-2 is reduced.

This is because the phase at which the ITOP signal is generated relative to the BD signal differs for the first and the second colors and because the reading MTF is different. Therefore, a sharp image can be reproduced for the first color, while an ambiguous image is reproduced for the second color, so that the reproductivity varies depending on the color element.

In addition, the position determined for an edge may be changed, depending on the color.

For example, for the first color in (b)-1, the image data having a density 100 on the left side can be employed to determine an edge, while for the second color in (b)-2, the image data having a density 50 on the left side may also be employed to determine an edge.

As described above, for the conventional image forming apparatus, the image reproductivity differs depending on the color element, and the quality of an image may be degraded.

Also, as described above, a laser beam printer (LBP) is well known as a color image forming apparatus that uses color image data for printing. An LBP scans a photosensitive member by using a rotary polyhedron mirror (a polygon mirror) to reflect a laser beam; sequentially forms, on the photosensitive member, a latent image corresponding to one line of an image; and attaches one of several developers (toners), for example, magenta (M), cyan (C), yellow (Y) and black (BK), to a latent image composed of multiple lines (for one screen) to form a screen image for one color. To complete the printing of one color, a screen image for the color on the photosensitive member is transferred to a recording sheet that is securely held on a transfer drum. Then, the printing process is repeated for the remaining three colors, so that a color image expressed in four colors can be printed.

Another image forming apparatus is one whereby screen images for four individual colors formed on the photosensitive member are temporarily superimposed on an intermediate transfer member, following which the color images on the intermediate transfer member are collectively transferred to a recording sheet.

These apparatuses sequentially superimpose a plurality of screen images, while driving the components in the sub-scan direction. Specifically, the photosensitive member, the transfer member and the intermediate transfer member are driven at a constant speed in the direction (the sub-scan direction) perpendicular to the main scan direction. And the screen images are transferred from the photosensitive member to the transfer member, or the intermediate transfer member, whereon they are superimposed, in synchronization with a sub-scan start signal that is generated upon each rotation of the transfer member or the intermediate transfer member. In this manner, the position shifting of the screen images can be reduced.

As another color image forming technique, instead of latent color images being transferred individually, as they are formed on the photosensitive member, the images are superimposed, one on the other, so that a screen image composed of four colors is formed on the photosensitive member. Then, at the following stage, the superimposed color images on the photosensitive member are collectively transferred to the transfer member (sheet).

For the various color image forming techniques mentioned above, to provide as a final product a printed color image having a satisfactory quality, it is preferable, during the repetitive reading of an image performed for each color, that screen images for individual colors be read and superimposed with as little position shifting as possible.

In order to reduce the position shifting when screen images for individual colors are read, a specific method is conventionally employed. According to this method, rotational precision is increased for a scanner motor, which drives a rotary polyhedron mirror (a polygon mirror), for reflecting a laser beam to scan the photosensitive member, and which generates the main scan start signal (a BD signal), a reference for main scan sync control; and a drum motor, which drives a photosensitive drum and which generates a sub-scan start signal (an ITOP signal), a reference for sub-scan sync control. Further, the drum motor and an optical motor, which drives a line sensor in a document reader for reading an original color document, are controlled at the same speed.

FIG. 31 is a diagram showing the arrangement of a system in a conventional color image forming apparatus for driving a scanner motor and a drum motor.

In FIG. 31, a photosensitive drum 2105 is rotated by a drive motor 2115 via a drive belt 2116. A transfer drum 2108 rotates in contact with the photosensitive drum 2105, its rotary movement coupled with that of the photosensitive drum 2105. A transfer sheet 2109 is attached to the transfer drum 2108 at a predetermined position, and a toner latent image formed on the photosensitive drum 2105 is transferred to the transfer sheet 2109. An ITOP sensor 2110 shielded by a flag 2111 generates an ITOP signal that is synchronized with the rotational location of the transfer drum 2108, i.e., of the photosensitive drum 2105.

A PLL circuit 2114 rotates a scanner motor 2106 at a constant speed, based on a reference clock that is provided when a frequency division circuit 2113 divides a clock output by an oscillator 2112. The scanner motor 2106 drives a polygon mirror 2103, and for each line scans the face of the photosensitive drum 2105 by projecting a laser beam from a laser 2102 via a lens 2104.

A frequency division circuit 2119 divides a clock output by the oscillator 2112, and the obtained clock is employed as a reference clock for a PLL circuit 2118, which drives, at a constant speed, the drive motor 2115 that rotates the photosensitive drum 2105. In this manner, the rotation of the scanner motor 2106 is matched with the rotation of the drive motor 2115 in accordance with the precision provided by the oscillator 2112 and the frequency division circuits 2113 and 2119.

With this arrangement, since the photosensitive drum and the polygon mirror are rotated at predetermined constant speeds, the ITOP signal, which is synchronized with the rotation of the photosensitive drum, and the BD signal, which is synchronized with the rotation of the polygon mirror, are generated at predetermined cycles. The start timing of the optical motor, which employs the ITOP signal to drive the line sensor and scan the original document, the scan start timing of the line sensor, and the timing for recording screen images for individual colors to the photosensitive drum are controlled, so that the reading position and writing position for a screen image for each color correspond.

The operation of the conventional arrangement in FIG. 31 will now be described while referring to FIGS. 32 and 33.

FIG. 32 is a timing chart showing the relationship of an ITOP signal to the first to fourth colors, an ITOP signal for the first and the second colors, a BD signal, the start timing for an optical motor, a line sensor reading start signal, and a laser writing start signal.

In FIG. 32, the BD signal, which is a main scan start signal, is generated with a cycle T in synchronization with the rotation of a scanner motor. The ITOP signal, which indicates the rotational position of the photosensitive drum, is asynchronous with the BD signal, and is generated at an arbitrary timing during the BD cycle (i.e., in FIG. 32, the trailing end of the ITOP signal is generated in the middle of the BD cycle). The optical motor is started when a predetermined time $T_s$ has elapsed following the changing of the ITOP signal from level H to level L. The reading of data by the line sensor is begun in synchronization with the n-th BD signal, calculated from the generation of the ITOP signal, and data for each line is read, in synchronization with the BD signal, in a number equivalent to a predetermined read line count. That is, when the BD cycle is defined as T, data reading is begun after time N×T+(T/2) has elapsed.

The reading operation performed by the line sensor will now be described while referring to FIG. 33.

In FIG. 33, a light accumulation/transfer control signal for the line sensor is synchronized with the BD signal. Light is accumulated (data are fetched) for a predetermined time period (during a period in which the control signal is at level H), and the accumulated data are transmitted to the transfer unit during a predetermined time period (a period in which the control-signal is at level L). The data received by the transfer unit are transferred during the next light accumulation process, and are output as writing data with a delay of p lines (p×BD cycle) following the light accumulation process.

Specifically, in synchronization with the BD cycle, the light accumulation/transfer control signal of the line sensor repeats the accumulation of light and the transmission of data to the transfer unit. Interval (1) of the control signal is a light accumulation interval, and during this period, the line sensor accumulates data for the original document that is currently being scanned, i.e., "reading data 1" in FIG. 33.

In interval (2) of the control signal, the data obtained in interval (1) are transmitted to the transfer unit. In interval (3), wherein the control signal goes to level H again, the data for the original document that is currently being scanned by the line sensor, i.e., "reading data 2", are accumulated, and the "reading data 1" transmitted to the transfer unit are output as "writing data 1". The same process is performed for interval (4) and the following intervals, and data are read for each line, in synchronization with the BD signal, and output to a laser driver (not shown).

The timing for recording the data that are read will now be described while referring to FIG. 32.

An image process, such as tone correction, is performed for the image data read by the line sensor, and the resultant image data are transmitted as laser writing data to the laser driver (not shown). In synchronization with the n-th BD signal obtained following the generation of the ITOP signal, each line of the image data that corresponds to the BD cycle is recorded on the photosensitive drum. That is, the recording on the photosensitive drum is begun after time m×T+(T/2) has elapsed following the generation of the ITOP signal. Therefore, for the reading/writing operation for the first color, the data that were read after time n×T+(T/2) had elapsed following the generation of the ITOP signal are written on the photosensitive drum when time m×T+(T/2) has elapsed. The same process is performed for reading and writing data for the second and the following colors. However, since the ITOP signal and the BD signal are asynchronous with each other, the phases of the ITOP signal and the BD signals differ from those for the first color, and, for example, the phase for the second color is shifted 1.4 line, as shown in FIG. 32. In this case, as well as for the first color, the optical motor starts after real time $T_s$ has elapsed following the input of the ITOP signal. The line sensor starts data reading when time n×T+(T/4) has elapsed following the input of the ITOP signal, and the laser writing starts when time m×T+(T/4) has elapsed.

For image forming performed by superimposing images for the first and the second colors, for the first color, an image that was read in synchronization with the BD signal after time n×T+(T/2) had elapsed is written in synchronization with the BD signal after time m×T+(T/2) has elapsed. For the second color, an image that was read in synchronization with the BD signal after time n×T+(T/2) had elapsed is written in synchronization with the BD signal after time m×T+(T/2) has elapsed. Since the scanning of the original document by the line sensor, and the rotation of the photosensitive drum are operated at the same speed Vs in real time relative to the generation of an ITOP signal, the original scanning position and the rotational position of the photosensitive drum for the first and the second colors are the same in real time following the generation of the ITOP signal. However, since the reading start position and the writing start position are determined in synchronization with the BD signal, the phases of the ITOP signal and the BD signal affect these positions, so that the reading start position and the writing start position for the second color are shifted a distance d from those for the second colors, as shown in FIG. 34. This shifting distance d (=Vs×T/4) is obtained by multiplying difference T/4, between time n×T+(T/2) and time n×T+(T/4), by the scanning speed of the line sensor= the rotational speed of the photosensitive drum=Vs.

With the first color employed as a reference, for the second color, data that were read at a forward position a distance d from the position of the first color are written at a forward position a distance d from the position for the first color. The data that are read are written at a corresponding position on the photosensitive drum.

The same process is performed when the difference in the phases of the ITOP signal and the BD signal for the third and following colors is α×T (α<1).

As described above, in the conventional color image forming apparatus, the original scanning performed by the line sensor is started based on using the ITOP signal as a reference, and the data reading timing and the timing for writing to the photosensitive drum are synchronized with the BD signal based on the ITOP signal, so that the reading position and the writing position for each color correspond.

In addition, the line sensor reading position is determined in real time following the input of the ITOP signal, while the data accumulation and transmission of the line sensor, the image processing for the transferred data, and the data recording process are performed for each line following the input of the ITOP signal. If the phases of the ITOP signal and the BD signal for the second color differ from those for the first color, the MTF for the reading of data for each color is varied, and the reproductivity of a fine line, for example, may be changed for each line, or the determination of edges, such as characters, may differ for each color.

The above described phenomenon will now be described in detail.

In FIG. 35, the relationship is shown between the original document, including fine lines, and the line reading positions of the line sensor for the first and the second colors.

FIG. 35 is a diagram for an enlarged portion of the original document, showing the phase relation between the BD signals for the first and the second colors and the ITOP signal, the reading start position for each color, and the data that are read. The original document is divided into squares for individual pixels beginning at the leading edge of the original, and density data for a pixel is represented in each square. Since actually, color data to be read differ for the first and the second colors, the density data provided for individual pixels are essentially different. However, for the sake of convenience, the same density data are employed for pixels of the first and the second color in this embodiment.

The data reading performed for the first color will now be described.

As shown in FIG. 35, the phase relation between the BD signal for the first color and the ITOP signal is as follows. Since the time for generation of the leading edge of the ITOP signal is the center of the generation cycle of the BD signal, and the original is read for each line in synchronization with the n-th BD signal after the ITOP signal is generated. Therefore, as shown in FIG. 35, while shifting by the ½ line from the square of the original, the data for the first color are read and recorded beginning with the first line. The data that are read are "50", "50", "0" and "0", beginning from the first line.

The data reading for the second color will now be described.

As shown in FIG. 35, the phase relationship between the BD signal for the second color and the ITOP signal is as follows. Since the time for the generation of the leading edge of the ITOP signal is substantially the same as the timing for the generation of the BD signal, the phases of the ITOP signal and the BD signal are shifted ½ line away from those for the first color. Since the original document is read for each line in synchronization with the n-th BD signal following the generation of the ITOP signal, as shown in FIG. 35, while being matched with the squares of the original document, the data for the second color are read and recorded. The data that are read, beginning at the first line, are "0", "100", "0" and "0".

FIG. 36 is a diagram showing the image data read for the first color and their positions, the image data read for the second color and their positions, and the relationship between the original image and an image that is reproduced based on the image data that are read.

As shown in FIG. 36, image data for the second color are read as those having the same density value as the original image because the phase of the BD signal is the same as that of the ITOP signal, as shown in FIG. 35. For the first color, however, the image data for a pixel of the original image having a density value of "100" are read as image data for two pixels, each of which have a density of "50", because the BD signal is shifted ½ line away from the ITOP signal, as shown in FIG. 35.

Specifically, for the first color, a fine line in the actual original document that has a density value of "100" and a width equivalent to one pixel is read as a slightly thick line having a reduced density value of "50" and a width equivalent to two pixels, so that the resolution is slightly reduced. For the second color, the pertinent line is read as being the same as the one in the original document.

In the image forming process using the image data read for the first and the second colors, the images for the first and the second colors are superimposed to reproduce the image. Therefore, if the reproductivity differs for the images for individual colors, as in the above case wherein the image for the first color is fuzzy while the image for the second color is sharp, the fine lines of the image will be blurred, compared with those of the original image.

In addition, in the edge determination process using the image data read for the first and the second colors, the images for the first and the second colors are superimposed to reproduce the image. Therefore, if the reproductivity differs for the images for individual colors, as in the above case wherein the image for the first color is fuzzy while the image for the second color is sharp, the location that is determined for an edge will vary for each color.

This is because, since the phase relationship between the BD signal and the ITOP signal differs for the first and the second colors, the MTF of the image that is read is different for each color.

In order to reduce the shifting distance when images for individual colors are superimposed, various methods have been proposed whereby the integer number of main scan stat signals (BD signals) are obtained, while a photosensitive drum, which serves as a photosensitive member, is rotated once and a sub-scan start signal (an ITOP signal) is generated, and whereby the rotation of a drum motor that drives the photosensitive drum is synchronized with the rotation of a scanner motor that drives a polyhedron mirror for laser beam scanning.

This method will now be described in detail.

FIG. 37A is a diagram showing an example where the integer number of main scan start signals (BD signals) are obtained during one rotation of the photosensitive drum (in this example, n+0.5 signals), and where the latent images up to the third line for the second color are formed as the photosensitive drum is rotated twice. As shown in FIG. 37A, when a photosensitive drum 801 is rotated once, a sub-scan start signal (an ITOP signal) is generated by an ITOP sensor 802. The first line for the second color is shifted 0.5 line away from the first line for the first color each time the photosensitive drum 801 completes a rotation (i.e., each time an ITOP signal is generated by the ITOP sensor 802). Similarly, as the screen images for the individual colors, such as the third and the fourth colors, are superimposed, the locations of the lines for the individual screen images are shifted 0.5 line.

FIG. 37B is a diagram showing an example wherein the integer number of main scan start signals (BD signals) is obtained while the photosensitive drum is rotated once (n signals in this example), and where latent images are formed up to the third line for the second color while the photosensitive drum is rotated twice. As shown in FIG. 37B, how many times the photosensitive drum 801 rotates, the locations of the lines for the individual screen images (e.g., the position of the first line for the first color and the position of the first line for the second color) are, theoretically, matched exactly.

A specific arrangement for synchronizing the rotation of a drum motor with the rotation of a scanner motor can be an arrangement wherein a signal obtained by the frequency division of a BD signal is employed as a reference clock to control the rotation of the drum motor, or an arrangement wherein a reference clock that is used to control the rotation of the drum motor and a reference clock that is used to control the scanner motor are generated by employing a clock that is produced by a commonly used oscillator.

First, in FIG. 38 is shown the arrangement wherein a signal obtained by frequency division of a BD signal is employed as a reference clock that is used to control the rotation of the drum motor.

In FIG. 38, a photosensitive drum 3901 is rotated by a drum motor 3907 via a drive belt 3908.

Based on a reference clock CLK that is generated by an oscillator 3911, a scanner motor 3902 is controlled by a PLL circuit 3910 and rotates a polygon mirror 3903 at a constant speed.

A laser beam is emitted by a laser 3904 based on image data received from a document reader (not shown), and is reflected by the individual faces (eight faces) of the polygon mirror 3903; the reflected beam being projected, via a lens 3905, onto the photosensitive drum 3901 to form a latent image thereon. With this arrangement, as the polygon mirror 3903 is rotated once, the latent images for eight lines are formed on the photosensitive drum 3901.

A beam sensor 3906 is located in a portion other than the image forming area of the photosensitive drum 3901. The beam sensor 3906 detects the radiation of a laser beam, and generates a main scan start signal (a BD signal) each time one line is scanned by the laser beam. That is, the beam sensor 3906 produces eight BD signals while the polygon mirror 3903 is rotated once, and transmits the BD signals as a reference clock for the PLL circuit 3909 that rotates the drum motor 3907 at a constant speed. With this arrangement, the rotation of the scanner motor 3902 is synchronized with the rotation of a drum motor 3907.

Next, in FIG. 39 is shown the arrangement where a reference clock that is used to control the rotation of the drum motor and a reference clock that is used to control the scanner motor are generated by employing a clock that is produced by a commonly used oscillator.

In FIG. 39, a photosensitive drum 3001 is rotated by a drum motor 3007 via a drive belt 3008. Based on a reference clock that is generated by an oscillator 3011, the drum motor 3007 is controlled by a PLL circuit 3009 and rotates the photosensitive drum 3001 at a constant speed.

A reference clock generated by the oscillator 3011 is transmitted to a PLL circuit 3010, and in accordance with this clock, the PLL circuit controls the rotation of a scanner motor 3002, so that the polygon mirror 3003 is rotated at a constant speed.

Based on image data supplied by a document reader (not shown), a laser beam is emitted by a laser 3004 and is reflected by the individual faces of the polygon mirror 3003, which is rotated at a constant sped by the scanner motor 3002, whose rotation is controlled in the above described manner. The reflected laser is transmitted via a lens 3005 to the photosensitive drum 3001 and forms a latent image thereon.

As described above, the reference clock for the PLL circuit 3010, which controls the rotation of the scanner motor 3002, and the reference clock for the PLL circuit 3009, which controls the rotation of the drum motor 3001, are generated by using a clock that is produced by the same oscillator. Therefore, the rotation of the scanner motor 3002 is synchronized with the rotation of the drum motor 3001.

For the thus described color image forming apparatus wherein an integer number of main scan start signals (BD signals) are obtained while the sub-scan start signal (ITOP signal) is produced during one revolution of the photosensitive drum, one of the above described arrangements is employed to synchronize the rotation of the scanner motor with the rotation of the drum motor. As a result, the screen images for the individual colors can be superimposed on the photosensitive drum without their positions being shifted, and a high quality color image can be obtained.

To control the position shifting when screen images for individual colors are superimposed, there is a method, other than the above method, for which the integer number of main scan start signals (BD signals) need not be obtained while the sub-scan start signal (the ITOP signal) is generated during one revolution of the photosensitive drum. A specific arrangement for such a method will now be described in detail.

FIG. 40 is a diagram showing an example arrangement for the system of the conventional color image forming apparatus for driving a scanner motor and a drum motor.

In FIG. 40, a photosensitive drum 3101 is rotated by a drum motor 3107 via a drive belt 3108. Based on a reference clock produced by an oscillator 3114, the drum motor 3107 is controlled by a PLL circuit 3109 and rotates the photosensitive drum 3101 at a constant speed.

Each time the photosensitive drum 3101 is rotated, an ITOP sensor 3115 is shielded by a sensor flag 3116 and generates an ITOP signal. With the ITOP signal as a reference, the writing start position is determined for the first line for each screen image on the photosensitive drum 3101.

A phase matching circuit 3112 matches the phase of a reference clock generated by an oscillator 3113 with the phase of an ITOP signal produced by the ITOP sensor 3115. In accordance with the reference clock that is output by the phase matching circuit 3112 and is synchronized in phase with the ITOP signal, a scanner motor 3102 is controlled by a PLL circuit 3110 and rotates at a constant speed.

Since the phase matching circuit 3112 matches the phase of the ITOP signal with the phase of the reference clock used to control the rotation of the scanner motor 3102, each time the ITOP signal is generated, it is synchronized with the reference clock, so that the rotational phase of the scanner motor 3102 is constant. Therefore, polygon mirror 3103 is rotated by the scanner motor 3102 in synchronization with the ITOP signal, and when the laser beam from the laser 3104 is projected, via the lens 3105, onto the photosensitive drum 3101 for scanning, the laser beam scan start timing for each screen image is matched with the timing for the generation of the ITOP signal.

FIG. 41 is a diagram showing the relationship between the main scan line on the photosensitive drum and the timing for the generation of the sub-scan start signal (ITOP signal).

As shown in FIG. 41, each time the photosensitive drum 3601 is rotated, the main scanning for n+0.5 lines is performed, and the ITOP sensor 3602 generates an ITOP signal at a predetermined timing. With this arrangement, since the main scanning is performed for n+0.5 lines during one revolution of the photosensitive drum, the first line during the second rotation (second color) of the photosensitive drum will be shifted 0.5 line away from the first line during the first rotation (first color). With the arrangement shown in FIG. 40, however, the phase matching circuit 3112 matches the phase of the ITOP signal with the phase of a reference clock that is used to control the rotational phase of the scanner motor 3102, and the rotational phase of the scanner motor 3102 is controlled in accordance with the reference clock. Therefore, as shown in FIG. 41, the start timing for scanning the first line can be matched each time the photosensitive drum is rotated. Further, no matter how many times the photosensitive drum rotates, the main scan lines of the screen images are not shifted on the photosensitive drum, so that the screen images for the individual colors can be superimposed exactly.

The rotations of the photosensitive drum and the polygon mirror are slightly fluctuated by, for example, a change in loads on the drum motor and the scanner motor, or a backlash produced by a mechanical drive transmission system, such as a set of gears. When the phase relationship between the main scan start signal (a BD signal) and the sub-scan start signal (an ITOP signal) fluctuates due to a change in the rotation of the photosensitive drum or the polygon mirror, as was mentioned previously, the MTF is varied for an image for each color that is read from the original document. Further, to form the screen images for individual colors on the photosensitive drum, the fluctuation appears as position shifting among the individual screen images. As a result, the quality of an image that is formed by superimposing the screen images deteriorates, and an erroneous edge determination is acquired.

The change in the phase relationship between the main scan start signal (a BD signal) and the sub-scan start signal (an ITOP signal) can be suppressed within a one line interval or shorter by minimizing the change in the load placed on the drum motor or the scanner motor, or by improving the accuracy of a mechanical drive transmission system, such as set of gears. Assume that, as shown in FIG. 42, in the process of forming a screen image for each color on the photosensitive drum, the time for the generation of an ITOP signal falls before or after the time for the generation of the first BD signal. In this case, the ITOP signal generation timing is shifted from the generation timing for the first BD signal by a period of time that is equal to or shorter than the one line time period; however, the position shifting that is equivalent to one line occurs in a color image obtained by superimposing the screen images for individual colors.

As described above, in FIG. 42, during the first rotation of the photosensitive drum, an ITOP signal is generated immediately before the scanning timing (i.e., the BD signal generation timing) for the first line of the screen image for the first color that is formed on the photosensitive drum, and for the second rotation of the drum, an ITOP signal is generated immediately after the scanning timing for the first line of the screen image for the second color that is formed on the photosensitive drum.

As shown in FIG. 42, a photosensitive drum 1201 is rotated, and an ITOP sensor (not shown) is shielded by a sensor flag 1202, so that an ITOP signal is produced by the ITOP sensor. At the first rotation of the photosensitive drum, the ITOP signal is generated immediately before a BD signal (1) that indicates the timing for the start of a scan for the first line in the screen image of the first color. Therefore, the first line is scanned in synchronization with the first BD signal (BD signal (1)) that is generated after the ITOP signal is generated, and then the second line is scanned in synchronization with BD signal (2). In this manner, the photosensitive drum is scanned by a laser beam, and the screen image for the first color is formed. At the second rotation of the photosensitive drum, an ITOP signal is generated immediately after BD signal (1), which indicates the scan start timing for the first line of the screen image for the second color. Therefore, the first line is scanned in synchronization with the first BD signal (BD signal (2), in this case) that is generated after the ITOP signal is generated, and then the second line is scanned in synchronization with BD signal (3). Since the photosensitive drum is scanned in this manner by a laser beam, the original reading position and the writing position relative to the photosensitive drum for the second rotation of the drum are shifted one line away from those for the first rotation.

SUMMARY OF THE INVENTION

To resolve the above shortcomings, it is an object of the present invention to provide an image forming apparatus that can maintain a constant original reading start position and a constant image forming start position for each color element, and that can obtain a high quality color image with less variance in the reproductivity of individual color element images; and a control method therefor.

To achieve the above object, according to the present invention, an image forming apparatus comprises:

scanning means for scanning a color image for each color element;

reading means for reading image data for each line through the scanning performed by the scanning means;

a rotary polygon mirror for deflecting, in a main scan direction, a modulated light beam that is based on the image data for each line that are read by the reading means, so that an image holding member that is rotated in a sub-scan direction is scanned by the deflected light beam and a latent image is formed thereon;

first generation means for determining whether the light beam deflected by the rotary polygon mirror has scanned a predetermined location, and for generating a main scan start reference signal;

second generation means for generating a sub-scan start reference signal in synchronization with the rotation of the image holding member;

first control means for controlling the rotary polygon mirror and/or the rotary image holding member, so as to maintain a phase difference between the sub-scan start reference signal, produced by the second generation means, and the main scan start reference signal, produced by the first generation means;

second control means for, in synchronization with the sub-scan start reference signal generated by the second generation means, starting to drive the scanning means;

third control means for, in synchronization with the main start reference signal generated by the first generation means, starting the reading of an original document by the reading means; and fourth control means for, in synchronization with the main start reference signal generated by the first generation means, starting to use the light beam to form a latent image.

It is another object of the present invention to provide a high quality image forming apparatus wherein, even when the phase relationship of a main scan start signal and a sub-scan start signal is slightly changed due to a change in the rotation of an image holding member or a rotary polygon mirror, the occurrence of a shift in the phase relationship of these scan signals that is equal to or greater than the actual change can be prevented, and wherein the MTF for each image that is read from the original document can be prevented from varying, and image deterioration due to the shifting of superimposed images or an erroneous edge determination does not occur.

To achieve the above object, an image forming apparatus, which forms a composite image by superimposing a plurality of screen images, comprises:

original reading means for employing a line sensor to scan an original document a plurality of times and for outputting image data acquired during each scan;

light beam generation means for generating a light beam based on the image data output by the original reading means;

image holding member driving means for rotating an image holding member;

a rotary polygon mirror for, while rotating, reflecting the light beam emitted by the light beam generation means, so as to scan the image holding member that is rotated by the image holding member driving means;

main scan start signal generation means for generating a main scan start signal that indicates a rotation timing for the rotary polygon mirror; and sub-scan start signal generation means for generating a sub-scan start signal that indicates a rotation timing for the image holding member, wherein a timing at which the main scan start signal is generated by the main scan start signal generation means, and/or at which the sub-scan start signal is generated by the sub-scan start signal generation means, is controlled, so that a phase relationship of the main scan start signal and the sub-scan start signal, which is detected at a first timing, is also maintained for a second timing that differs from the first timing, and wherein the scanning, using the line sensor, of the original document by the original reading means, and the scanning, using the rotary polygon mirror, of the image holding member with the light beam are controlled in accordance with the main scan start signal, generated by the main scan start signal generation means, and the sub-scan start signal, generated by the sub-scan start signal generation means.

The other objects and features of the present invention will become apparent during the course of the following description, given while referring to the accompanying drawings, and the description of the claims.

BRIEF DESCRIPTION OF THE DRAWINGS

FIG. 3 is a timing chart showing the image forming timing for the printer unit in the image forming apparatus in FIG. 1;

FIG. 15 is a specific diagram showing the original reading start position and the image writing start position of the conventional image forming apparatus;

FIGS. 24A and 24B are timing charts for explaining the operation performed by the arrangement in FIG. 23;

FIGS. 25A and 25B are timing charts for explaining the phase adjustment operation performed by a phase adjustment circuit according to a tenth embodiment of the present invention;

FIG. 26 is a timing chart for explaining the phase adjustment operation performed by the phase adjustment circuit according to the tenth embodiment of the present invention;

DETAILED DESCRIPTION OF THE PREFERRED EMBODIMENTS (First Embodiment)

Figure 1:
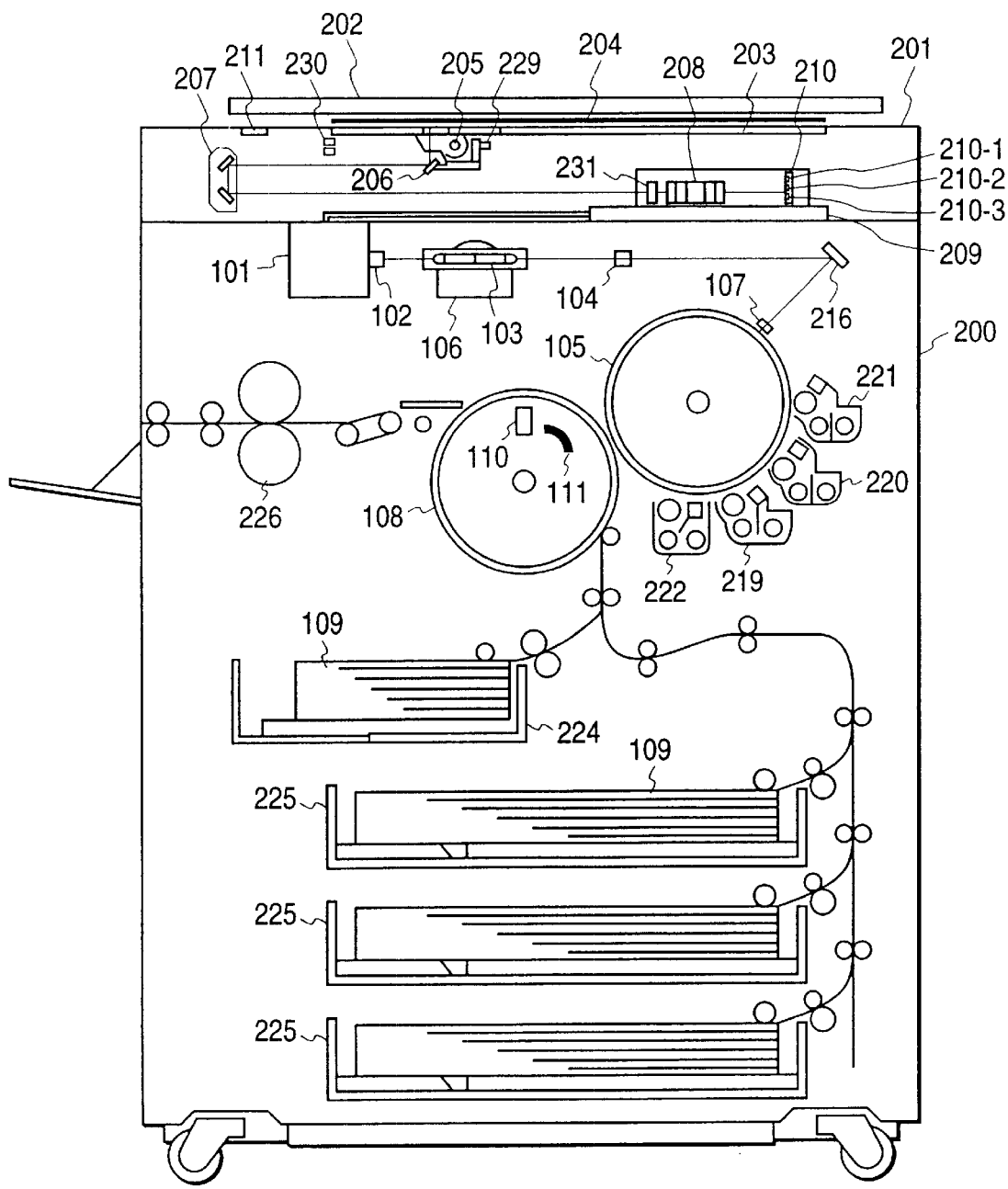
FIG. 1 is a cross-sectional view for explaining the arrangement of an image forming apparatus according to a first embodiment of the present invention.

FIG. 1 is a cross-sectional view for explaining the arrangement of an image forming apparatus according to a first embodiment of the present invention.

In FIG. 1, an image scanner 201 reads an original document and obtains digital signals. A printer 200 prints a full color image on a recording sheet based on the original image that is read by the image scanner 201 or based on image data that are received from an external apparatus, such as a computer.

In the image scanner 201, an original document pressing plate 202 is used to press an original document 204 against an original document table glass 203. A halogen lamp 205 is moved in the original scanning direction by an optical motor (not shown), and projects light onto the original document 204 on the glass 203.

A three-line sensor (hereinafter referred to as a CCD) 210 is constituted by a red (R) sensor 210-1, a green (G) sensor 210-2 and a blue (B) sensor 210-3. When light reflected by the original document 204 is transmitted via mirrors 206 and 207 and a lens 208, which includes a far-infrared cut filter 231, and is focused on the CCD 210, the CCD 210 divides the light information into colors, and obtains red (R), green (G) and blue (B) elements from the combined color information. A signal processor 209 electrically separates the R, G and B signals obtained by the R, G and B sensors 210-1 to 210-3 into magenta (M), cyan (C), yellow (Y) and black (BK) color elements. These color elements are then transmitted to a printer 200.

The image scanner 201 includes a controller (not shown), which exercises overall control of the image scanner 201.

A standard white board 211 is scanned by the R, G and B sensors 210-1 to 210-3 to generate correction data. Relative to visible light and infrared light, substantially, the standard white board 211 is uniformly reflective and visually is white. The data output by the R, G and B sensors 210-1 to 210-3 are corrected by using this standard white board 211. A light sensor 230 produces an image leading edge signal VTOP using a flag board 229.

In the printer 200, an image writing start control circuit 101 modulates a semiconductor laser 102 based on image signals for magenta (M), cyan (C), yellow (Y) and black (BK) received from the image scanner 201, or from an external apparatus, such as a computer. A polygon mirror 103 is rotated by a polygon motor 106. A laser beam emitted by the semiconductor laser 102 is reflected by the polygon mirror 103, and the reflected light is transmitted via an f-θ lens 104 and a return mirror 216 and scans a photosensitive drum 105.

An electrostatic latent image is formed on the photosensitive drum 105 by laser scanning using the polygon mirror 103. A BD sensor 107, which is located in the vicinity of the one line scan start position of the laser beam, detects line scanning performed with a laser beam, and generates a line scan start reference signal (BD signal) that has the same cycle.

A magenta (M) developing unit 219, a cyan (C) developing unit 220, a yellow (Y) developing unit 221, and a black (BK) developing unit 222 each develop an electrostatic latent image on the photosensitive drum 105, and form a toner image. A transfer drum 108 attracts and conveys a recording sheet 109 that is fed from a sheet cassette 224 or 225, and transfers the toner images from the photosensitive drum 105 to the recording sheet 109.

A sensor 110 is provided in the transfer drum 108, and as the transfer drum 108 is rotated, the sensor 110 detects a flag 111 each time it is passed and produces an ITOP signal for each color (represents the position of the leading edge of the recording sheet 109 that is attracted to the transfer drum 108). Thereafter, a fixing unit 226 fixes the toner image that the transfer drum 108 transfers to the recording sheet 109.

The operations of the individual sections will now be described.

The original document 204 on the glass 203 is exposed to the light produced by the halogen lamp 205, and the light reflected by the original document 204 is guided by the mirrors 206 and 207 and via the lens 208, and forms an image on the CCD 210. Then, the CCD 210 separates the light information obtained from the original document 204, reads the red (R), green (G) and blue (B) elements in the combined color information, and transmits the color elements to the signal processor 209. Under the control of a controller (not shown), synchronized with the ITOP signal output by the ITOP sensor 110, the halogen lamp 204 and the mirror 206 are mechanically moved at speed V in the direction (hereinafter referred to as the sub-scan direction) perpendicular to the electrical scan direction (hereinafter referred to as the main scan direction) of the line sensor, while the mirror 207 is mechanically moved at speed V/2, so that the entire original document is scanned. Further, under the control of the controller (not shown), the CCD 210 begins to read and to output the obtained image, in synchronization with the BD signal output by the BD sensor 107.

In addition, the output data obtained by the visible light sensors in the R, G and B sensors 210-1 to 210-3 are corrected by using the standard white board 211. Also, an optical sensor 230 generates an image leading edge signal VTOP with the flag board 229, and the signal processor electrically processes the obtained R, G and B signals and separates them to obtain the color elements magenta (M), cyan (C), yellow (Y) nd black (BK), which it transmits to the printer 200.

Each time the image scanner 201 scans the original document 204, one of the elements M, C, Y and BK is transmitted to the printer 200, so that the printing of one image is completed by performing a total of four scans.

An image signal received from the image scanner 201, or from an external apparatus, such as a computer, is transmitted to an image writing start timing control circuit 101. In the image writing start timing control circuit 101 the semiconductor laser 102 is modulated in accordance with image signals received for magenta (M), cyan (C), yellow (Y) and black (BK). The laser beam emitted by the semiconductor laser 102 is reflected by the rotating polygon mirror 103, the reflected light is f-θ corrected by the f-θ lens 104, and the corrected light is reflected by the return mirror 216 and is used to scan the photosensitive drum 105. As a result, an electrostatic latent image is formed on the photosensitive drum 105.

When the photosensitive drum 105 is rotated four times, the four developing units 219 to 222 alternately contact the photosensitive drum 105, and using corresponding toners, develop the M, C, Y and BK electrostatic latent images on the photosensitive drum. While the recording sheet 109, fed from the sheet cassette 224 or 225, is attached to the transfer drum 108, the M, C, Y and BK toner images obtained by the developing units 219 to 222 are sequentially transferred to it. Thereafter, the recording sheet 109 is passed through the fixing unit 226 and discharged.

Figure 2:
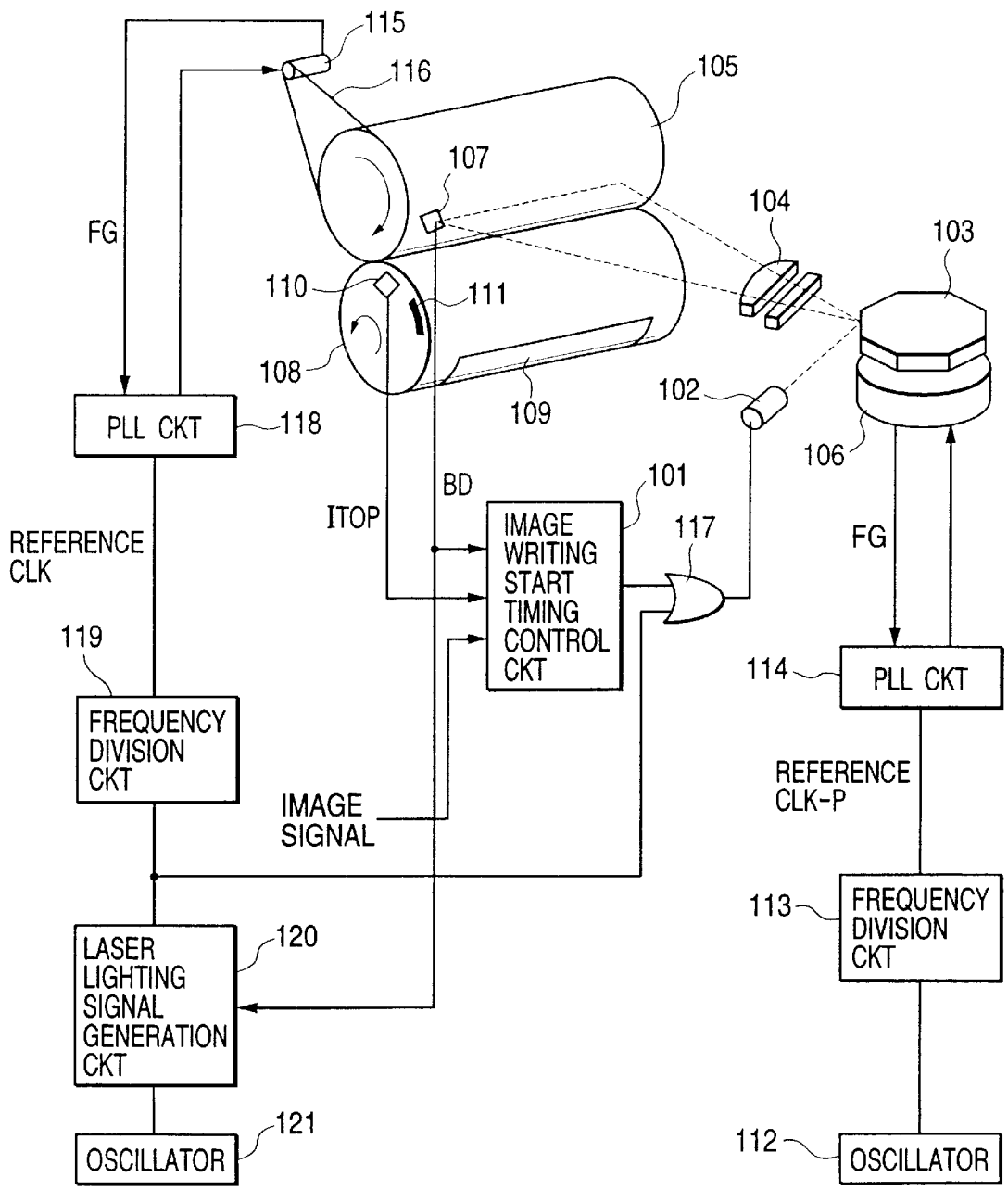
FIG. 2 is a diagram for explaining the arrangement of a printer unit in the image forming apparatus in FIG. 1.

FIG. 2 is a diagram for explaining the arrangement of the printer 200 of the image forming apparatus in FIG. 1. The same reference numerals as are used in FIG. 1 are also used in FIG. 2 to denote corresponding components.

In FIG. 2, an oscillator 112 outputs a clock having a predetermined frequency. A frequency division circuit 113 divides, by a predetermined frequency division ratio, a clock output by the oscillator 112, and transmits a polygon motor driving pulse (reference CLK-P). A PLL circuit 114 exercises PLL control, by which, in order to match the phase of the reference CLK-P with the phase of a motor FG (frequency generator) pulse that is output in accordance with the rotation of the polygon motor 106, a phase difference and a frequency deviation for these two phases are detected, and the obtained differences are compared to control a drive voltage for the polygon motor 106.

An oscillator 121 outputs a clock having a predetermined frequency. A laser lighting signal generation circuit 120 receives a clock from the oscillator 121 and a BD signal from the BD sensor 107, and outputs a laser lighting signal for detecting a BD signal. And an OR gate 117 outputs, to the semiconductor laser 102, an image signal from the image writing start timing control circuit 101, or the laser lighting signal produced by the laser lighting signal generation circuit 120, and modulates the semiconductor laser 102.

A frequency division circuit 119 divides, by a predetermined frequency division ratio, the laser lighting signal received from the laser lighting signal generation circuit 120, and transmits a photosensitive drum motor driving pulse (reference CLK). A PLL circuit 118 exercises PLL control, in which, in order to match the phase of the reference CLK with the phase of a motor FG pulse that is output in accordance with the rotation of a photosensitive drum motor 115, a phase difference and a frequency deviation for these two functions are detected, and the obtained differences are compared in order to control a drive voltage for the photosensitive drum motor 115.

The operations of the individual sections will now be described.

An image signal is received from the image scanner 201 in FIG. 1, or from an external apparatus, such as a computer (not shown), and is transmitted to the image writing start timing control circuit 101. The image writing start timing control circuit 101 modulates the semiconductor laser 102 via the OR gate 117 in accordance with the image signals transmitted for the magenta (M), cyan (C), yellow (Y) and black (BK) colors. The laser beam is reflected by the rotating polygon mirror 103, the reflected light is corrected by the f-θ lens, and the corrected light is reflected by the return mirror 216 (FIG. 1) and is used to scans the photosensitive drum 105. As a result, an electrostatic latent image is formed on the photosensitive drum 105.

The frequency division circuit 113 performs a frequency division of the clock output by the oscillator 112, and generates a polygon motor driving pulse (reference CLK-P). When the polygon motor driving pulse is received by the PLL circuit 114, rotation of the polygon motor 106 is initiated. The PLL circuit 114 exercises the PLL control during which, in order to match the phase of the reference CLK-P with the phase of the motor FG pulse from the polygon motor 106, a phase difference and a frequency deviation of these two phases are detected, and the obtained differences are compared to control the drive voltage for the polygon motor 106.

The BD sensor 107, which is located near the one line scan start position, detects line scanning performed using the laser beam, and generates a line scan start reference signal (BD signal) having the same cycle as in FIG. 3, which will be described later.

As the transfer drum 108 is rotated, the sensor 110 in the transfer drum 108 detects the flag 111 that is fixed to the inside of the transfer drum 108, and produces an ITOP signal (represents the position of the leading edge of the recording sheet 109 held on the transfer drum 108) for each color shown in FIG. 3, which will be described later.

Furthermore, the frequency division circuit 119 performs frequency division of the laser lighting signal that is obtained by the laser lighting signal generation circuit 120. The frequency division circuit 119 then transmits the obtained motor drive pulse (reference CLK) to the PLL circuit 118, so that rotation of the photosensitive drum motor 115 is initiated.

The PLL circuit 118 exercises PLL control in which the phase difference and the frequency deviation between the motor FG pulse of the photosensitive drum 115 and the reference CLK are detected, so that the phase of the FG pulse matches the phase of the reference CLK, and in which the differences are compared to control the drive voltage for the photosensitive drum motor 115. The photosensitive drum 105 is rotated in the direction indicated by an arrow by the photosensitive drum drive motor 115 via a gear belt 116. Since gears (not shown) couple the transfer drum 108 with the photosensitive drum 105, the drum 108 is rotated at an equal speed, in the direction indicated by an arrow (sub-scan direction), in synchronization with the photosensitive drum 105. The BD signal and the ITOP signal are transmitted to the image writing start timing control circuit 101, and the image signal is output to the semiconductor laser 102 in accordance with the following timing. That is, in synchronization with the n-th BD signal produced since the leading edge of the ITOP signal was detected, the image signal is transmitted as a laser modulated light to the photosensitive drum, as shown in FIG. 3, which will be described later.

FIG. 3 is a timing chart showing the image forming timing for the printer 200 of the image forming apparatus shown in FIG. 1.

In FIG. 3, an ITOP signal represents the position of the leading edge of the recording sheet 109 that is held on the transfer drum 108. As the transfer drum 108 is rotated, the sensor 110 for the transfer drum 108 detects the flag 111 that is fixed to the transfer drum 108, and outputs an ITOP signal for each color.

The BD signal is a line scan start reference signal having the same cycle. The BD signal is output when the BD sensor 107 located near the line scan start position detects the line scanning being performed with the laser beam.

After the BD signal and the ITOP signal are received by the image writing start timing control circuit 101, in synchronization with the leading edge of the n-th BD signal, following the detection of the leading edge of the ITOP signal, the image signal is transmitted via the OR gate 117 to the semiconductor laser 102. That is, in synchronization with the leading edge of the n-th BD signal, following the detection of the leading edge of the ITOP signal, the image signal is projected onto the photosensitive drum 105 as the laser modulated light.

In this embodiment, with the arrangement in FIG. 2, an integer number of BD signals are output during one revolution of the photosensitive drum 105.

Since an integer number of BD signals are output during one revolution of the photosensitive drum 105, each time the photosensitive drum 105 is rotated the laser beam scans it at the same position.

In this embodiment, 8192 BD signals are output during one revolution of the photosensitive drum, which is determined by the processing speed and the resolution. According to the gear ratio set for the photosensitive drum 105, the photosensitive drum motor 115 rotates 64 times while the drum 105 rotates once. Since 32 FG pulses are output during one revolution of the photosensitive drum 115, 32 reference clock pulses are required for one revolution of the photosensitive drum motor 115.

Thus, "64 revolutions×32 pulses=2048" reference clock pulses are required for one revolution of the photosensitive drum 105. Therefore, the frequency division circuit 119 divides, by four, the laser lighting signal, which is output by the laser lighting signal generation circuit 120 and which is equivalent to the BD signal, and the obtained signal is employed as the reference CLK for the photosensitive drum motor 115. Therefore, when 8192 BD signals have been output, the photosensitive drum 105 will have been rotated once.

This gear ratio is a natural number. This is true because, since the motor and the reduction gears are driven an integer number of revolutions while the photosensitive drum 105 is rotated once, the same effects provided by the eccentricities of the motor shaft and of the reduction gears are provided for each rotation of the photosensitive drum 105, and because color non-alignment due to the eccentricities is prevented.

As a result, on the photosensitive drum 105, the first scan line in the second rotation is superimposed on the scan line of the laser beam that was previously recorded, while the BD signal for the first scan for the first rotation is employed as a reference. And for each of the 8192 BD signals, the first scan lines for the first rotation and for the second rotation are superimposed.

Figure 4A:
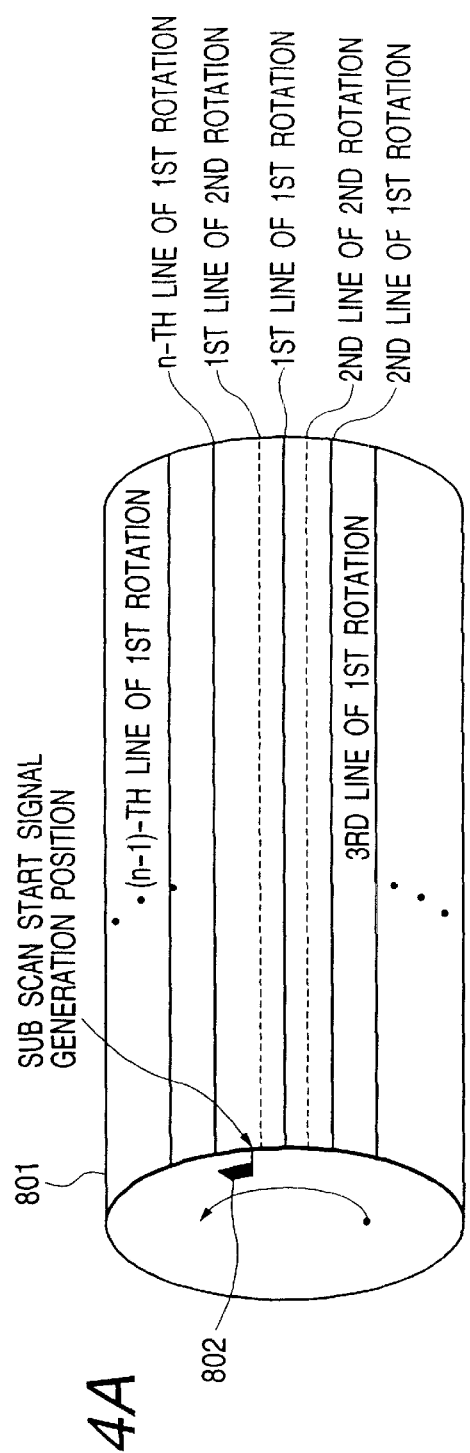
FIGS. 4A and 4B are specific diagrams showing line scanning positions on a photosensitive drum for the first and the second colors.
Figure 4B:
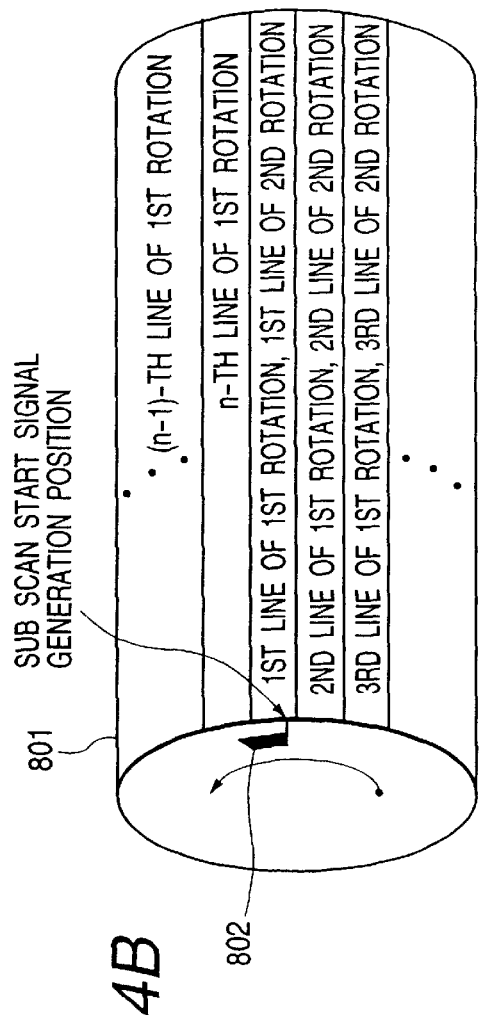

FIGS. 4A and 4B are specific diagrams showing the line scan positions on the photosensitive drum 105 for the first and the second colors.

In the example in FIG. 4A, "n+½" main scan start reference signals (BD signals) are obtained during one revolution of the photosensitive drum 105 or the intermediate transfer member, and "n+½" main scan recording line signals are synchronized with the BD signals. The first to the n-th lines scanned while a photosensitive member 801 is rotated twice, the first line in the second rotation, and the sub-scan start reference signal generation position are shown in FIG. 4A.

In consonance with one revolution of the photosensitive member 801, an ITOP sensor 802 generates a sub-scan start reference signal at a predetermined position. Since the main scan recording line signal indicates the "n (integer)+½"-th line during one revolution of the photosensitive member 801, i.e. each time an ITOP signal is generated, the first line for the second rotation is shifted "½" line away from the first line for the first rotation.

To prevent such shifting, this embodiment employs the arrangement in FIG. 2, so that the integer number of main scan start reference signals (BD signals) are obtained during one revolution of the photosensitive member or of the intermediate transfer member (the photosensitive drum 105 or the transfer drum 108 in FIG. 2), and the integer number of main scan recording line signals are synchronized with the BD signals.

In the example in FIG. 4B, "n (integer)" main scan start reference signals (BD signals) are obtained during one revolution of the photosensitive drum 105 or of the intermediate transfer member, and "n" main scan recording line signals are synchronized with the BD signals. The first to the n-th lines while a photosensitive member 801 is rotated twice, the first line for the second rotation, and the main scan start reference signal generation position are shown in FIG. 4B.

As shown in FIG. 4B, since the main scan recording line signal indicates the "n"-th line during one revolution of the photosensitive member 801, i.e. each time an ITOP signal is generated, the first line for in the second rotation is not shifted away from the first line for the first rotation.

The copying process performed by the image forming apparatus of the present invention will now be described while referring to the flow chart in FIG. 5.

Figure 5:
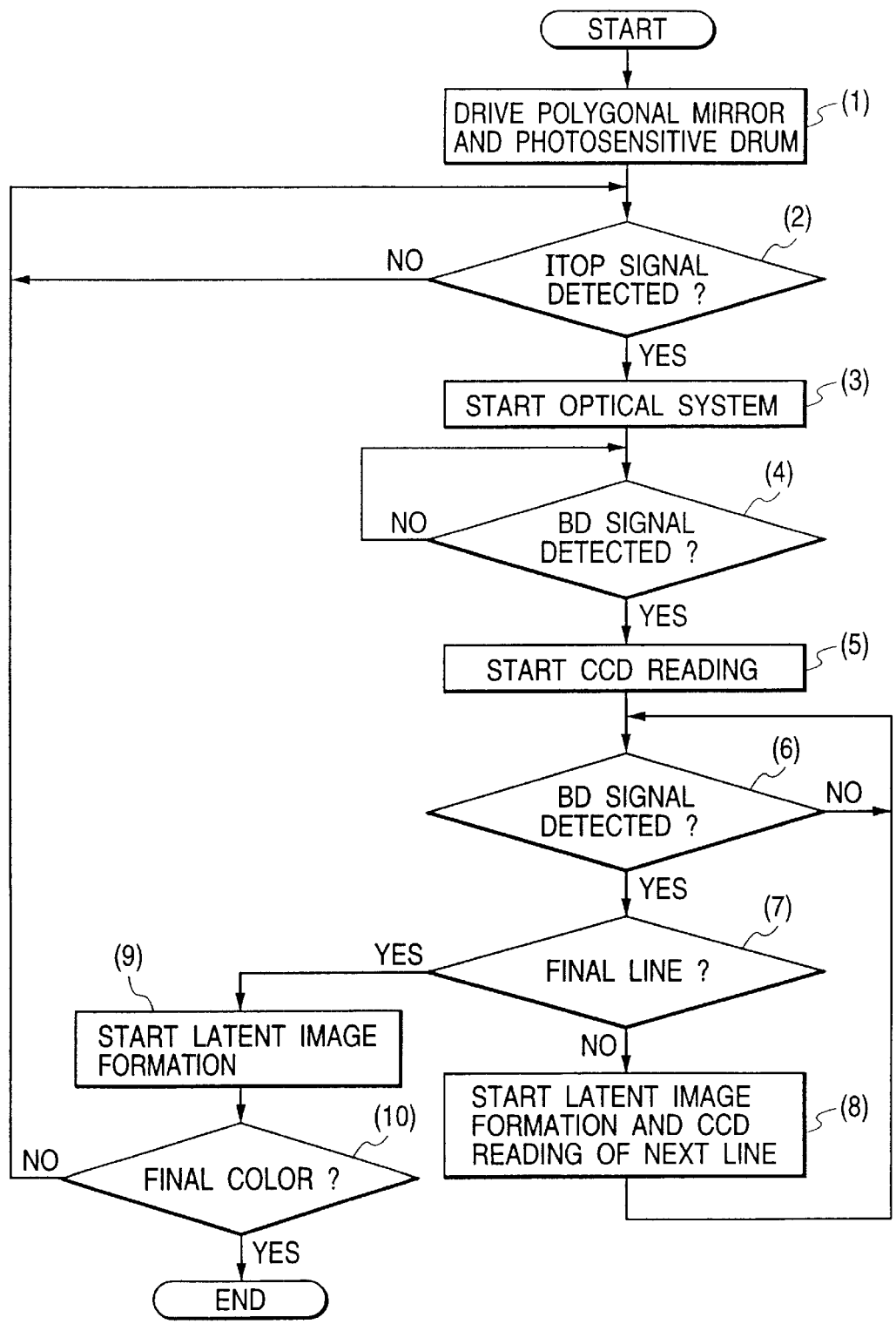
FIG. 5 is a flow chart showing the control processing performed by the image forming apparatus of this invention.

FIG. 5 is a flow chart showing the control processing performed by the image forming apparatus of this invention, and (1) to (10) represent individual steps.

First, when a copying operation is instructed by an operating unit (not shown), the polygon mirror 103 and the photosensitive drum 105 are driven (1). When the rotations of the polygon mirror 103 and the photosensitive drum 105 are stabilized and when the phase difference between the ITOP signal and the BD signal becomes constant (an integer number of BD signals are output while one ITOP signal is output), the ITOP signal is detected (2). Then, under the control of a controller (not shown), the optical system is started (the halogen lamp 205 and the reflection mirror 206 begin to move at speed V (scanning of the original document)) (3). When the BD signal is detected (4), the CCD 210 initiates the reading of image data under the control of the controller (not shown) (5).

When the next BD signal is detected (6) and when the reading of the last line is not yet completed (7), the image writing start timing control circuit 101 starts to form a latent image based on the image data that were read when the preceding BD signal was generated. Further, under the control of the controller (not shown), the CCD 210 begins to read image data for the next line (8), and program control thereafter returns to step (6).

When, at step (7), reading of the last line has been completed, the image writing start timing control circuit 101 begins to form a latent image, based on the image data that were read when the preceding BD signal was generated (9). Then, a check is performed to determine whether the color that is currently being processed is the last color (10). If the current color is not the last one, program control returns to step (2), and the data for the next color are processed.

When at step (10) the current color is the last one, the processing is thereafter terminated.

Figure 6:
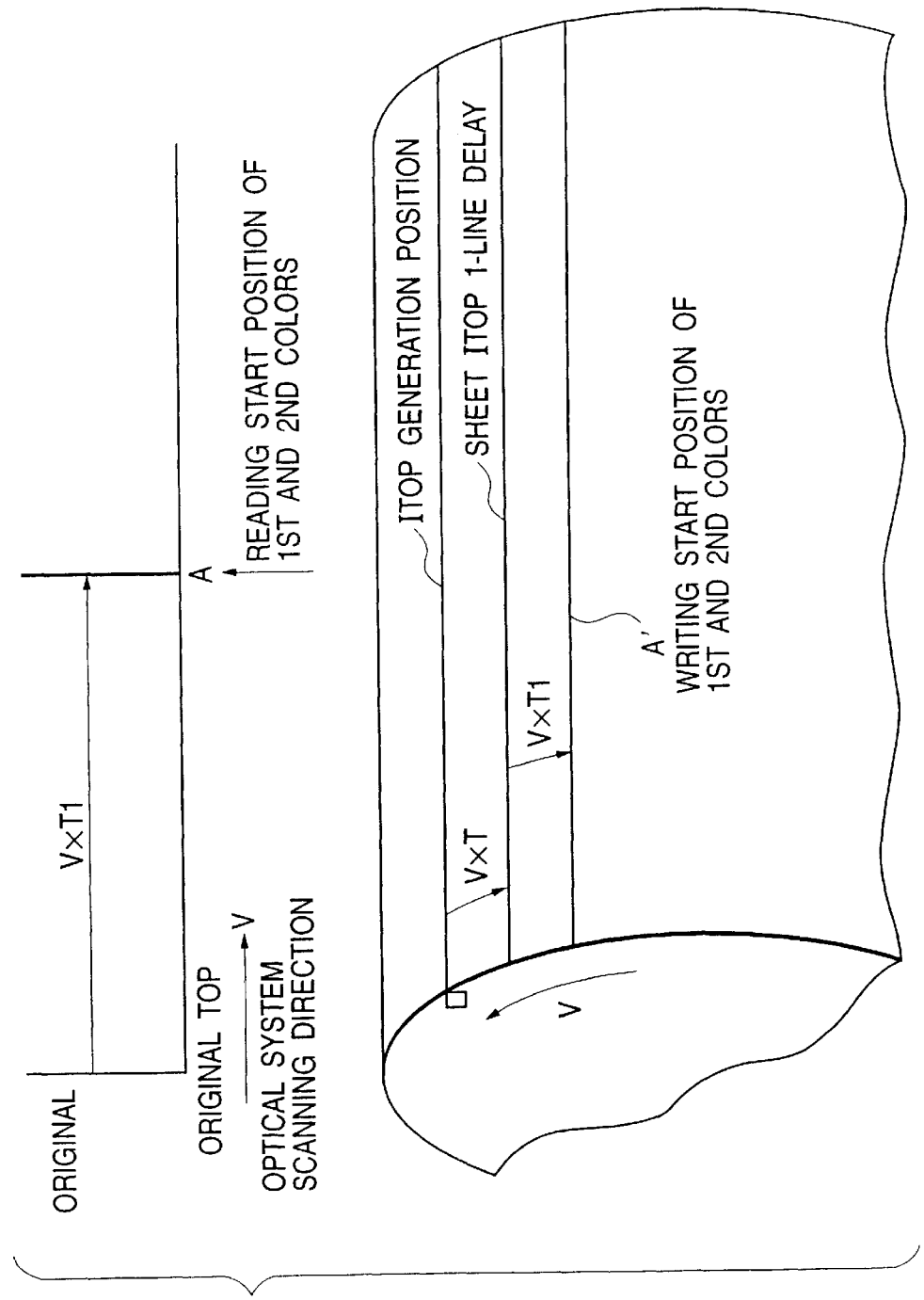
FIG. 6 is a specific diagram showing an image reading start position and an image writing start position for the image forming apparatus of this invention.

FIG. 6 is a specific diagram showing the image reading start position and the image writing start position for the image forming apparatus of this invention.

As shown in FIG. 6, for the first and the second colors, data that are read at point "A" on the original document are written beginning at point "A'" on the drum.

Assume that the left end of the original document is defined as the original TOP, and the location removed distance V×T from the ITOP signal generation location on the photosensitive drum is defined as the sheet TOP. Then, the points A and A' correspond when viewed from the original TOP and the sheet TOP. Since the rotational speed of the photosensitive drum is the same as the scanning speed of the optical system, the data acquired for the original document that are read under the same conditions are recorded on the photosensitive drum at the same position as the reading position.

Since the same phase difference between the ITOP signal and the BD signal is maintained for each rotation, the reading for the third color is also begun at the same position "A" as were the readings for the first and the second colors, and writing is begun at the position "A'".

Figure 7A:
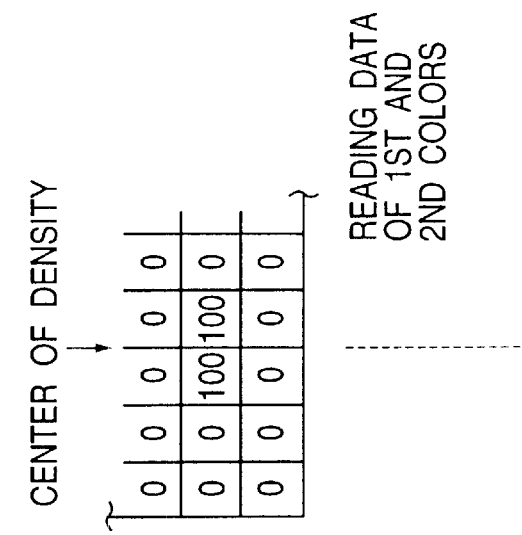
FIGS. 7A and 7B are diagrams showing the relationship between the position on the original document for line reading by the image forming apparatus and sampling.
Figure 7B:
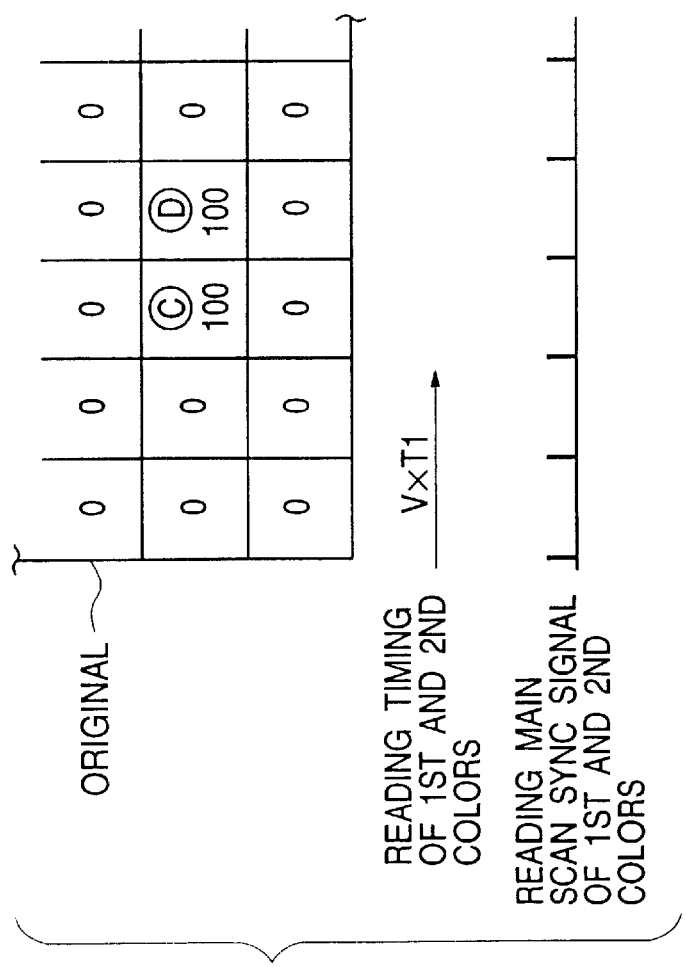

FIGS. 7A and 7B are diagrams showing the relationship, for the image forming apparatus of this invention, between the line reading position on the original document and sampling. In FIG. 7A is shown the relationship between the original document reading timing and the original document reading position, and in FIG. 7B is shown the original document reading position, and the density data sampling value for the original document and its position.

In FIG. 7A, the original document is divided into squares for individual pixels, and density data for a pixel is entered in each square. Since actually, the color data to be read differs for the first and the second colors, the density data for each pixel is essentially different. However, for the sake of convenience, in this embodiment the pixel data for the first and the second colors are the same.

First, data read for the first and the second colors will be described.

As shown in FIG. 7A, both for the first and the second color, reading is initiated after a time "T1" has elapsed following the generation of the ITOP signal. For the first and the second colors, the reading of the original document is begun at the position of the reader after it has advanced across the original document a distance of V×T1, where V is the movement speed of the reader, i.e., at the column occupied by pixel C.

As shown in FIG. 7B, since the columns occupied by pixel C and pixel D, and the phase of the main scan start reference signal (BD signal) are the same for the first and the second colors, the same density data as that recorded for the original document in FIG. 7A are read (sampled).

Therefore, data "0", "100" and "100" are read for the first and the second colors, the MTF is the same for the first and the second colors, and the reproductivity for each color component and the edge determination are also the same. Therefore, the deterioration of the image quality that is due to a different image reproductivity and a different edge determination for each color can be prevented.

Thus, the original document reading start position and the image forming start position can be maintained for each color, and a high quality color image wherein the image reproductivity does not vary for each color can be obtained.

As described above, with the arrangement wherein an integer number of BD signals are output during one revolution of the photosensitive drum 105, the rotation of the photosensitive drum 105 is synchronized with the rotation of the polygon motor 106 in order to provide a constant original document reading start position for each color. Therefore, the MTF for each color can be aligned, and the same image reproductivity and edge determination can be obtained for each color. As a result, a satisfactory image can be output.

(Second Embodiment)

In the arrangement for the first embodiment, the frequency division circuit 119 performs a frequency division of a BD signal output by the BD sensor 107; the PLL circuit employs the obtained reference CLK to drive the photosensitive drum motor 115; the rotation of the photosensitive drum 115 is synchronized with the rotation of the polygon motor 106; and an integer number of BD signals are output during one revolution of the photosensitive drum 105. There is another arrangement wherein the PLL circuit drives the photosensitive drum motor 115 by employing, as a reference clock, a BD signal output by the BD sensor 107; the rotation of the photosensitive drum motor 115 is synchronized with the rotation of the polygon motor 105; and an integer number of BD signals are output during one rotation of the photosensitive drum 105. This arrangement will now be described.

Figure 8:
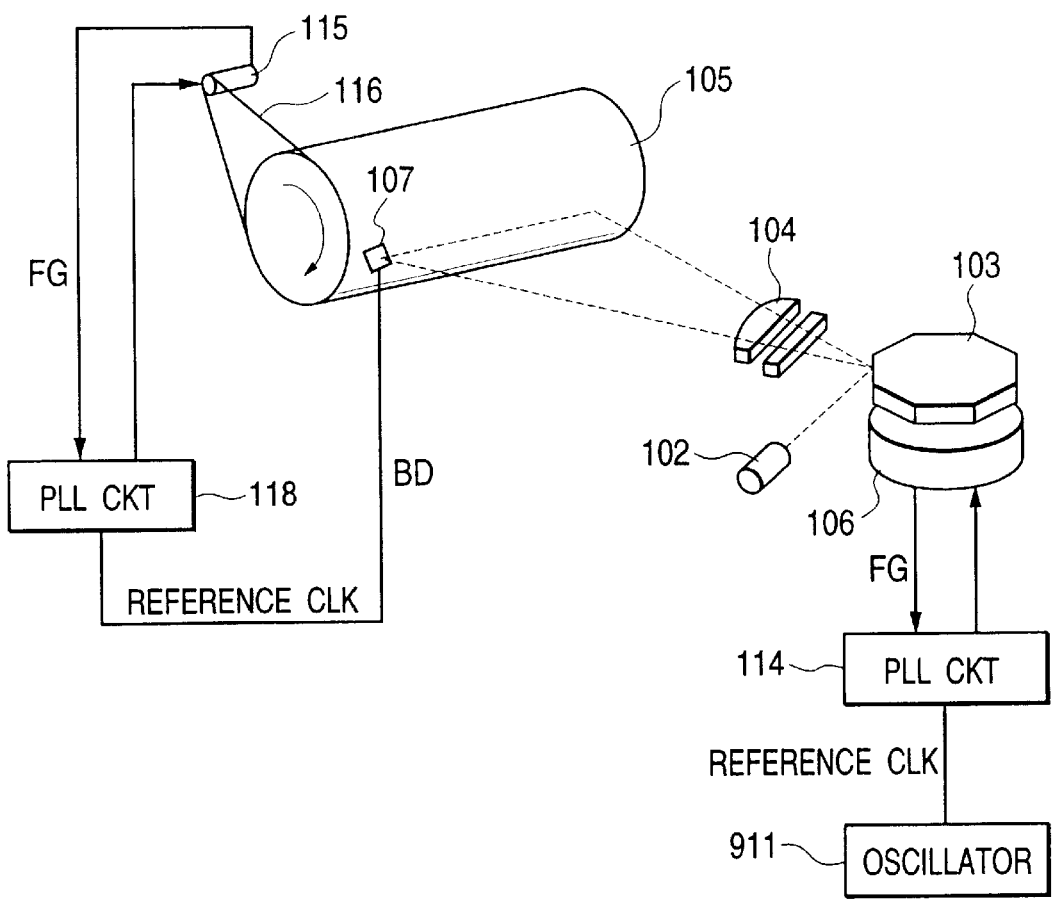
FIG. 8 is a diagram showing the arrangement of the image forming apparatus according to a second embodiment of the present invention for driving a polygon motor and a photosensitive drum.

FIG. 8 is a diagram showing the system of an image forming apparatus according to a second embodiment of the present invention for driving a polygon motor 106 and a photosensitive drum motor 115. The same reference numerals as are used in FIG. 2 are used in this diagram to denote corresponding components.

In FIG. 8, a photosensitive drum 105 is rotated via a drive belt 116 by a photosensitive drum motor 115. Based on a reference clock provided by an oscillator 911, a polygon motor 106 is rotated at a constant speed by a PLL circuit 114, and drives a polygon mirror 103, so that a laser beam emitted by a laser 102 scans the face of the photosensitive drum 105 via a lens 104.

A BD sensor 107 is located in a non-image forming area on the line scan line of the laser beam, and produces a main scan start reference signal (BD signal) for each line scan performed by the laser, i.e., in synchronization with the rotation of the polygon motor 106.

Since the BD signal is employed as a reference clock for a PLL circuit 118 that controls the photosensitive drum motor 115 and maintains a constant speed, the rotation of the polygon motor 106 can be synchronized with the rotation of the photosensitive drum motor 115.

With the above described arrangement, wherein an integer number of BD signals are output during one revolution of the photosensitive drum 105, the photosensitive drum 105 and the polygon motor 106 are synchronously rotated, so that the phase of an ITOP signal generated during the cycle for a BD signal can be maintained for individual colors (a constant phase difference can be maintained for the ITOP signal and the BD signal). Further, the MTF for each color component can be matched, so that for individual colors the same reproductivity and edge determination for file lines can be obtained, and a satisfactory image can be output.

(Third Embodiment)

In the first embodiment, the frequency division circuit 119 performs a frequency division for a BD signal output by the BD sensor 107; the PLL circuit employs the obtained reference CLK to drive the photosensitive drum motor 115; the rotation of the photosensitive drum 105 is synchronized with the rotation of the polygon motor 106; and an integer number of BD signals are output during one revolution of the photosensitive drum 105. There is another arrangement wherein the integer number of main scan start reference signals (BD signals) are obtained during one revolution of the photosensitive drum 105 or the intermediate transfer drum 108, and an integer number of main scan recording line signals are synchronized. The same clock may be used as a reference clock for the photosensitive drum motor 115, which drives the photosensitive drum 105 and the intermediate transfer drum 108, and as a reference clock for the polygon motor 108, which drives the polygon mirror 103. This arrangement will now be described.

Figure 9:
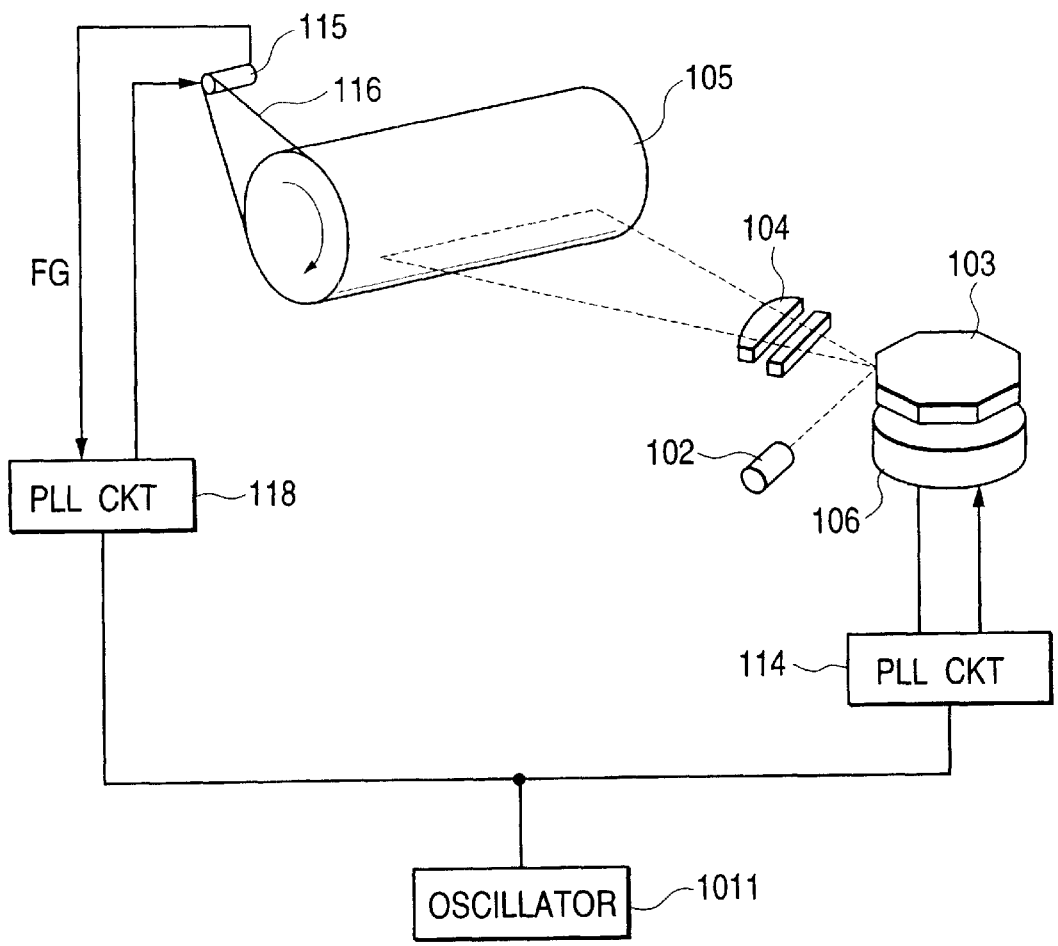
FIG. 9 is a diagram showing the arrangement of the image forming apparatus according to a third embodiment of the present invention for driving a polygon motor and a photosensitive drum.

FIG. 9 is a diagram showing the arrangement for an image forming apparatus according to a third embodiment of the present invention for driving a polygon motor 106 and a photosensitive drum motor 115. The same reference numerals as are used in FIG. 2 are also employed in this diagram to denote corresponding components.

In FIG. 9, the photosensitive drum 105 is rotated via a drive belt 116 by a photosensitive drum motor 115. Based on a reference clock provided by an oscillator 1011, a polygon motor 106 is rotated at a constant speed by a PLL circuit 114, and drives a polygon mirror 103, so that a laser beam emitted by a laser 102 scans the face of the photosensitive drum 105 via a lens 104. A clock, which is generated by the oscillator 1011 for the PLL control of the polygon motor 106, is also employed as a reference clock for a PLL circuit 118 that drives the photosensitive drum motor 115 at a low speed, so that the polygon motor 106 and the photosensitive drum motor 115 can be rotated synchronously.

With this arrangement, the revolutions of the photosensitive drum 105 and the polygon motor 106 can be controlled, so that the phase relationship between the sub-scan start reference signal (ITOP signal) and the main scan start reference signal (BD signal) is not changed, no matter how many times the photosensitive drum 105 is rotated.

(Fourth Embodiment)

In the first embodiment, the frequency division circuit 119 performs a frequency division of a BD signal output by the BD sensor 107; the PLL circuit employs the obtained reference CLK to drive the photosensitive drum motor 115; the rotation of the photosensitive drum 105 is synchronized with the rotation of the polygon motor 106; and an integer number of BD signals are output during one revolution of the photosensitive drum 105. Each time a sub-scan start reference signal (ITOP signal) is generated, the phase of a main scan start reference signal (BD signal) may be matched with the phase of the ITOP signal. This arrangement will now be described.

Figure 10:
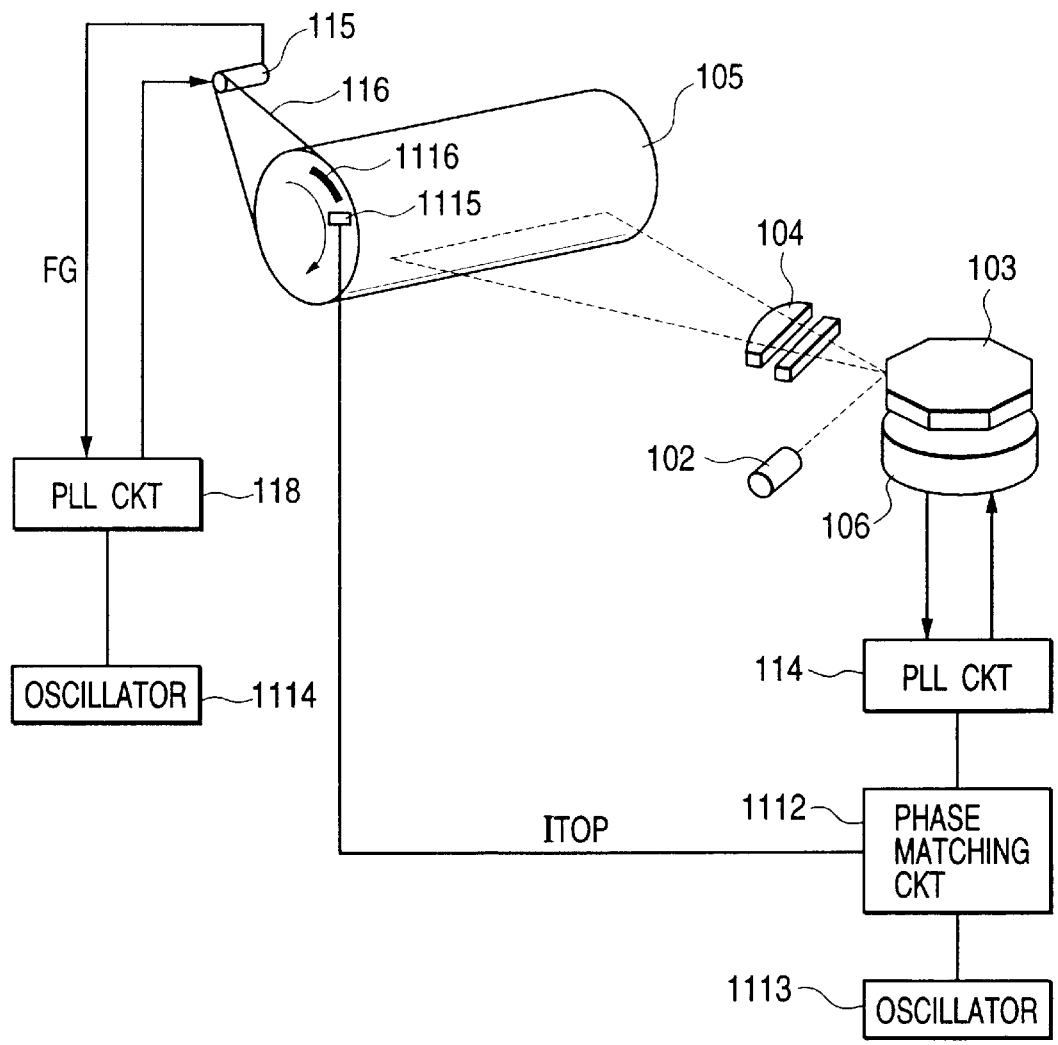
FIG. 10 is a diagram showing the arrangement of the image forming apparatus according to a fourth embodiment of the present invention for driving a polygon motor and a photosensitive drum.

FIG. 10 is a diagram showing the system for an image forming apparatus according to a fourth embodiment of the present invention for driving a polygon motor 106 and a photosensitive drum motor 115. The same reference numerals as are used in FIG. 2 are also employed in this diagram to denote corresponding components.

In FIG. 10, a photosensitive drum 105 is rotated via a drive belt 116 by a photosensitive drum motor 115. The photosensitive drum motor 115 is driven at a constant speed by a PLL circuit 118 based on a reference clock provided by an oscillator 1114. Each time the photosensitive drum 105 is rotated, an ITOP sensor 1115 is shielded by a sensor flag 1116, and generates an ITOP signal. With the ITOP signal being used as a reference, the writing start position of the first line on the photosensitive drum 105 is determined.

A phase matching circuit 1112 synchronously matches the phase of the ITOP signal with the phase of a reference clock provided by an oscillator 1113. A PLL circuit 114 controls the polygon motor 103 at a constant speed based on the reference clock, the phase of which is matched with that of the ITOP signal by the phase matching circuit 1112.

Since the phases of the ITOP signal and the reference clock are matched by the phase matching circuit 1112, the phase of the polygon motor 106 is corrected, so that it is constant, each time an ITOP signal is generated. Therefore, the polygon mirror 103, which is driven by the polygon motor 106, is synchronized with the ITOP signal, so that no matter how many times the photosensitive drum 105 is rotated, the position on the photosensitive drum 105, whereat it is scanned by the laser beam emitted by the laser 102 via the lens 104, is matched while the ITOP signal is employed as a reference.

Figure 11:
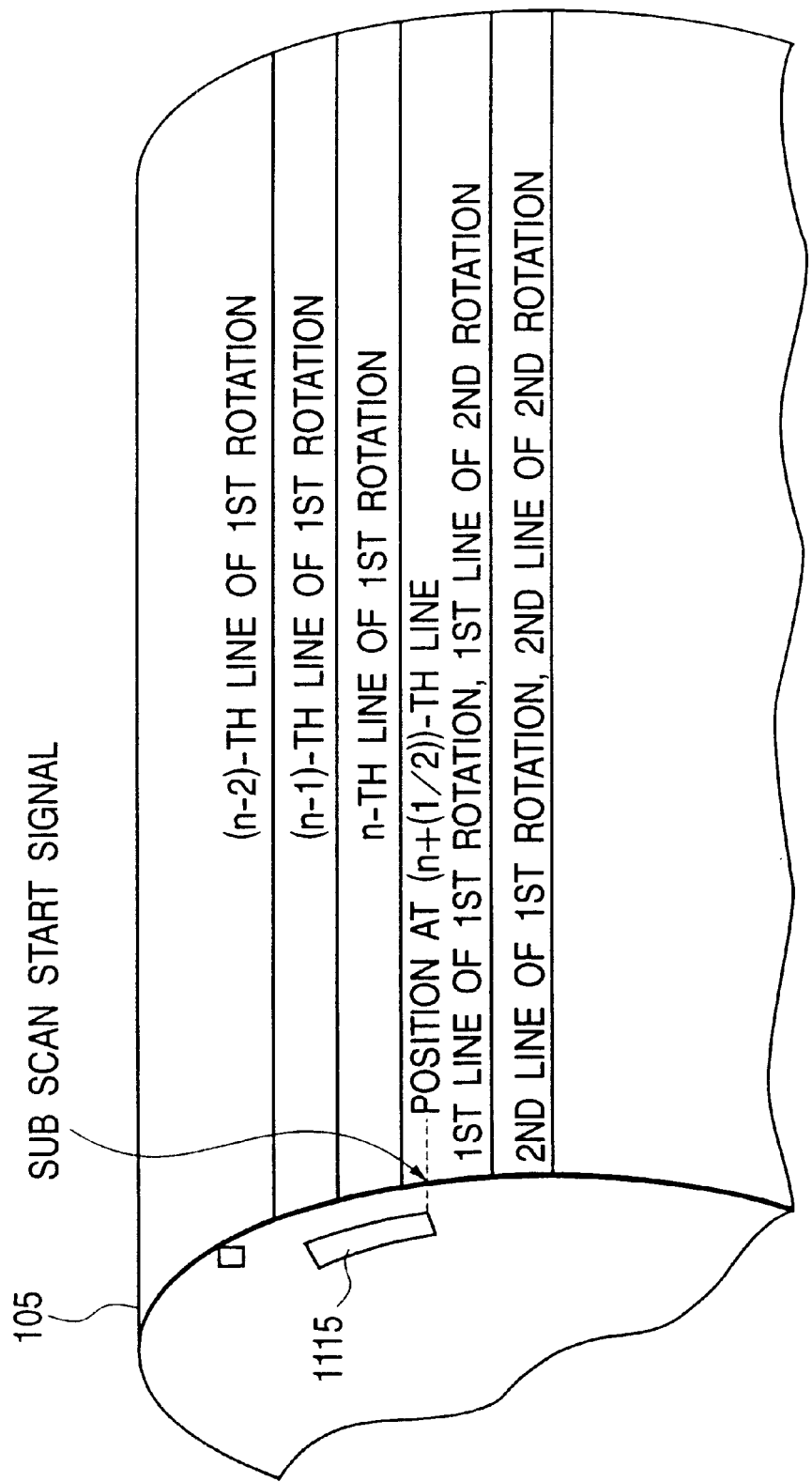
FIG. 11 is a specific diagram showing a relationship between an actual main scan line (main scan start reference signal) and an actual ITOP signal (sub-scan start reference signal) on the photosensitive drum.
Figure 12:
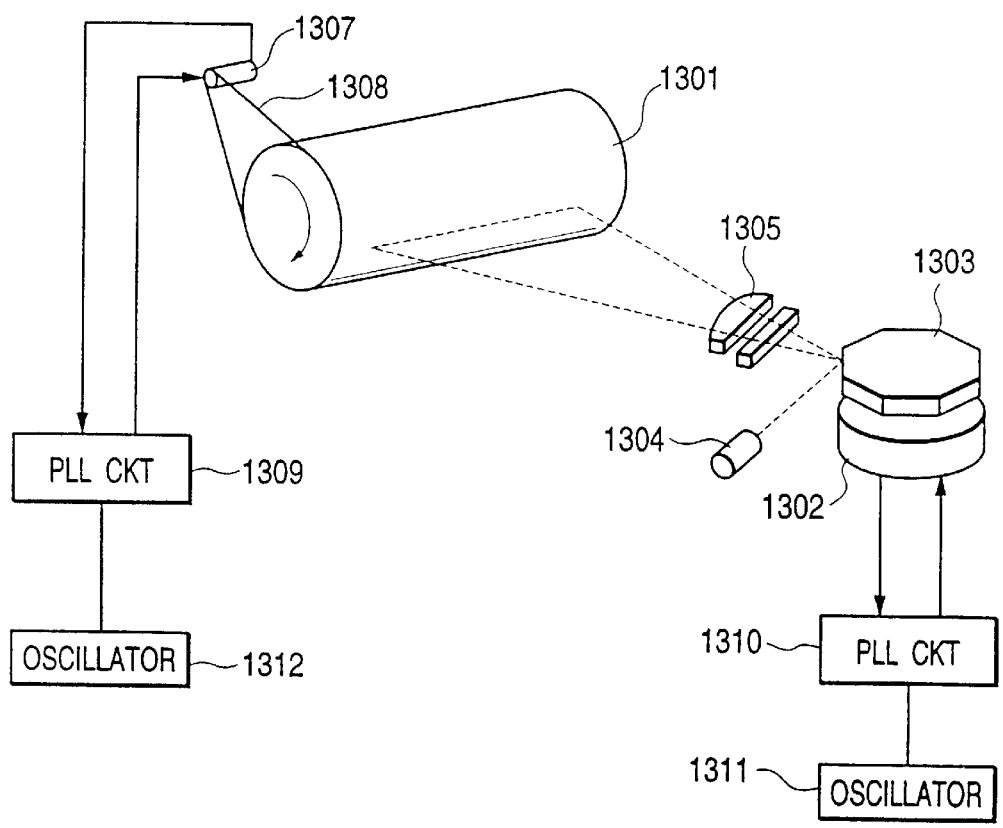
FIG. 12 a diagram showing the arrangement of a conventional image forming apparatus for driving a polygon motor and a photosensitive drum.
Figure 13:
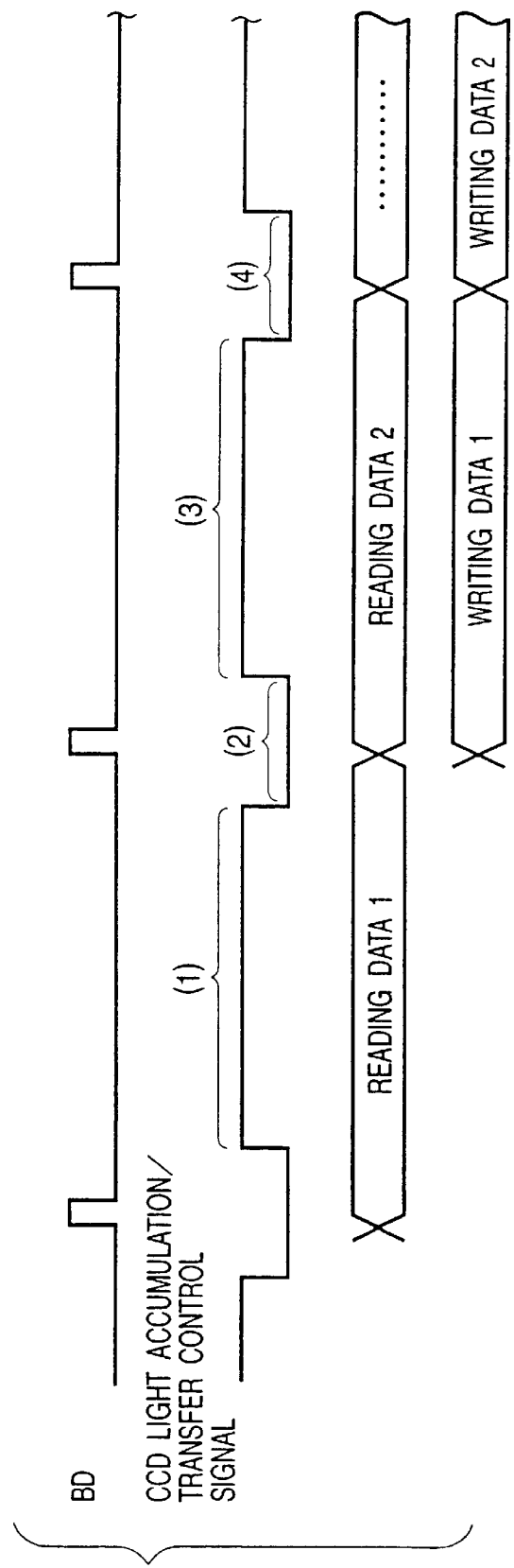
FIG. 13 is a timing chart for explaining the line data fetching operation performed by a CCD in the conventional image forming apparatus.
Figure 14:
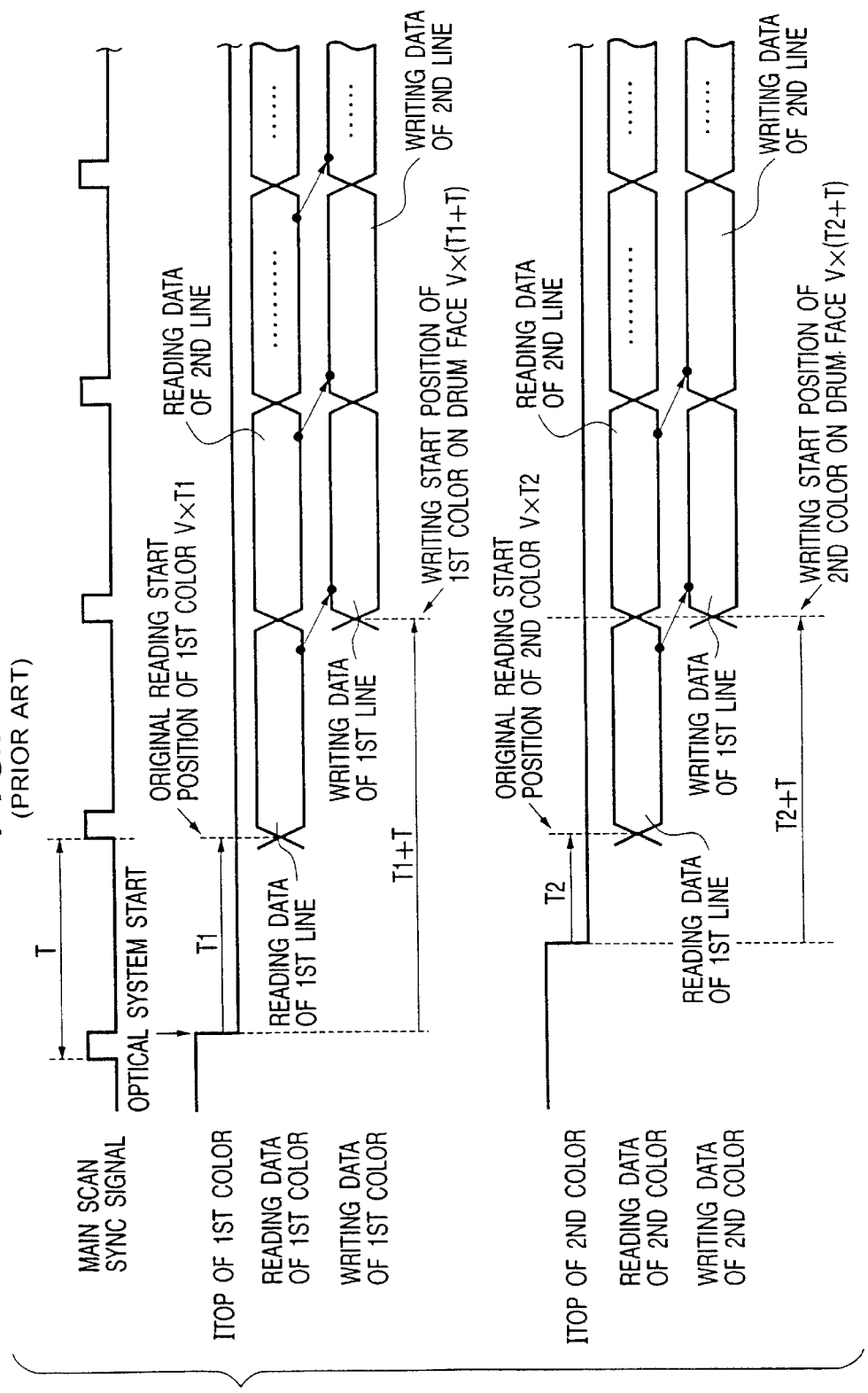
FIG. 14 is a timing chart for explaining the original reading timing for the conventional image forming apparatus.
Figure 16B:
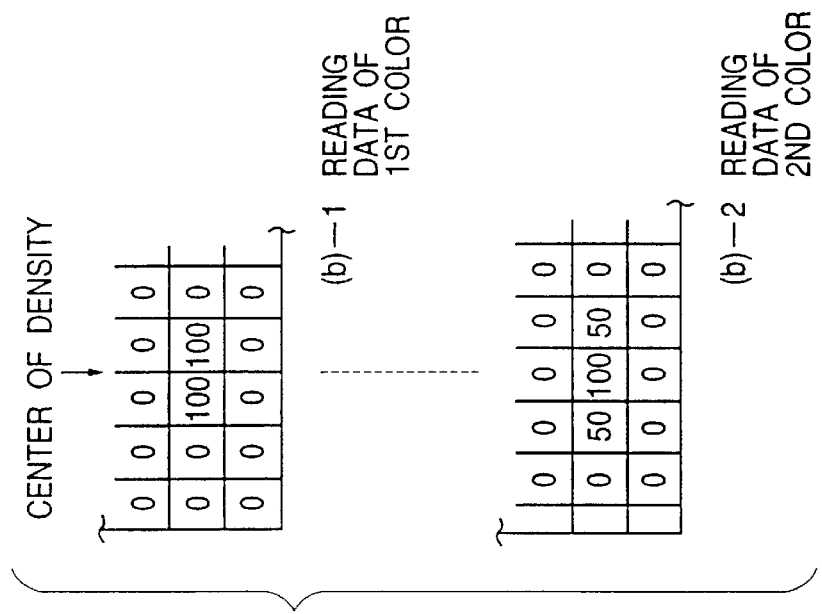
FIGS. 16A and 16B are diagrams showing the relationship between the line reading position on the original document and sampling.
Figure 16A:
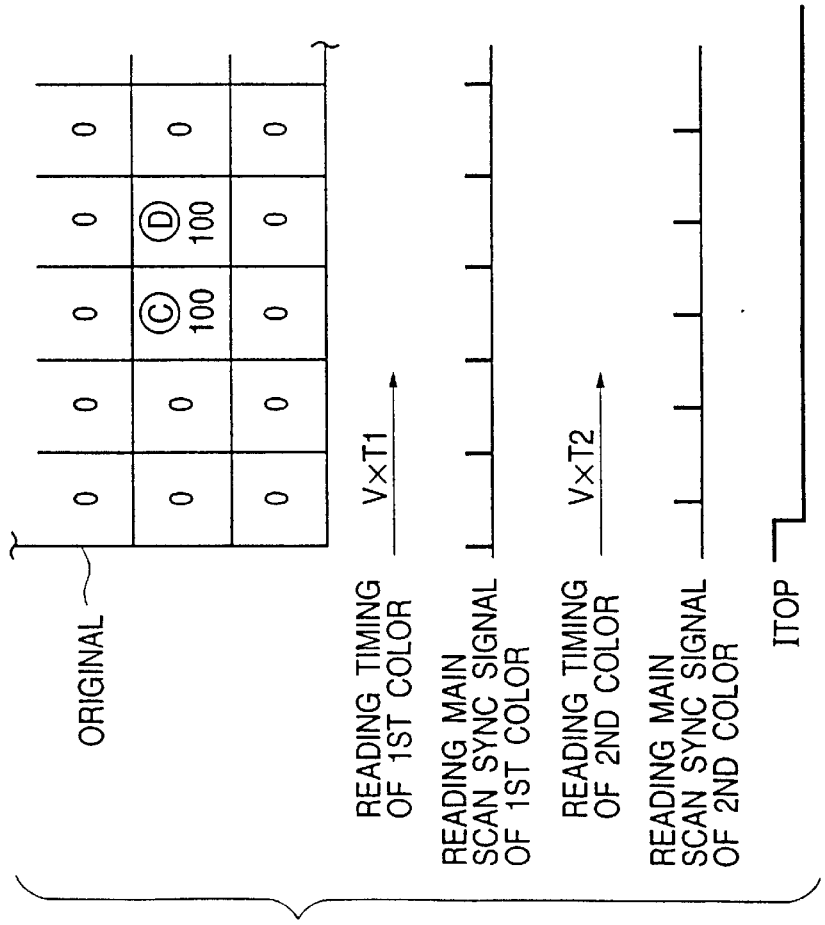

FIG. 11 is a specific diagram showing the relationship between the actual main scan line (the main scan start reference signal) and the ITOP signal (the sub-scan start reference signal) on the photosensitive drum 105 in FIG. 10. The same reference numerals as are used in FIG. 10 are also used to denote corresponding components in FIG. 11.

As shown in FIG. 11, the photosensitive drum 105 is rotated once n+½ main scan lines. Each time the photosensitive drum 105 is rotated, the ITOP sensor 1115 generates a sub-scan start reference signal (an ITOP signal) at a predetermined position.

With this arrangement, since n+½ main scan lines are generated during one revolution of the photosensitive drum 105, as shown in FIG. 4A, the first line in the second rotation is shifted ½ line away from the first line in the first rotation.

However, the phase matching circuit 1112 in FIG. 10 synchronizes the phase of the ITOP signal with the rotational phase of the polygon motor 106, which shifts the main scan line each time the ITOP signal (a sub-scan start reference signal) is generated. Therefore, no matter how many times the photosensitive drum 105 is rotated, the position of the first line can be matched each time an ITOP signal is generated.

So long as the phase difference in the ITOP signal and the BD signal is constant, the present invention can be applied to the other arrangement.

In the above embodiments, the original document is scanned as the halogen lamp 205 and the mirror 206 are moved at a speed V by an optical motor (not shown). However, to scan the original document, the document itself may be moved in synchronization with an ITOP signal.

As described above, in a system that controls either the polygon mirror 103 or the photosensitive drum 105, or both, so as to match the phases of a main scan start reference signal (a BD signal) and the sub-scan start reference signal (an ITOP signal), the optical system is driven in accordance with the ITOP signal, while the CCD 210 initiates line reading and the printer begins line writing in accordance with the BD signal. Therefore, the phase relationship between the ITOP signal and the BD signal is not changed however often the photosensitive drum is rotated. Thus, when the optical system is started upon the receipt of the sub-scan start reference signal, and the line sensor starts line reading and recording in synchronization with the BD signal, the MTF for reading each color component can be matched, and a satisfactory image can be obtained.

(Fifth Embodiment)

The arrangement as shown in FIG. 1 is employed for a color image forming apparatus according to a fifth embodiment of the present invention.

Figure 17:
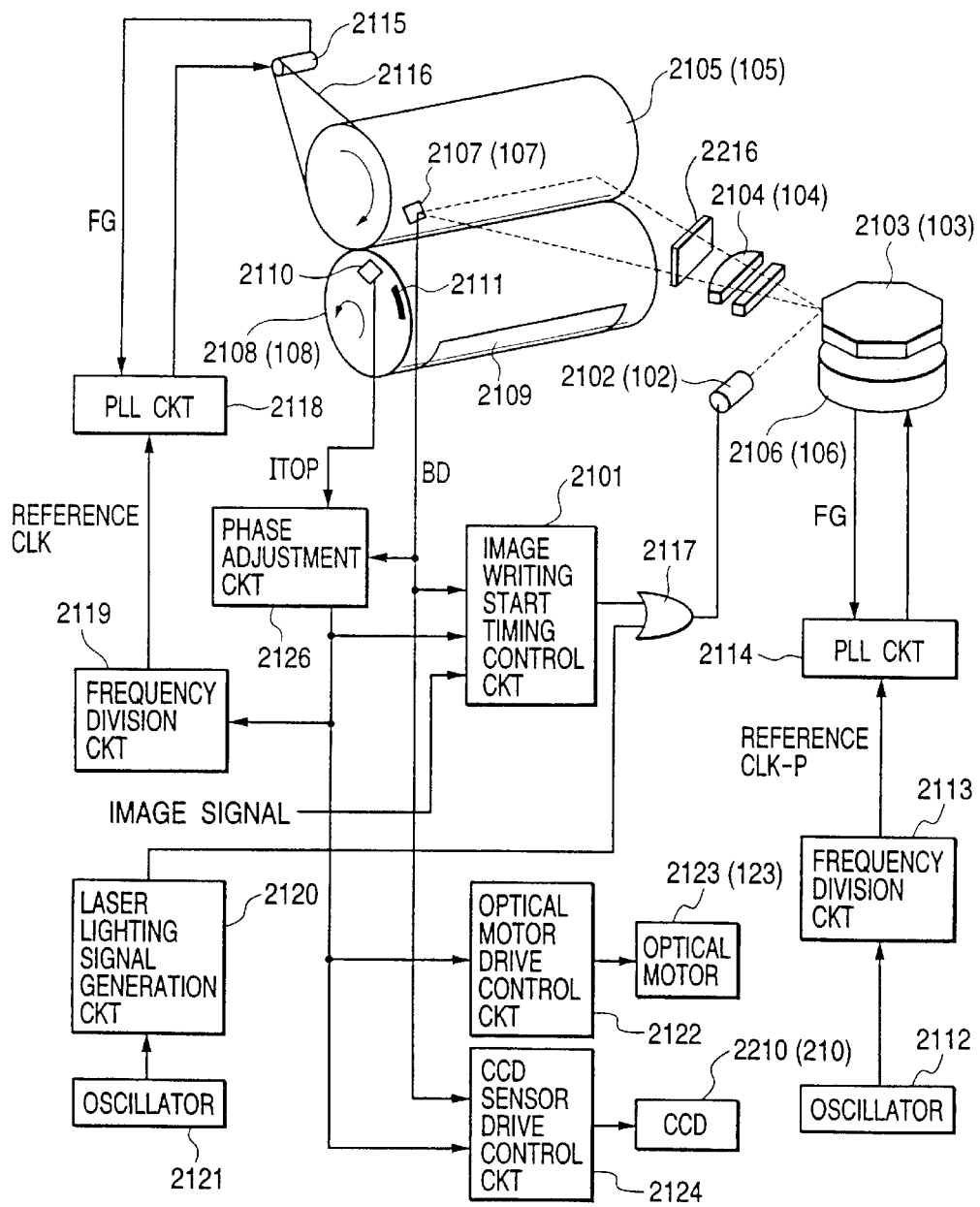
FIG. 17 is a diagram for explaining the arrangement for an image scanner and a printer unit in the color image forming apparatus in FIG. 1.

FIG. 17 is a diagram for explaining the arrangement of an image scanner 201 and a printer 200 in the color image forming apparatus in FIG. 1.

In FIG. 17, an oscillator 2112 outputs a clock having a predetermined frequency. A frequency division circuit 2113 divides a clock output from the oscillator 2112 at a predetermined frequency division ratio, and transmits a polygon motor drive pulse (reference CLK-P). In order to match the phases of the reference CLK-P and a motor FG pulse that is output as a polygon motor 2106 rotates, a PLL circuit 2114 exercises PLL control wherein the phase difference and frequency deviation are detected for the reference CLK-P and the motor FG pulse, and are compared to control a drive voltage for the polygon motor 2106.

An oscillator 2121 outputs a clock having a predetermined frequency. A laser lighting signal generation circuit 2120 receives a clock from the oscillator 2121, and outputs a laser lighting signal. And an OR gate 2117 receives an image signal from an image writing start timing control circuit 2101, or a laser lighting signal from the laser lighting signal generation circuit 2120, and outputs the received signal to a semiconductor laser 2102 to modulate the semiconductor laser 2102.

A frequency division circuit 2119 divides a BD signal received from a BD sensor at a predetermined frequency division ratio, and transmits a photosensitive drum motor drive pulse (reference CLK). And in order to match the phases of the reference CLK and a motor FG pulse that is output as a photosensitive drum motor 2115 rotates, a PLL circuit 2118 exercises PLL control, wherein the phase difference and frequency deviation are detected for the reference CLK and the motor FG pulse, and are compared to control a drive voltage for the photosensitive drum motor 2115.

In accordance with an instruction received from a controller (not shown), a phase adjustment circuit 2126 adjusts the phase of an ITOP signal output by a sensor 2110 to the phase of a BD signal output by the BD sensor 2107, and outputs the ITOP signal having the adjusted phase to the image writing start timing control circuit 2101, an optical motor drive control circuit 2122 and a CCD sensor drive control circuit 2124. The process performed by the phase adjustment circuit 2126 to adjust the phases of the ITOP signal and the BD signal will be described later.

The optical motor drive control circuit 2122 initiates the scanning of the original document by rotating an optical motor 2123 that, via a belt (not shown), drives an optical system, including the halogen lamp 205 and the mirrors 206 and 207 in FIG. 1.

The CCD drive control circuit 2124 controls the start of the CCD 2210.

Figure 18:
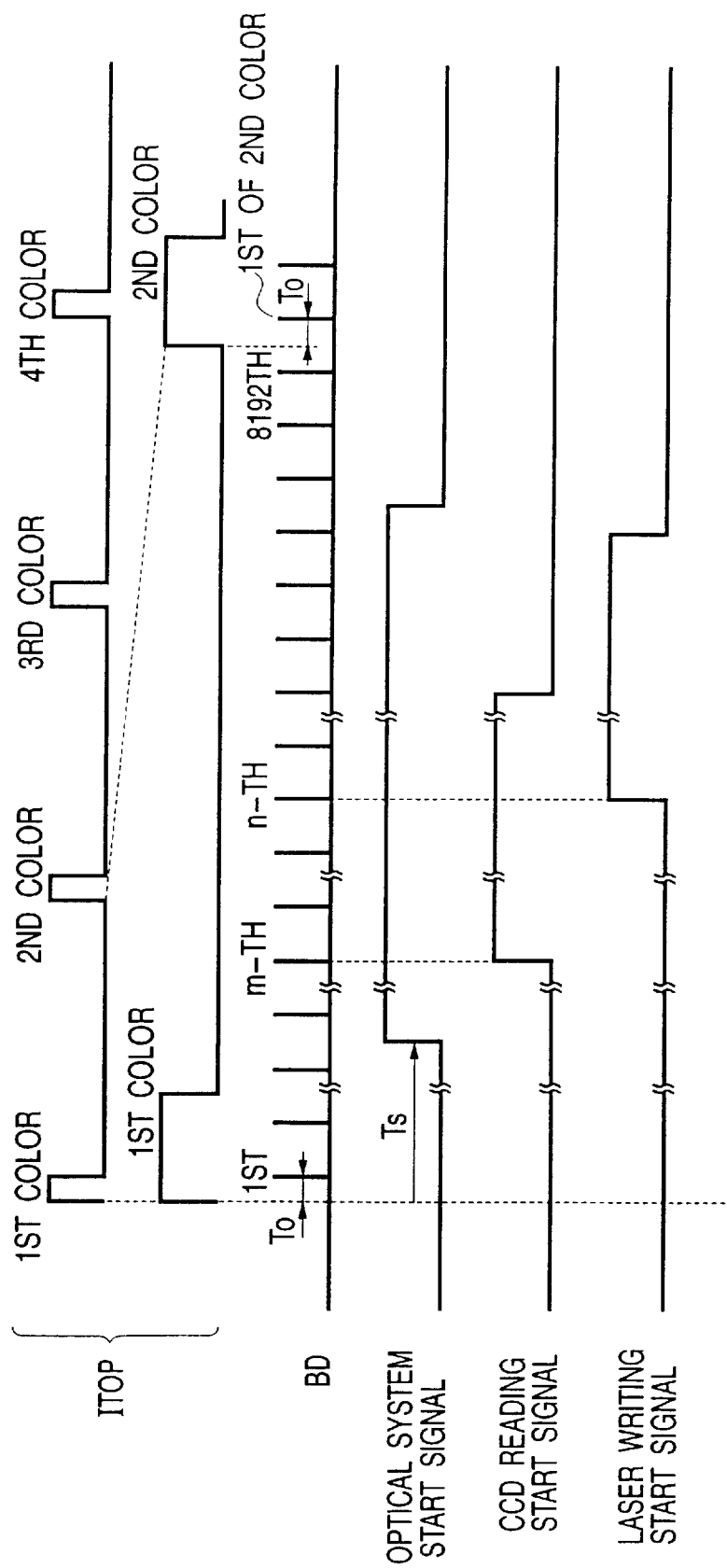
FIG. 18 is a timing chart for explaining the operation performed with the arrangement in FIGS. 1 and 17.

FIG. 18 is a timing chart for explaining the operation with the arrangement in FIG. 17. The operations of the individual sections in FIGS. 1 and 17 will be described while referring to FIG. 18.

An image signal input by the image scanner 201 in FIG. 1, or by an external apparatus, such as a computer, is transmitted to the image writing start timing control circuit 2101. The image writing start timing control circuit 2101 modulates the semiconductor laser 2102, via the OR gate 2117, in accordance with the received image signal for magenta (M), cyan (C), yellow (Y) or black (BK). The laser beam is reflected by the rotating polygon mirror 2103, and the reflected beam is corrected by the f-θ lens 2104. The corrected beam is reflected at a return mirror 2216, and the reflected light scans the photosensitive drum 2105. As a result, an electrostatic latent image is formed on the photosensitive drum 2105.

The frequency division circuit 2113 performs a frequency division for a clock from the oscillator 2112, and transmits the obtained polygon motor drive pulse (reference CLK-P) to the PLL circuit 2114, so that the polygon motor 2106 begins to rotate. In order to match the phases of the reference CLK-P and a motor FG pulse from the polygon motor 2106, the PLL circuit 2114 exercises PLL control wherein the phase difference and frequency deviation are detected for the reference CLK-P and the motor FG pulse, and are compared to control a drive voltage for the polygon motor 2106.

The BD sensor 2107, located near the line scan start position of the laser beam, detects the line scanning using the laser beam, and generates a line scan start signal (BD signal) having the same cycle as shown in FIG. 18, which will be described later.

As the transfer drum 2108 is rotated, the internal sensor 2110 detects a flag 2111 that is fixed inside the transfer drum 2108, and generates an ITOP signal (represents the position of the leading edge of the recording sheet 2109 held on the transfer drum 2108) for each color shown in FIG. 18, which will be described later.

Further, the frequency division circuit 2119 performs a frequency division for the BD signal received from the BD sensor 2107, and transmits the obtained motor drive pulse (reference CLK) to the PLL circuit 2118, so that the photosensitive drum motor 2115 begins to rotate.

In order to match the phases of the reference CLK and the motor FG pulse from the photosensitive drum motor 2115, the PLL circuit 2118 exercises PLL control, wherein the phase difference and frequency deviation are detected for the reference CLK and the motor FG pulse, and are compared to control a drive voltage for the photosensitive drum motor 2115. The photosensitive drum 2105 is rotated via the gear belt 2116, in the direction indicated by an arrow, by the photosensitive drum drive motor 2115. Since the transfer drum 2108 is coupled with the photosensitive drum 2105 via a set of gears (not shown), the transfer drum 2108 is rotated at an equal speed, in the direction indicated by an arrow (sub-scan direction), in synchronization with the drum 2105.

The BD signal from the BD sensor 2107 and the ITOP signal from the phase adjustment circuit 2126 are transmitted to the image writing start timing control circuit 2101, and an image signal is transmitted to the semiconductor laser 2102 at the following timing. That is, the image writing start timing control circuit 2101 initiates laser writing, as shown in FIG. 18, in synchronization with the leading edge of the n-th BD signal output by the BD sensor 2107 following the detection of the trailing edge of the ITOP signal output by the phase adjustment circuit 2126. Then, the image signal transmitted by the image scanner 201, or by an external apparatus, such as a computer, is transmitted as laser modulated light to the photosensitive drum 2105.

The ITOP signal output by the phase adjustment circuit 2126 is transmitted to the optical motor drive control circuit 2122. When time $T_s$ has elapsed following the receipt of the ITOP signal, as shown in FIG. 18, the optical motor drive control circuit 2122 begins to drive the optical motor 2123. Thus, the optical motor 2123 drives, via a belt (not shown), the optical system that includes the halogen lamp 205 and the mirrors 206 and 207, and starts the scanning of the original document.

Furthermore, the ITOP signal from the phase adjustment circuit 2126 and the BD signal from the BD sensor 2107 are transmitted to the CCD drive control circuit 2124. The CCD drive control circuit 2124 starts to drive the CCD 2210 in synchronization with the leading edge of the m-th BD signal received since the ITOP signal was received from the phase adjustment circuit 2126, as shown in FIG. 18. The CCD 2120 performs the photoelectric conversion of the original image that is introduced and formed by the optical system, and transmits the obtained image signal to the image writing start timing control circuit 2101.

As described above, when time $T_s$ has elapsed, as shown in FIG. 18, since the trailing edge of the ITOP signal was detected, the optical system, including the halogen lamp 205 and the mirrors 206 and 207, begins to be driven. In synchronization with the leading edge of the m-th BD signal received since the trailing edge of the ITOP signal was detected, the CCD 2210 performs a photoelectric conversion for each line of the original image that is scanned by the optical system, and transmits the obtained image signal to the image writing start timing control circuit 2101. Then, in synchronization with the leading edge of the n-th BD signal received since the trailing edge of the ITOP signal was detected, the image writing start timing control circuit 2101 employs, as laser modulated light, an image signal received from the image scanner 201 to irradiate the photosensitive drum 2105. Through this processing sequence, the driving of the optical system, the reading of the original document, and the recording, using a laser beam, of an image on the photosensitive drum are performed.

According to this invention, an integer number of BD signals are generated during one revolution of the photosensitive drum, so that each time the photosensitive drum is rotated, the laser scans the same position.

For example, in this embodiment, 8192 BD signals are generated during one revolution of the photosensitive drum, which is determined by the processing speed and the image resolution. A gear ratio is set at which the photosensitive drum motor rotates 64 times while the photosensitive drum rotates once. In addition, 32 FG pulses are generated during one revolution of the photosensitive drum motor. Then, since 32 pulses for the reference clock are required to rotate the photosensitive drum motor one time, 2048 (=64 revolutions×32) pulses for the reference clock are required to rotate the photosensitive drum one time.

In FIG. 17, since the frequency division circuit 2119 divides the BD signal received from the BD sensor 2107 by four, and transmits the obtained signal to the PLL circuit 2118 as the reference CLK for the photosensitive drum motor 2115, the photosensitive drum 2105 is fully rotated once upon the generation of 8192 BD signals. It should be noted that the gear ratio is set as a natural number. This is done because, since the photosensitive drum motor 2115 and reduction gears (not shown) are driven an integer number of revolutions, while the photosensitive drum 105 is rotated once, the same effects provided by the eccentricities of the shaft of the photosensitive drum motor 2115 and of the reduction gears are provided for each rotation of the photosensitive drum 105, and because the shifting of the phases between the rotation of the photosensitive drum and the generated BD signal due to the eccentricities is prevented.

With the above arrangement, the scan line, produced using the laser beam, that is formed on the photosensitive drum in synchronization with the first scan stat signal (first BD signal) during the first rotation of the photosensitive drum is matched with the scan line, produced using the laser beam, that is formed on the photosensitive drum in synchronization with the first scan start signal during the second rotation of the photosensitive drum. Thus, the positions of the scan lines that are formed each time the photosensitive drum is rotated are matched without any shifting.

An explanation will now be given for the processing performed by the phase adjustment circuit of the color image forming apparatus in this embodiment when adjusting the phases of the ITOP signal and the BD signal.

Figure 19:
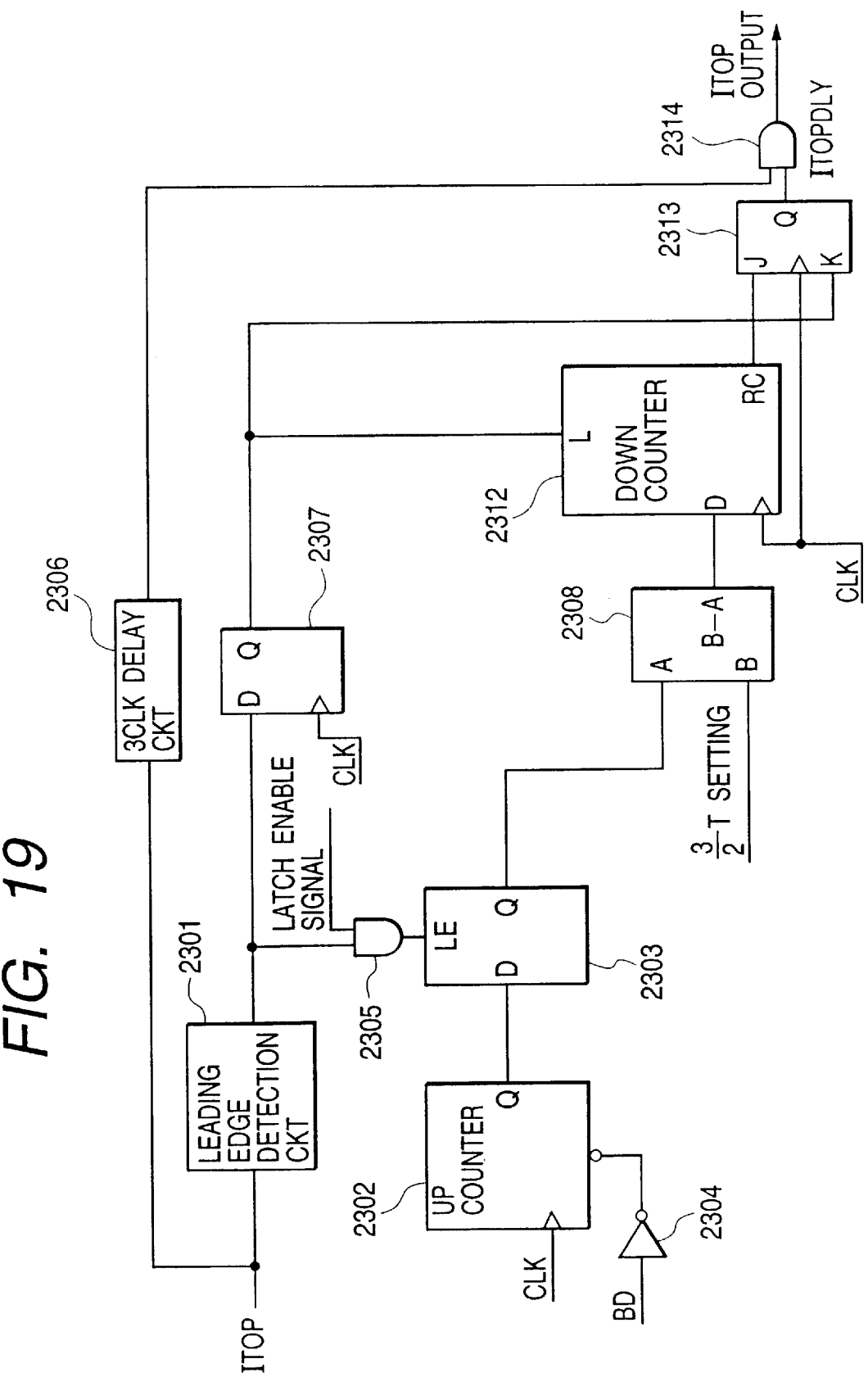
FIG. 19 is a diagram showing a specific arrangement for a phase adjustment circuit according to the first embodiment of the present invention.
Figure 20:
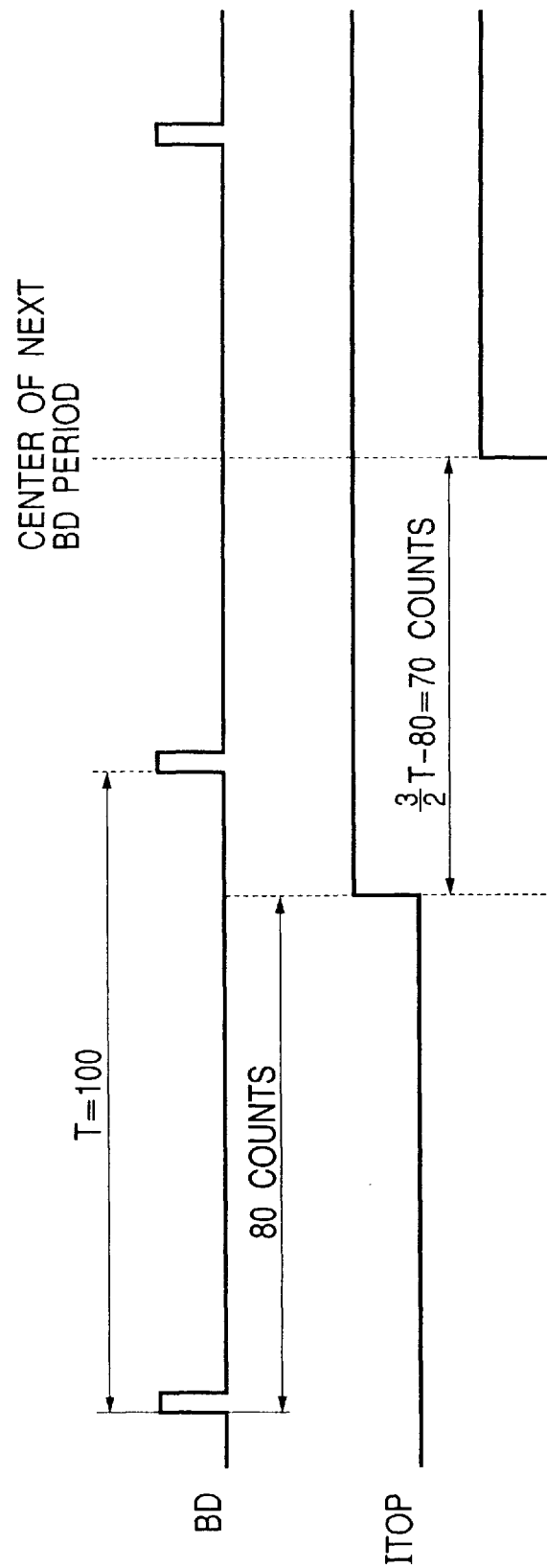
FIG. 20 is a timing chart for explaining the operation performed by the arrangement in FIG. 19.
Figure 21:
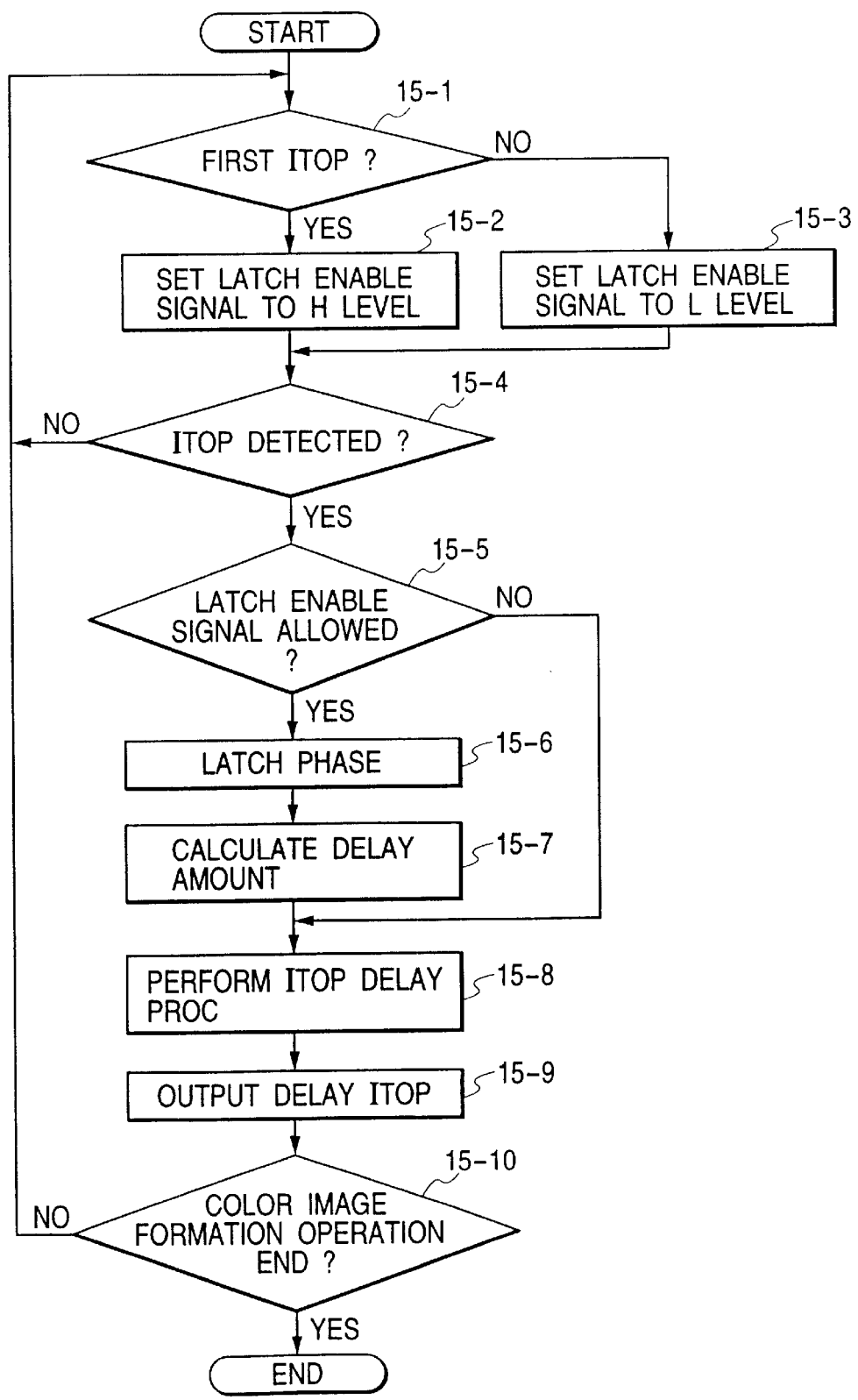
FIG. 21 is a flow chart for explaining the operation performed by the arrangement in FIG. 19.

FIG. 19 is a diagram showing a specific arrangement for the phase adjustment circuit 2126 in this embodiment, FIG. 20 is a timing chart for the operation of the phase adjustment circuit, and FIG. 21 is a flow chart for that operation. The phase adjustment processing for the ITOP signal and the BD signal will be described while referring to these drawings.

In FIG. 19, a leading edge detection circuit 2301 detects the leading edge of an ITOP signal, which is supplied by the sensor 2110 provided in the transfer drum 2108. An up counter 2302 is a free-run counter, the count value of which is cleared each time a BD signal 2304 is received from the BD sensor 2107. The count value held by the up counter 2302 is used as a cycle for the generation of a BD signal. At the output timing of the leading edge detection circuit 2301, a latch circuit 2303 latches the count value output by the up counter 2302. Count data that represent the latched count value are transmitted to a succeeding subtraction circuit 2308 as data representing the time in the BD signal generation cycle required before the leading edge of the ITOP signal is detected (data indicating the phase difference between the leading edge timing of the ITOP signal and the BD signal).

The output of the leading edge detection circuit 2301 and a latch enable signal produced by a controller (CPU) (not shown) are transmitted to an AND gate 2305, and the output of the AND gate 2305 is transmitted to the latch enable terminal LE of the latch circuit 2303. In a period during which the latch enable signal is at level L, the count value of the up counter 2302 is not latched, even when the leading edge of the ITOP signal is detected.

The count data latched by the latch circuit 2303 are transmitted to the subtraction circuit 2308. The subtraction circuit 2308 subtracts the count value represented by the count data from a value that is set by the CPU (not shown) (in this embodiment, a count value that represents the BD signal generation cycle (a well known numerical value that is uniformly determined by the processing speed of the apparatus and the image resolution)). The subtraction results are employed as data indicating a delay extending from the time the leading edge of the ITOP signal was detected until the center of the generation cycle for the next BD signal is reached. The obtained data are transmitted to the data terminal D of a down counter 2312 at the following stage. As shown in FIG. 20, assuming that the count value T for the BD signal generation cycle is "100" and the count value held by the up counter 2302 is "80", the leading edge of the ITOP signal is detected by the leading edge detection circuit 2301. Then, the ITOP signal is delayed a period of time equivalent to a count value of "70" (=3T/2−80), so that the generation of the ITOP signal can be adjusted in the center of the BD generation cycle.

A flip-flop 2307 synchronizes the output of the leading edge detection circuit 2301 with the reference clock CLK, and transmits them to the load terminal L of the down counter 2312. At the timing provided for the output by the flip-flop 2307, the down counter 2312 loads data from the subtraction circuit 2308. In synchronization with the reference clock CLK, the down counter starts decrementing the count value that is indicated by the received count data, and when the count value reaches 0, outputs, at the output terminal RC, the count end signal to a J-K flip-fop 2313 at the following stage. The period during which the count value is decremented by the down counter 2312 corresponds to a delay time allocated for the ITOP signal in order to adjust the phases of the ITOP signal and the BD signal, which will be described later.

The J-K flip-flop 2313 is operated in synchronization with the reference clock CLK, and is reset in accordance with the output timing for the flip-flop 2307 (i.e., the leading edge of the ITOP signal). An ITOPDLY signal at level L is output by the output terminal Q, and is maintained at level L until it is reset in consonance with the output timing for the down counter 2312. That is, the ITOPDLY signal is maintained at level L for a period that continues until a delay time calculated from the leading edge of the ITOP signal has elapsed.

The ITOP signal is delayed a predetermined time (a time equivalent to three reference clocks CLK) by a 3CLK delay circuit 2306 in order to adjust the phases of the ITOP signal and the BD signal. The ITOPDLY signal from the J-K flip—flip 2313, and the delayed ITOP signal are output via an AND gate 2314, so that the ITOP signal can be generated in the center of the BD generation cycle.

In this embodiment, during the first revolution of the photosensitive drum, a latch enable signal is set to level H by a CPU (not shown); the phase difference between the BD signal and the ITOP signal is detected; and the time for the ITOP signal delay is set so that the ITOP signal is generated in the center of the BD signal generation cycle. For the second and following revolutions, the latch enable signal is set to level L, and the delay time for the ITOP signal that was determined for the first rotation is maintained. Thus, during the first rotation of the photosensitive drum, the ITOP signal is so adjusted that it is generated in the center of the BD signal generation cycle, and in the second and following rotations, the phase difference between the ITOP signal and the BD signal is maintained. Therefore, a change in the phase difference occurs only due to a change in the rotational accuracy of the drum motor 2115.

The processing performed by the phase adjustment circuit 2126 in FIG. 19 will now be described while referring to the flow chart in FIG. 21.

In FIG. 21, when the image forming process sequence is initiated, a CPU (not shown) determines whether a current ITOP signal is the first signal generated by the sensor 2110 in FIG. 17 since the rotation of the photosensitive drum 2105 was initiated (15-1 in FIG. 21). When the current ITOP signal is not the first generated signal, the latch enable signal is set to level L (15-2). When the current ITOP signal is the first one, the latch enable signal is set to level H (15-3).

When the leading edge of the ITOP signal is detected by the leading edge detection circuit 2301 in FIG. 19 (15-4), the state of the latch enable signal is examined (15-5). When the latch enable signal is in the disabled state (i.e., level L), program control moves to 15-8. If the latch enable signal is in the enabled state (level H), the latch circuit 2303 in FIG. 19 latches data that indicates a period in the BD signal generation cycle that is required before the leading edge of the ITOP signal can be detected (15-6). Then, the subtraction circuit 2308 in FIG. 19 subtracts the count value indicated by the latched count data from a value that is set by the CPU, for example, 3T/2, where T denotes a count value that represents the BD signal generation cycle (a well known numerical value that is uniformly determined by the processing speed of the apparatus and the image resolution). The data obtained by the subtraction operation are defined as a delay value for the ITOP signal (15-7).

The data that are obtained at 15-7 in FIG. 17 to represent the delay for ITOP signal are loaded into the down counter 2312 in FIG. 19. Based on this data, the ITOP signal is delayed and is output by the phase adjustment circuit 2126 (15-8 and 15-9). That is, when the latch enable signal is in the disabled state, the ITOP signal is delayed based on a delay value that has already been set, and then the resultant ITOP signal is output.

The above process is repeated until the image forming process sequence is terminated (15-10).

An explanation will now be given while referring to FIG. 22 for another operation for adjusting the phases of an ITOP signal and a BD signal.

Figure 22:
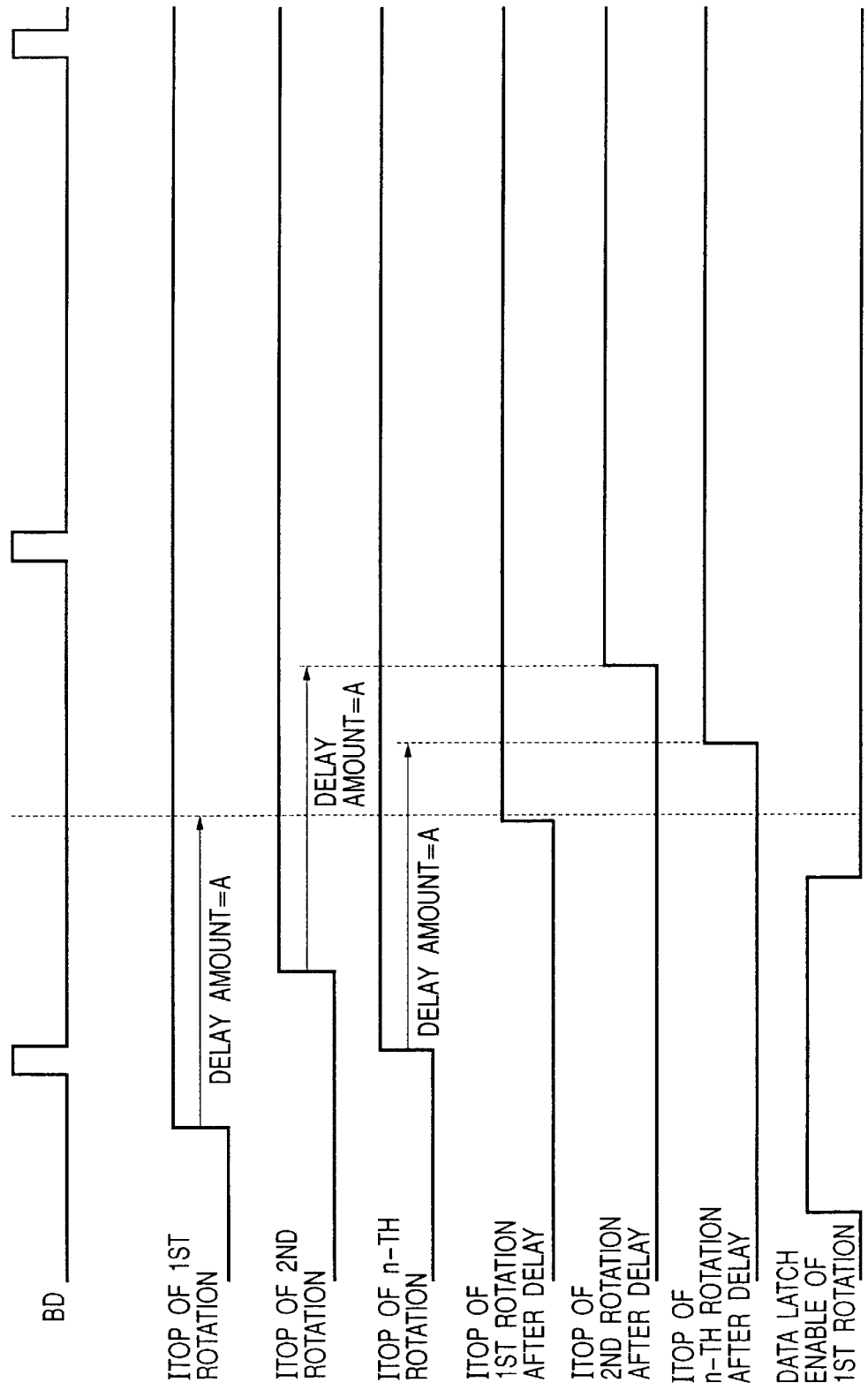
FIG. 22 is a timing chart for explaining another operation performed by the arrangement in FIG. 19.

FIG. 22 is a timing chart for the phase adjustment circuit 2126 in FIG. 19 when a CPU (not shown) sets a latch enable signal to level H before the first BD signal is generated during the first rotation of the photosensitive drum, so that the leading edge of the ITOP signal can be detected even when it is generated before the first BD signal that is generated during-the first revolution of the photosensitive drum.

As shown in FIG. 22, when the color image forming process is initiated, the CPU sets the latch enable signal to level H before the first BD signal is generated during the first revolution of the photosensitive drum. A delay time A for the ITOP signal is calculated during a period wherein the latch enable signal is at level H, and the phase adjustment circuit 2126 outputs an ITOP signal that was generated during the first rotation and that was delayed based on the obtained delay time A. The method for calculating the delay time for the ITOP signal is the same as the one used in the previous embodiments in FIGS. 20 and 21, and no further explanation for it will be given.

As shown in FIG. 22, the ITOP signal is generated during the second rotation of the photosensitive drum, a little after the generation of the first BD signal during that rotation. At this time, since the latch enable signal was set to level L by the CPU, the delay time for the ITOP signal generated during the second rotation is not calculated. The phase adjustment circuit 2126 outputs the ITOP signal that was delayed during the second rotation based on the delay time A, which has been calculated and maintained.

Similarly for the n-th rotation of the photosensitive drum, the phase adjustment circuit 2126 outputs an ITOP signal for the n-th rotation that is delayed based on the delay time A that was obtained for the first rotation.

As described above, in this embodiment, even if the leading timing for the ITOP signal, which is generated during each rotation of the photosensitive drum, is varied before and after the generation of the first BD signal during each rotation, the phase difference between the ITOP signal and the BD signal is calculated for the first rotation of the drum, and the ITOP signal generated during each rotation is delayed based on a delay time that is set in accordance with the obtained phase difference. Therefore, for each revolution of the photosensitive drum, the ITOP signal can be generated in the center of the BD signal generation cycle, instead of near the time at which the BD signal is generated. As a result, error allowance relative to the fluctuation of the rotation of the photosensitive drum (i.e., the fluctuation due to the uneven rotation of the drum motor) can be improved. Further, since the rotational precision of the mechanism for driving the drum motor and the photosensitive drum is increased, shifting can be reduced between the field image that is formed during the first rotation of the photosensitive drum and the field images formed during the following rotations, and image quality can be increased. In addition, the ITOP signal whose phase is adjusted is employed to initiate the writing of field images for individual colors on the photosensitive drum. Thus, the phase difference between the ITOP signal and the BD signal is constant for each revolution, and the writing start positions of the field images for the first to the n-th color can be matched exactly. As a result, a high-quality color image with no color shifting can be formed.

Furthermore, the control is exercised not only for the writing of individual color field images on the photosensitive drum based on the phase-adjusted ITOP signal, but also for the scanning of the original document using the optical system in the image scanner and for reading the original document by using the CCD. Therefore, the original document reading positions for the first to the n-th colors can be exactly matched with the writing positions for field images on the photosensitive drum. Further, the difference of the MTF for individual color images can be reduced, and color images can be formed for which there is no deterioration of the quality due to color blurring and erroneous edge determination.

(Sixth Embodiment)

As a method for synchronizing the rotation of the photosensitive drum with the rotation of the polygon mirror, an integer number of main scan recording lines can be formed on the photosensitive drum during one revolution of the photosensitive drum, and the common clock can be employed as a reference clock for the photosensitive drum motor that drives the photosensitive drum and as a reference clock for the polygon motor that drives the polygon mirror. With this arrangement, the same effects as in the first embodiment can be obtained.

(Seventh Embodiment)

As a method for synchronizing the rotation of the photosensitive drum with the rotation of the polygon mirror, the phase of the detected main scan start signal (BD signal) can be adjusted so it corresponds to the phase of the sub-scan start signal (ITOP signal) each time the ITOP signal is generated as the photosensitive drum is rotated. With this arrangement, the same effects as in the first embodiment can be obtained.

(Eighth Embodiment)

Further, assume that the present invention is applied for an apparatus that forms a plurality of field images on the photosensitive drum while the drum is rotated once, and generates a plurality of sub-scan start signals (ITOP signals). The delay time is calculated for each of the ITOP signals that are generated during one revolution of the drum, and each ITOP signal is delayed in accordance with the obtained delay time. The ITOP signal whose phase is synchronized with the phase of the BD signal using the method in the first embodiment is employed as a reference to begin the original document scanning by the optical system in the image scanner, the reading operation by the CCD, and the scanning of the photosensitive drum using the laser based on the original image signal that is read by the image scanner. With this arrangement, for a color image forming apparatus that forms a plurality of latent images and transfers them to the sheet during one revolution of the photosensitive drum, the original reading positions for the first to the n-th colors can be exactly matched with the writing positions of the field images. Further, the difference in the MTF of the images for individual colors can be reduced, and color images can be formed for which there is no deterioration of the quality due to color blurring and erroneous edge determination.

(Ninth Embodiment)

Figure 23:
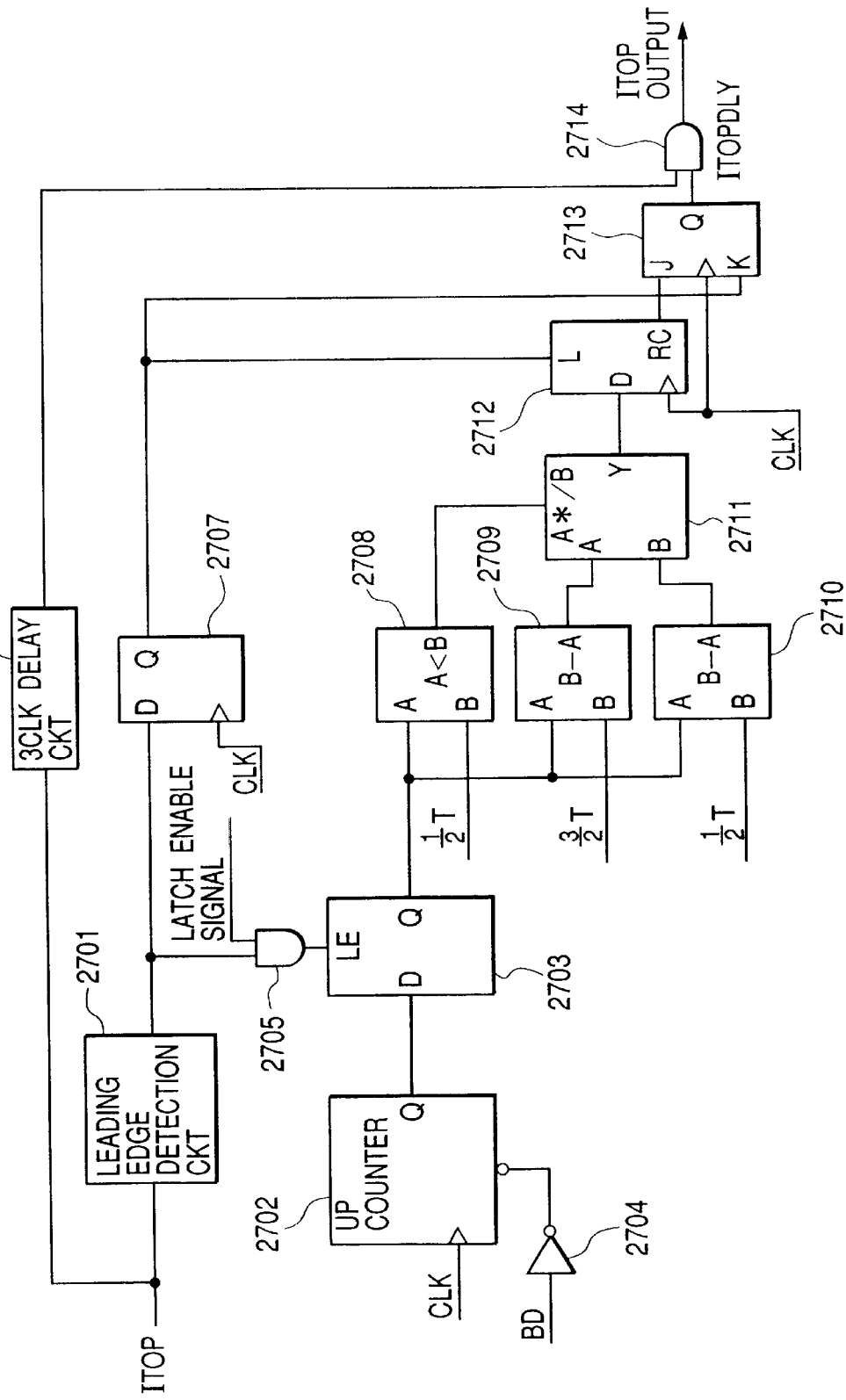
FIG. 23 is a diagram showing a specific arrangement for a phased adjustment circuit according to a ninth embodiment of the present invention.

FIG. 23 is a diagram showing a specific arrangement for a phase adjustment circuit 2126 for a ninth embodiment, and the phase adjustment process for an ITOP signal and a BD signal for this embodiment will now be described.

In FIG. 23, a leading edge detection circuit 2701 detects the leading edge of an ITOP signal that is received from a sensor 2110 provided in a transfer drum 2108. An up counter 2702 is a free-run counter for which the count value it holds is cleared each time a BD signal 2704 is received from a BD sensor 2107. The count value held by the up counter 2702 is employed as a generation cycle for a BD signal. At the output timing for the leading edge detection circuit 2701, a latch circuit 2703 latches a count value from the up counter 2702. The count data that represent the latched count value are transmitted to a comparator 2708, a first subtraction circuit 2709 and a second subtraction circuit 2710 as data representing the period in the BD signal generation cycle that is required before the leading edge of the ITOP signal can be detected (i.e., data that represent the phase difference between the leading timing for the ITOP signal and for the BD signal).

The output of the leading edge detection circuit 2701 and a latch enable signal that is set by a not-shown controller (CPU) are transmitted to an AND gate 2705, and the output of the AND gate 2705 is transmitted to the latch enable terminal LE of the latch circuit 2703. During the period in which the latch enable signal is at level L, the count value of the up counter 2702 is not latched, even when the leading edge of the ITOP signal is detected.

The count data latched by the latch circuit 2703 are transmitted to the comparator 2708, the first subtraction circuit 2709 and the second subtraction circuit 2710.

The comparator 2708 compares the count value represented by the count data with a value that is set by the CPU, i.e., in this embodiment, T/2 where T denotes a count value that represents a BD signal generation cycle (a well known numerical value that is uniformly determined by the processing speed of the apparatus and the image resolution). When the count value indicated by the count data is equal to or smaller than the value set by the CPU, the comparator 2708 outputs a signal at level H. When the count value is greater, the comparator 2708 outputs a signal at level L. That is, when a signal of level H is output by the comparator 2708, it is assumed that the leading edge of the ITOP signal was detected at a time prior to or at the center of the BD generation cycle. When a signal at level L is output, it is assumed that the leading edge of the ITOP signal was detected at a time after the center of the BD generation cycle.

The first subtraction circuit 2709 subtracts the count value represented by the count data from a value that is set by the CPU, i.e., in this embodiment, 3T/2, where T denotes a count value representing a BD signal generation cycle (a well known numerical value that is uniformly determined by the processing speed of the apparatus and the image resolution). When the leading edge of the ITOP signal is detected at a time after the center of the BD generation cycle, the subtraction results are employed as data representing a delay time extending from the detection of the leading edge of the ITOP signal until the center of the generation cycle of the next BD signal is reached. When, for example, the leading edge of the ITOP signal is detected by the leading edge detection circuit 2701 while the count value T of the BD signal generation cycle is "100" and the count value held by the up counter 2702 is "80", the ITOP signal is delayed by a time equivalent to "70" (=3T/2−80). As a result, the generation time for the ITOP signal can be adjusted to the center of the BD signal generation cycle.

The second subtraction circuit 2710 subtracts the count value represented by the count data from a value that is set by the CPU, i.e., in this embodiment, T/2, where T denotes a count value that represents a BD signal generation cycle (a well known numerical value that is uniformly determined by the processing speed of the apparatus and the image resolution). When the leading edge of the ITOP signal is detected at a time prior to or at the center of the BD generation cycle, the subtraction results are employed as data representing a delay time extending from the detection of the leading edge of the ITOP to the center of the generation cycle of the next BD signal.

The outputs of the first and the second subtraction circuits 2709 and 2710 are transmitted to a selector 2711. The selector 2711 employs the output of the comparator 2708 to select one of the outputs of the first and the second subtraction circuits 2709 and 2710, and outputs the selected data to the data terminal D of a down counter 2712. Specifically, when the signal from the comparator 2708 is at level L, i.e., when the leading edge of the ITOP signal is detected at a time after the center of the BD signal generation cycle, the output of the first subtraction circuit 2709 is selected and transmitted to the data terminal D of the down counter 2712. When the signal from the comparator 2708 is at level H, i.e., when the leading edge of the ITOP signal is detected at a time prior to or at the center of the BD signal generation cycle, the output of the second subtraction circuit 2710 is selected and transmitted to the terminal D.

An explanation will now be given for a difference between the phase adjustment process for the ITOP signal and the BD signal when the leading edge of the ITOP signal is detected at a time prior to the center of the BD signal generation cycle, and when the leading edge of the ITOP signal is detected at a time after the center of the BD signal generation cycle, with reference to FIGS. 24A and 24B.

FIG. 24A is a diagram showing an example where the leading edge of the ITOP signal is detected in the first half of the BD signal generation cycle. Since a phase difference period indicated by A exists between the leading edge of the ITOP signal and the BD signal, and since A<(T/2), wherein T is a BD signal generation cycle, it is assumed that the leading edge of the ITOP signal was detected in the first half of the BD signal generation cycle. In addition, since the half period of the generation cycle has not yet elapsed at this time, the detection signal for the leading edge of the ITOP signal is delayed a time (T/2−A). As a result, the detection timing for the leading edge of the ITOP signal can be adjusted to the center of the pertinent BD signal generation cycle.

FIG. 24B is a diagram showing an example wherein the leading edge of the ITOP signal is detected in the second half of the BD signal generation cycle. Since a phase difference period indicated by B exists between the leading edge of the ITOP signal and the BD signal, and since B>(T/2), wherein T is a BD signal generation cycle, it is assumed that the leading edge of the ITOP signal was detected in the second half of the BD signal generation cycle. In addition, since the half period of the generation cycle has elapsed at this time, the detection signal of the leading edge of the ITOP signal is delayed a time (3T/2−B). As a result, the detection timing of the leading edge of the ITOP signal can be adjusted to the center of the next BD signal generation cycle.

As described above, when the leading edge of the ITOP signal is detected in the first half of the BD signal generation cycle, based on the delay time that is set in accordance with the phase difference, the timing for the detection signal for the leading edge of the ITOP signal is delayed until the center of the pertinent BD signal generation cycle is reached. When the leading edge of the ITOP signal is detected in the second half of the BD signal generation cycle, based on the delay time that is set in accordance with the phase difference, the timing for the detection signal of the leading edge of the ITOP signal is delayed until the center of the next BD signal generation cycle is reached. Since the detection timing for the leading edge of the ITOP signal is matched with the center of the BD signal generation cycle, the phase difference between the ITOP signal and the BD signal can be adjusted within a short period of time, and the possibility that details will be missing in field images that are formed can be minimized.

The output of the leading edge detection circuit 2701 is synchronized with the reference clock CLK by a flip-flop 2707, and together they are transmitted to the load terminal L of the down counter 2712. At the output timing for the flip-flop 2707, the down counter 2712 loads data from the selector 2711, and, in synchronization with the reference clock CLK, begins to decrement the count value indicated by the received data. When the count value reaches 0, the count end signal is output by the output terminal RC to a J-K flip-flop 2713 at the succeeding stage. The period during which the count value is being decremented by the down counter 2712 corresponds to a delay time for the ITOP signal for adjusting the phases of the ITOP signal and the BD signal, which will be described later.

The J-K flip-flop 2713 is operated in synchronization with the reference clock CLK, and is reset at the output timing for the flip-flop 2707, i.e., at the leading edge of the ITOP signal. An ITOPDLY signal output by the output terminal Q is set to level L, and the level L state is maintained until it is reset to the output timing for the down counter 2712. That is, the ITOPDLY signal is maintained at level L until the delay time following the leading edge of the ITOP signal has elapsed.

In order to adjust the phases of the ITOP signal and the BD signal, the ITOP signal is delayed a predetermined period of time (in this embodiment, a time equivalent to three reference clocks CLK) by a 3CLK delay circuit 2706. The delayed ITOP signal and the ITOPDLY signal output by the J-K flip-flop 2713 are output via an AND gate 2714. As a result, the generation time for the ITOP signal can be adjusted to the center of the BD signal generation cycle.

As described above, according to this embodiment, when, during the first revolution of the photosensitive drum, the leading edge of the ITOP signal is detected in the first half of the BD signal generation cycle, based on a delay time that is set in accordance with the phase difference, the timing for an ITOP signal generated each rotation is delayed to the center of the pertinent BD signal generation cycle. When the leading edge of the ITOP signal is detected in the second half of the BD signal generation cycle, based on a delay time that is set in accordance with the phase difference, the timing for the ITOP signal is delayed to the center of the next BD signal generation cycle. Therefore, the phase difference between the ITOP signal and the BD signal can be adjusted within a short period of time, and the occurrence of missing details in the field images that are formed can be minimized. Further, the position on the photosensitive drum that the laser beam scans first, in accordance with a BD signal that is first detected during the second and following revolutions of the photosensitive drum, can be superimposed on the position on the photosensitive drum that the laser beam first scans in accordance with a BD signal that is first detected during the first rotation of the photosensitive drum.

Furthermore, in this embodiment, the fluctuation in the timing at which an ITOP signal is generated during each revolution of the photosensitive drum can be adjusted so it is not near the time for the generation of a BD signal, but is in the center of a BD signal generation cycle. Therefore, the error allowance can be increased relative to the variance of the rotation of the photosensitive drum (i.e., a change due to uneven revolutions of the drum motor). Further, since the rotational precision of the mechanism for driving the drum motor and the photosensitive drum is increased, the shifting between the field image that is formed during the first rotation of the photosensitive drum and the field images that are formed during the following rotations can be reduced, and image quality can be improved. In addition, the ITOP signal whose phase is adjusted is employed to initiate the writing of field images for individual colors on the photosensitive drum. Thus, the phase difference between the ITOP signal and the BD signal is constant for each revolution, and the writing start positions of the field images for the first to the n-th colors can be matched exactly. As a result, high-quality color images with no color shifting can be formed.

Furthermore, the control is exercised not only for the writing of individual color field images on the photosensitive drum based on the phase-adjusted ITOP signal, but also for the scanning of the original document using the optical system in the image scanner and for the reading of the original document using the CCD. Therefore, the original document reading positions for the first to the n-th colors can be exactly matched with the writing positions for the field images on the photosensitive drum. Further, the difference in the MTF for individual color images can be reduced, and color images can be formed for which there is no deterioration of the quality due to color blurring and erroneous edge determination.

(Tenth Embodiment)

An explanation will now be given for the phase adjustment process for an ITOP signal and a BD signal when the phase difference between these two signals is equal to or less than 1/3 of the BD signal generation cycle.

FIG. 25A is a diagram showing the phase relationship between an ITOP signal and a BD signal.

First, when during the first rotation of the photosensitive drum an ITOP signal is detected at a timing (1), the leading edge of the ITOP signal is detected a little after the timing at which the first BD signal is generated. The phase difference between the ITOP signal and the BD signal is a period indicated by A in FIG. 25A. If, in the second and the following revolutions, the detection timing of the leading edge of an ITOP signal is shifted away from the generation timing for the first BD signal a maximum 1/3 of a BD signal generation cycle T, the leading edge of the ITOP signal during the second and the following revolutions occurs at an arbitrary timing within a range extending from T/3 before to T/3 after the ITOP signal detection timing during the first revolution (i.e., within a period indicated by B). Since the phase difference A between the ITOP signal detection timing in the first rotation and the generation timing for the first BD signal is smaller than the period T/3, the ITOP signal detection timing for the first revolution and the ITOP signal detection timing for the following revolution may occur with the BD signal BD1 positioned between them. Assuming that the detection timings for the leading edge of the ITOP signal in the first revolution and the following revolutions occur with the BD signal BD1 positioned between them, for the first revolution, the laser beam begins to scan the photosensitive drum in accordance with the detection timing for the BD signal BD2, while for the second and following revolutions, the laser beam scans the photosensitive drum in accordance with the detection timing for the BD signal BD1. Therefore, although the phase difference between the detection timing for the leading edge of the ITOP signal and the generation timing for the first BD signal is equal to or smaller than 1/3 of the BD signal generation cycle, the individual field images formed on the photosensitive drum are shifted a maximum distance that is equivalent to the BD signal generation cycle T, i.e., a distance equivalent to one scan line of the laser beam.

Similarly, when during the first rotation of the photosensitive drum the ITOP is detected at timing (2), the leading edge of the ITOP signal is detected a little before the generation timing for the second BD signal, and the phase difference between the ITOP signal and the BD signal is a period indicated by A'. If, during the second and the following revolutions, the detection timing for the leading edge of an ITOP signal is shifted away from the generation timing of the first BD signal a maximum 1/3 of a BD signal generation cycle T, the leading edge of the ITOP signal during the second and the following revolutions occurs at an arbitrary timing within a range extending from T/3 before to T/3 after the ITOP signal detection timing during the first revolution (i.e., within a period indicated by B'). Since the phase difference A between the ITOP signal detection timing in the first rotation and the generation timing of the first BD signal is smaller than the period T/3, the ITOP signal detection timing for the first revolution and the ITOP signal detection timing for the following revolution may occur with the BD signal BD2 positioned between them. Assuming that the detection timings for the leading edge of the ITOP signal during the first revolution and the following revolutions occur with the BD signal BD2 positioned between them, for the first revolution, the laser beam begins to scan the photosensitive drum in accordance with the detection timing for the BD signal BD2, while for the second and following revolutions, the laser beam scans the photosensitive drum in accordance with the detection timing for the BD signal BD3. Therefore, although the phase difference between the detection timing for the leading edge of the ITOP signal and the generation timing for the second BD signal is equal to or smaller than 1/3 of the BD signal generation cycle, the individual field images formed on the photosensitive drum are shifted a maximum distance equivalent to the BD signal generation cycle T, i.e., a distance equivalent to one scan line of the laser beam.

The detection timing for the leading edge of the ITOP signal during the first revolution need only be separated from the generation timing for the preceding or succeeding BD signal by at least a period equivalent to T/3, so that the detection timings for the leading edge in the first revolution and in the following revolutions do not occur with the BD signal positioned between them. Specifically, so long the detection timing for the leading edge of the ITOP signal in the first revolution occurs in shaded period C in FIG. 25B, the detection timings for the leading edge during the second and following revolutions do not occur over the BD signal even when these detection timings fluctuate within the maximum period represented by T/3.

An explanation will now be given, while referring to FIG. 26, for a difference in the phase adjustment process for an ITOP signal and a BD signal between an example wherein the leading edge of the ITOP signal is detected before the time T/3 (wherein T denotes a BD signal generation cycle) has elapsed following the generation of the BD signal, and an example where the leading edge is detected after a time 2T/3 (where T denotes a BD signal generation cycle) has elapsed.

In FIG. 26, (1) is an example where the leading edge of an ITOP signal is detected before the time T/3 (where T denotes a BD signal generation cycle) has elapsed following the generation of a BD signal. Since the phase difference between the leading edge of the ITOP signal and the BD signal is a period indicated by A, and since A<(2T/5), wherein T is a BD signal generation cycle, it is assumed that the leading edge of the ITOP signal was detected before the time 2T/5 had elapsed following the generation of a BD signal. In addition, since the time T/3 has not yet elapsed following the generation of the preceding BD signal, the detection signal for the leading edge of the ITOP signal is delayed by, for example, a time (2T/5−A). As a result, the detection timing for the leading edge of the ITOP signal can be set for when the time T/3 has elapsed following the generation of the preceding BD signal.

In FIG. 26, (2) is an example wherein the leading edge of an ITOP signal is detected after the time 2T/3 (where T denotes a BD signal generation cycle) has elapsed following the generation of a BD signal. Since the phase difference between the leading edge of the ITOP signal and the BD signal is a period indicated by A', and since A'>(2T/5), wherein T is a BD signal generation cycle, it is assumed that the leading edge of the ITOP signal was detected after the time 2T/5 had elapsed following the generation of a BD signal. In addition, since the time 2T/5 elapsed following the generation of the preceding BD signal, the detection signal for the leading edge of the ITOP signal is delayed by, for example, a time (7T/5−A). As a result, the detection timing for the leading edge of the ITOP signal can be set for when the time T/3 has elapsed following the generation of the preceding BD signal.

Figure 27:
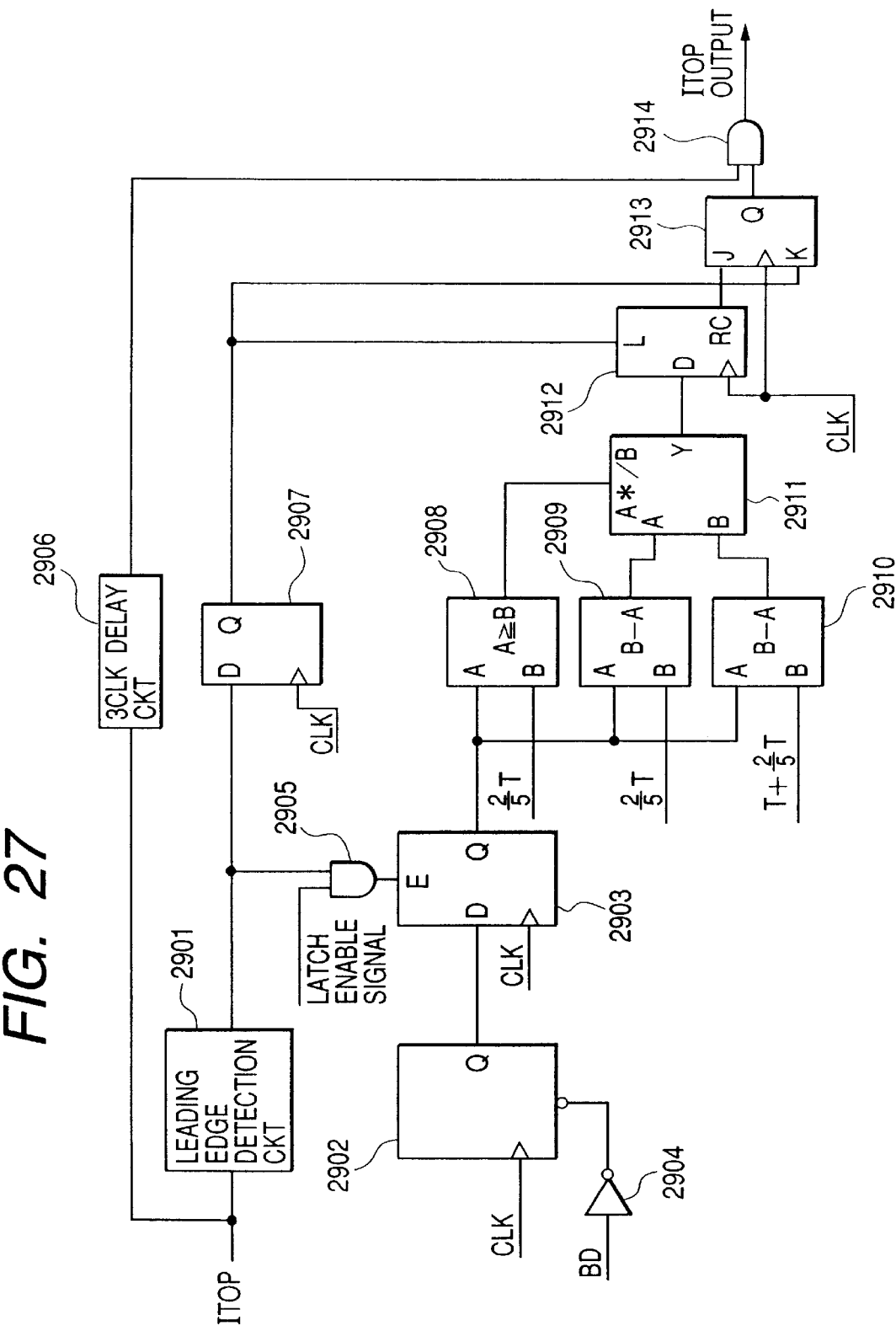
FIG. 27 is a diagram showing a specific arrangement of the phase adjustment circuit according to the tenth embodiment of the present invention.

FIG. 27 is a diagram showing a specific arrangement for the phase adjustment circuit 2126 for a ninth embodiment, and the phase adjustment process for an ITOP signal and a BD signal for this embodiment will now be described.

In FIG. 27, a leading edge detection circuit 2901 detects the leading edge of an ITOP signal that is received from a sensor 2110 provided in a transfer drum 2108. An up counter 2902 is a free-run counter for which the count value that it holds is cleared each time a BD 2904 is received from a BD sensor 2107. The count value held by the up counter 2902 is employed as a generation cycle for a BD signal. At the output timing for the leading edge detection circuit 2901, a latch circuit 2903 latches a count value from the up counter 2902. The count data that represents the latched count value is then transmitted to a comparator 2908, a first subtraction circuit 2909 and a second subtraction circuit 2910 as data representing the period during the BD signal generation cycle required for the leading edge of the ITOP signal to be detected (i.e., data that represents the phase difference between the leading timing of the ITOP signal and the BD signal).

The output of the leading edge detection circuit 2901 and a latch enable signal that is set by a not-shown controller (CPU) are transmitted to an AND gate 2905, and the output of the AND gate 2905 is transmitted to the latch enable terminal LE of the latch circuit 2903. During the period in which the latch enable signal is at level L, the count value of the up counter 2902 is not latched, even when the leading edge of the ITOP signal is detected.

The count data latched by the latch circuit 2903 are transmitted to the comparator 2908, the first subtraction circuit 2909 and the second subtraction circuit 2910.

The comparator 2908 compares the count value represented by the count data with a value that is set by the CPU, i.e., in this embodiment, 2T/2, where T denotes a count value that represents a BD signal generation cycle (a well known numerical value that is uniformly determined by the processing speed of the apparatus and the image resolution). When the count value indicated by the count data is equal to or greater than the value set by the CPU, the comparator 2908 outputs a signal at level H. When the count value is smaller, the comparator 2908 outputs a signal at level L. That is, when the count value represented by the count data is smaller than the value 2T/5 set by the CPU, a signal at level L is output by the comparator 2908. Therefore, it is assumed that, as in (1) of FIG. 26, the leading edge of the ITOP signal during the first rotation of the drum is detected before a period ⅖ of the BD generation cycle has elapsed since the BD signal was generated. When the count value represented by the count data is equal to or greater than the value 2T/5, a signal at level L is output. Therefore, it is assumed that, as in (2) of FIG. 26, the leading edge of the ITOP signal during the first revolution of the drum is detected after a period ⅖ of the BD generation cycle has elapsed since the BD signal was generated.

The first subtraction circuit 2909 subtracts the count value represented by the count data from a value that is set by the CPU, i.e., in this embodiment, 2T/5, where T denotes a count value that represents a BD signal generation cycle (a well known numerical value that is uniformly determined by the processing speed of the apparatus and the image resolution). The results obtained by the subtraction are regarded as data that represent a delay time of 2T/5 (where T denotes a BD signal generation cycle) between the detection timing of the leading edge of the ITOP signal and the generation timing of the next BD signal. When, for example, the count value T of the BD signal generation cycle is "100" and the count value held by the up counter 2902 is "20", and when the leading edge of the ITOP signal is detected by the leading edge detection circuit 2901, the ITOP signal is delayed by a time equivalent to "20" (=2T/5−20). As a result, the ITOP signal can be generated at a timing differing by the time 2T/5 (T is a BD generation cycle) from the generation timing for the next BD signal.

The second subtraction circuit 2910 subtracts the count value represented by the count data from a value that is set by the CPU, i.e., in this embodiment, 7T/5 (=T+2T/5), where T denotes a count value that represents a BD signal generation cycle (a well known numerical value that is uniformly determined by the processing speed of the apparatus and the image resolution). The results obtained by the subtraction are regarded as data that represent a delay time of 2T/5 (where T denotes a BD signal generation cycle) between the detection timing for the leading edge of the ITOP signal and the generation timing for of the next BD signal. When, for example, the count value T of the BD signal generation cycle is "100" and the count value held by the up counter 2902 is "20", and when the leading edge of the ITOP signal is detected by the leading edge detection circuit 2901, the ITOP signal is delayed by a time equivalent to "60" (=7T/5−80). As a result, the ITOP signal can be generated at a timing differing by a time 2T/5 (T is a BD generation cycle) from the generation timing for the next BD signal.

The outputs of the first and the second subtraction circuits 2909 and 2910 are transmitted to a selector 2911. The selector 2911 employs the output of the comparator 2908 to select one of the outputs of the first and the second subtraction circuits 2909 and 2910, and outputs the selected data to the data terminal D of a down counter 2912. Specifically, when the signal from the comparator 2908 is at level L, the output of the first subtraction circuit 2909 is selected and transmitted to the data terminal D of the down counter 2912. When the signal from the comparator 2908 is at level H, the output of the second subtraction circuit 2910 is selected and transmitted to the terminal D.

The output of the leading edge detection circuit 2901 is synchronized with the reference clock CLK by a flip-flop 2907, and they are transmitted together to the load terminal L of the down counter 2912. At the output timing for the flip-flop 2907, the down counter 2912 loads data from the selector 2911, and, in synchronization with the reference clock CLK, begins to decrement the count value indicated by the received data. When the count value reaches 0, the count end signal is output by the output terminal RC to a J-K flip-flop 2913 at the succeeding stage. The period during which the count value is decremented by the down counter 2912 corresponds to a delay time for the ITOP signal for adjusting the phases of the ITOP signal and the BD signal, which will be described later.

The J-K flip-flop 2913 is operated in synchronization with the reference clock CLK, and is reset at the output timing for the flip-flop 2907, i.e., at the leading edge of the ITOP signal. An ITOPDLY signal output by the output terminal Q is set to level L, and the level L state is maintained until it is reset at the output timing for the down counter 2912. That is, the ITOPDLY signal is maintained at level L until the delay time has elapsed following the leading edge of the ITOP signal.

In order to adjust the phases of the ITOP signal and the BD signal, the ITOP signal is delayed a predetermined period of time (in this embodiment, a time equivalent to three reference clocks CLK) by a 3CLK delay circuit 2906. The delayed ITOP signal and the ITOPDLY signal output by the J-K flip-flop 2913 are output via an AND gate 2914. As a result, the generation time for the ITOP signal can be adjusted so it is near the center of the BD signal generation cycle, which is shifted away from the generation timing for a BD signal a period of 2T/5 (T is a BD signal generation cycle).

In this embodiment, for the first revolution of the photosensitive drum, the latch enable signal is set to level H by a CPU (not shown); the phase difference between the BD signal and the ITOP signal is detected; and a time to delay the ITOP signal is set so that the ITOP signal is generated in the center of the BD signal generation cycle. For the second and following revolutions, the latch enable signal is set to level L, and the delay time for the ITOP signal, which is set in the first revolution, is maintained. With this arrangement, the generation time for the ITOP signal is adjusted to the center of the BD signal generation cycle, and for the second and following revolutions, the phase difference between the ITOP signal and the BD signal is maintained. Therefore, fluctuation of the phase difference occurs only when there is a change in the rotation accuracy of the drum motor 2115.

In this embodiment, the detection timing for the leading edge of the ITOP signal is delayed up to a time that is shifted by a time 2T/5 (T is a BD signal generation cycle) away from the generation timing for the preceding or succeeding BD signal. However, such detection timing may be delayed up to a time shifted by a time T/3 to T/2 away from the generation timing for the preceding or succeeding BD signal, so that the same effects can be obtained. Specifically, even if the phase difference between the ITOP signal and the BD signal is the maximum time of T/n (T is a BD signal generation cycle and n is a two or greater integer), one of the times T/n to T/2 can be selected, and the detection timing for the leading edge of the ITOP signal can be delayed up to a time shifted a selected period from the generation timing of the preceding or succeeding BD signal. In this manner, the same effects can be obtained.

Furthermore, in this embodiment, when during the first revolution of the photosensitive drum the leading edge of the ITOP signal is detected before a time T/3 (T is a BD signal generation cycle) has elapses following the generation of the BD signal, based on the delay time that is set in accordance with the phase difference, the ITOP signal generated for each revolution is delayed until a time T/3 has elapsed following the generation of the preceding BD signal. However, the same effects can be obtained if the ITOP signal is delayed until a time T/3 has elapsed following the generation of the succeeding BD signal.

As described above, according to this embodiment, when, during the first revolution of the photosensitive drum, the leading edge of the ITOP signal is detected before a time T/3 (T is a BD signal generation cycle) has elapsed since the BD signal was generated, based on the delay time that is set in accordance with the phase difference, an ITOP signal generated for each rotation is delayed until the time T/3 has elapsed following the generation of the preceding BD signal. When the leading edge of the ITOP signal is detected after the time 2T/3 has elapsed since the BD signal was generated, based on the delay time that is set in accordance with the phase difference, the ITOP signal is delayed until after the time T/3 has elapsed following the generation of the succeeding BD signal. Therefore, the phase difference between the ITOP signal and the BD signal can be adjusted within a short period of time, and the occurrence of missing details in the field images that are formed can be minimized. Further, the position on the photosensitive drum that the laser beam first scans, in accordance with a BD signal that is first detected in the second and following revolutions of the photosensitive drum, can be superimposed on the position on the photosensitive drum that the laser beam first scans, in accordance with a BD signal that is first detected during the first rotation of the photosensitive drum.

Furthermore, in this embodiment, fluctuation of the generation timing of an ITOP signal during each revolution of the photosensitive drum can not occur near the time for the generation of a BD signal, but occurs at the time that is shifted away from the generation timing of a BD signal a period of T/3. Therefore, the error allowance can be increased relative to the variance in the rotation of the photosensitive drum (i.e., a change due to uneven revolutions of the drum motor). Further, since the rotational precision of the mechanism for driving the drum motor and the photosensitive drum is increased, shifting can be reduced between the field image that is formed during the first rotation of the photosensitive drum and the field images formed during the following rotations, and image quality can be improved. In addition, the ITOP signal whose phase is adjusted is employed to initiate the writing of field images for individual colors on the photosensitive drum. Thus, the phase difference between the ITOP signal and the BD signal is constant for each revolution, and the writing start positions of the field images for the first to the n-th colors can be matched exactly. As a result, a high-quality color image with no color shifting can be formed.

Furthermore, control is exercised not only for the writing of the individual color field images on the photosensitive drum, based on the phase-adjusted ITOP signal, but also for the scanning of the original document using the optical system in the image scanner and for the reading of the original document using the CCD. Therefore, the original document reading positions for the first to the n-th colors can be exactly matched with the writing positions for field images on the photosensitive drum. Further, the difference in the MTF for individual color images can be reduced, and a color image can be formed for which there is no deterioration of the quality due to color blurring and erroneous edge determination.

(Eleventh Embodiment)

An explanation will now be given for the phase adjustment process for an ITOP signal and a BD signal when the phase difference between these two signals is equal to or less than ¼ of the BD signal generation cycle.

Figure 28:
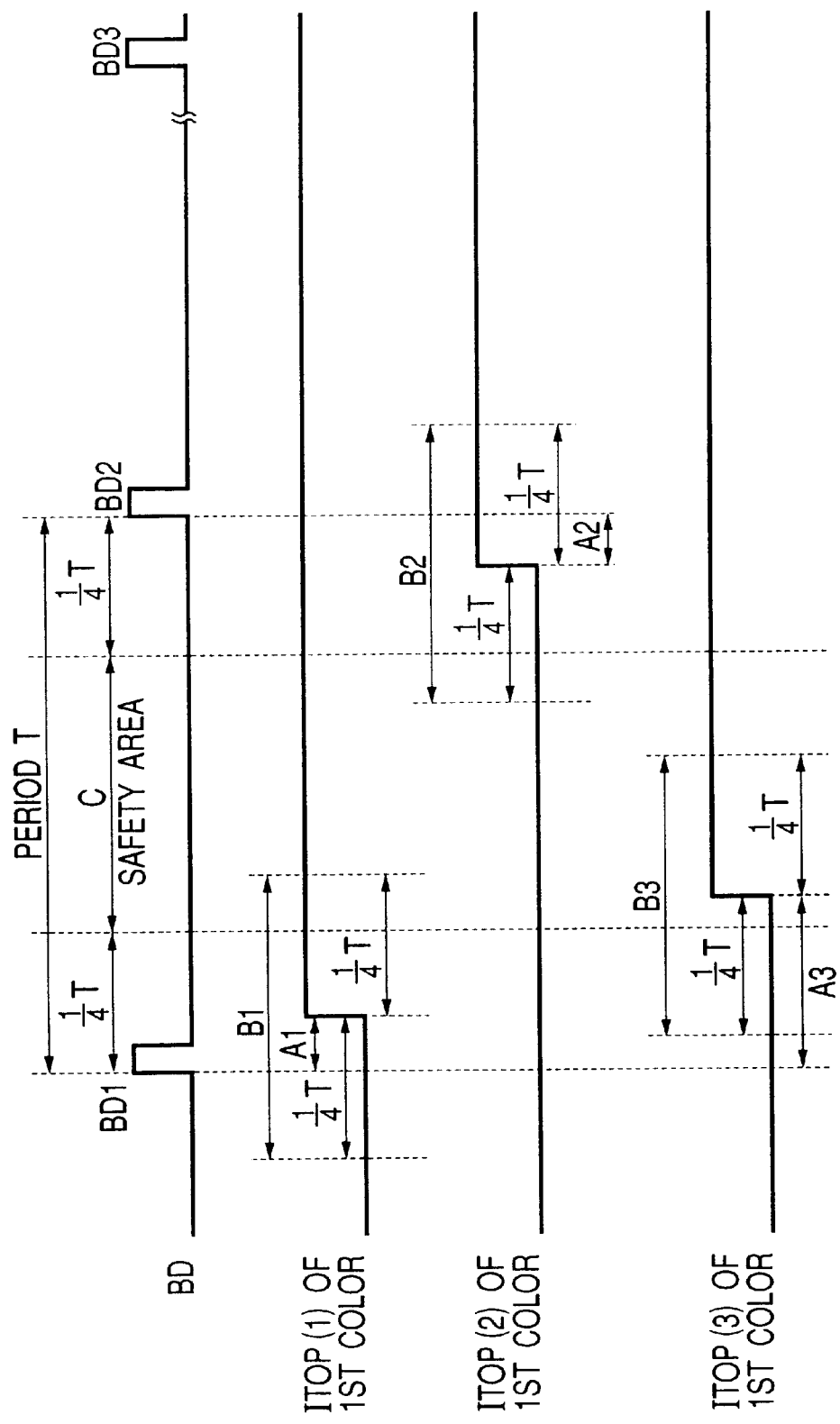
FIG. 28 is a timing chart for explaining the phase adjustment operation performed by a phase adjustment circuit according to an eleventh embodiment of the present invention.

FIG. 28 is a diagram showing the phase relationship between an ITOP signal and a BD signal.

First, when during the first rotation of the photosensitive drum an ITOP signal is detected at a timing (1), the leading edge of the ITOP signal is detected a little after the timing at which the first BD signal is generated. The phase difference between the ITOP signal and the BD signal is a period indicated by A1 in FIG. 28. If, in the second and the following revolutions, the detection timing of the leading edge of an ITOP signal is shifted away from the generation timing for the first BD signal a maximum ¼ of a BD signal generation cycle T, the leading edge of the ITOP signal during the second and the following revolutions occurs at an arbitrary timing within a range extending from T/4 before to T/4 after the ITOP signal detection timing during the first revolution (i.e., within a period indicated by B1). Since the phase difference A1 between the ITOP signal detection timing in the first rotation and the generation timing for the first BD signal is smaller than the period T/4, the ITOP signal detection timing for the first revolution and the ITOP signal detection timing for the following revolution may occur with the BD signal BD1 positioned between them. Assuming that the detection timings for the leading edge of the ITOP signal in the first revolution and the following revolutions occur with the BD signal BD1 positioned between them, for the first revolution, the laser beam begins to scan the photosensitive drum in accordance with the detection timing for the BD signal BD2, while for the second and following revolutions, the laser beam scans the photosensitive drum in accordance with the detection timing for the BD signal BD1. Therefore, although the phase difference between the detection timing for the leading edge of the ITOP signal and the generation timing for the first BD signal is equal to or smaller than ¼ of the BD signal generation cycle, the individual field images formed on the photosensitive drum are shifted a maximum distance that is equivalent to the BD signal generation cycle T, i.e., a distance equivalent to one scan line of the laser beam.

Similarly, when during the first rotation of the photosensitive drum the ITOP is detected at timing (2), the leading edge of the ITOP signal is detected a little before the generation timing for the second BD signal, and the phase difference between the ITOP signal and the BD signal is a period indicated by A2. If, during the second and the following revolutions, the detection timing for the leading edge of an ITOP signal is shifted away from the generation timing of the first BD signal a maximum ¼ of a BD signal generation cycle T, the leading edge of the ITOP signal during the second and the following revolutions occurs at an arbitrary timing within a range extending from T/4 before to T/4 after the ITOP signal detection timing during the first revolution (i.e., within a period indicated by B2). Since the phase difference A2 between the ITOP signal detection timing in the first rotation and the generation timing of the first BD signal is smaller than the period T/4, the ITOP signal detection timing for the first revolution and the ITOP signal detection timing for the following revolution may occur with the BD signal BD2 positioned between them. Assuming that the detection timings for the leading edge of the ITOP signal during the first revolution and the following revolutions occur with the BD signal BD2 positioned between them, for the first revolution, the laser beam begins to scan the photosensitive drum in accordance with the detection timing for the BD signal BD2, while for the second and following revolutions, the laser beam scans the photosensitive drum in accordance with the detection timing for the BD signal BD3. Therefore, although the phase difference between the detection timing for the leading edge of the ITOP signal and the generation timing for the second BD signal is equal to or smaller than ¼ of the BD signal generation cycle, the individual field images formed on the photosensitive drum are shifted a maximum distance equivalent to the BD signal generation cycle T, i.e., a distance equivalent to one scan line of the laser beam.

When during the first rotation of the photosensitive drum an ITOP signal is detected at timing (3), the leading edge of the ITOP signal is detected after ¼ of a BD signal generation cycle has elapsed following the time at which the first BD signal was generated. The phase difference between the ITOP signal and the BD signal is a period indicated by A3. If, in the second and the following revolutions, the detection timing for the leading edge of an ITOP signal is shifted away from the generation timing of the first BD signal a maximum ¼ of a BD signal generation cycle T, the leading edge of the ITOP signal in the second and the following revolutions occurs at an arbitrary timing within a range extending from T/4 before to T/4 after the ITOP signal detection timing during the first revolution (i.e., within a period indicated by B3). Since the phase difference A3 between the ITOP signal detection timing in the first rotation and the generation timing for the first BD signal is greater than the period T/4, the ITOP signal detection timing for the first revolution and the ITOP signal detection timing for the following revolution occur with the BD signal BD1 positioned between them. Therefore, for the first revolution, the laser beam begins to scan the photosensitive drum in accordance with the detection timing for the BD signal BD2, and for the second and following revolutions, the laser beam scans the photosensitive drum in accordance with the detection timing for the BD signal BD2. So long as the phase difference between the detection timing for the leading edge of the ITOP signal and the generation timing for the first BD signal is equal to or greater than ¼ of the BD signal generation cycle, the individual field images formed on the photosensitive drum are not shifted away from each other.

The detection timing for the leading edge of the ITOP signal in the first revolution need only be separated by at least T/4 from the generation timing of the preceding or succeeding BD signal, so that the detection timings for the leading edge in the first revolution and in the following revolutions do not occur with the BD signal positioned between them. Specifically, so long as the detection timing for the leading edge of the ITOP signal in the first revolution occurs in a safe period C in FIG. 28, the detection timings for the leading edge in the second and following revolutions do not occur over the BD signal, even when these detection timings fluctuate within the maximum period of T/4. If, in the first revolution, the detection timing for the leading edge of the ITOP signal occurs in the safe area C, a special phase adjustment process need not be performed.

An explanation will now be given, while referring to FIG. 30, for a difference in the phase adjustment process for an ITOP signal and a BD signal between an example wherein the leading edge of the ITOP signal is detected before the time T/4 (wherein T denotes a BD signal generation cycle) has elapsed following the generation of the BD signal, and an example where the leading edge is detected after a time 3T/4 (where T denotes a BD signal generation cycle) has elapsed.

Figure 30:
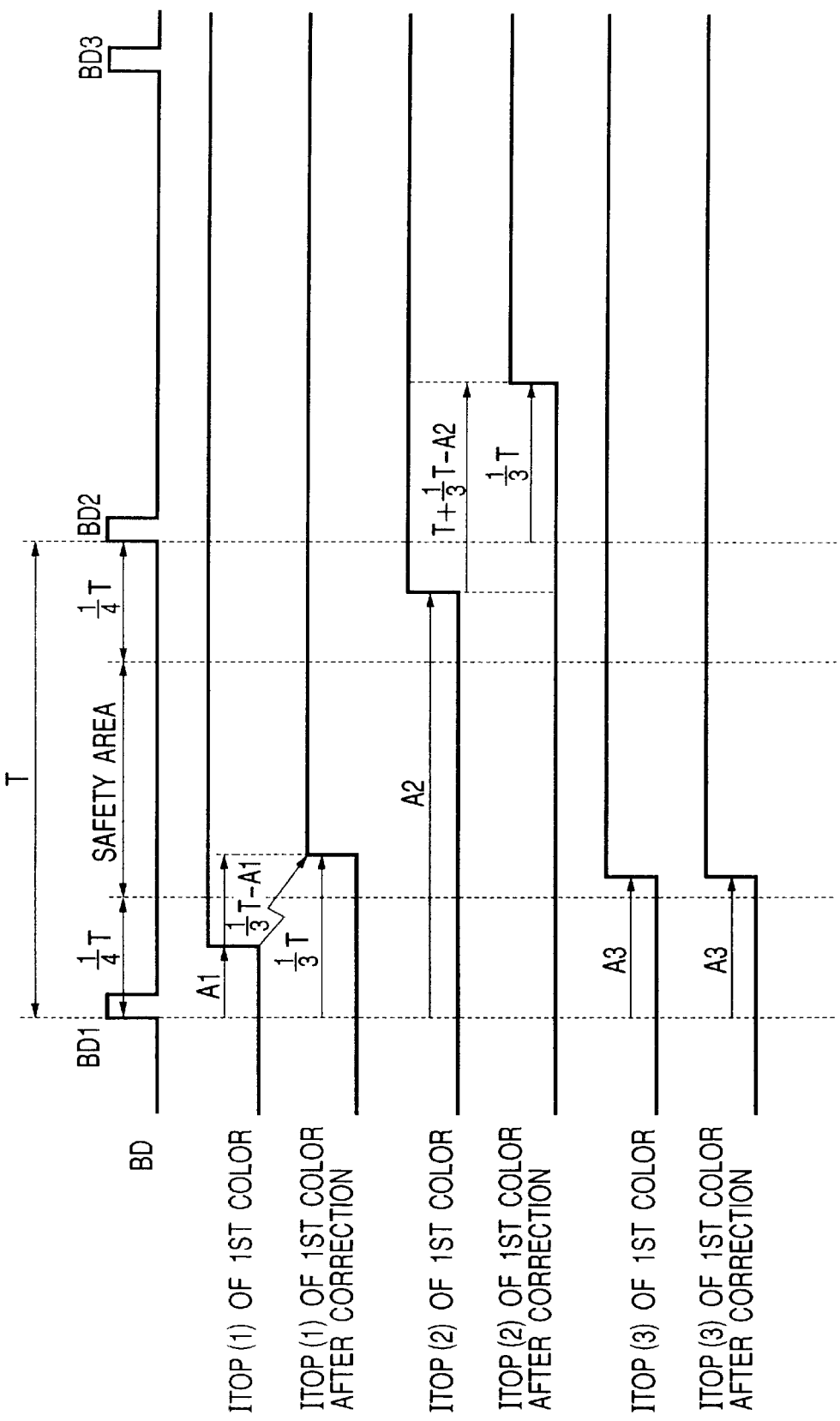
FIG. 30 is a timing chart for explaining the phase adjustment operation performed by the phase adjustment circuit according to the eleventh embodiment of the present invention.
Figure 31:
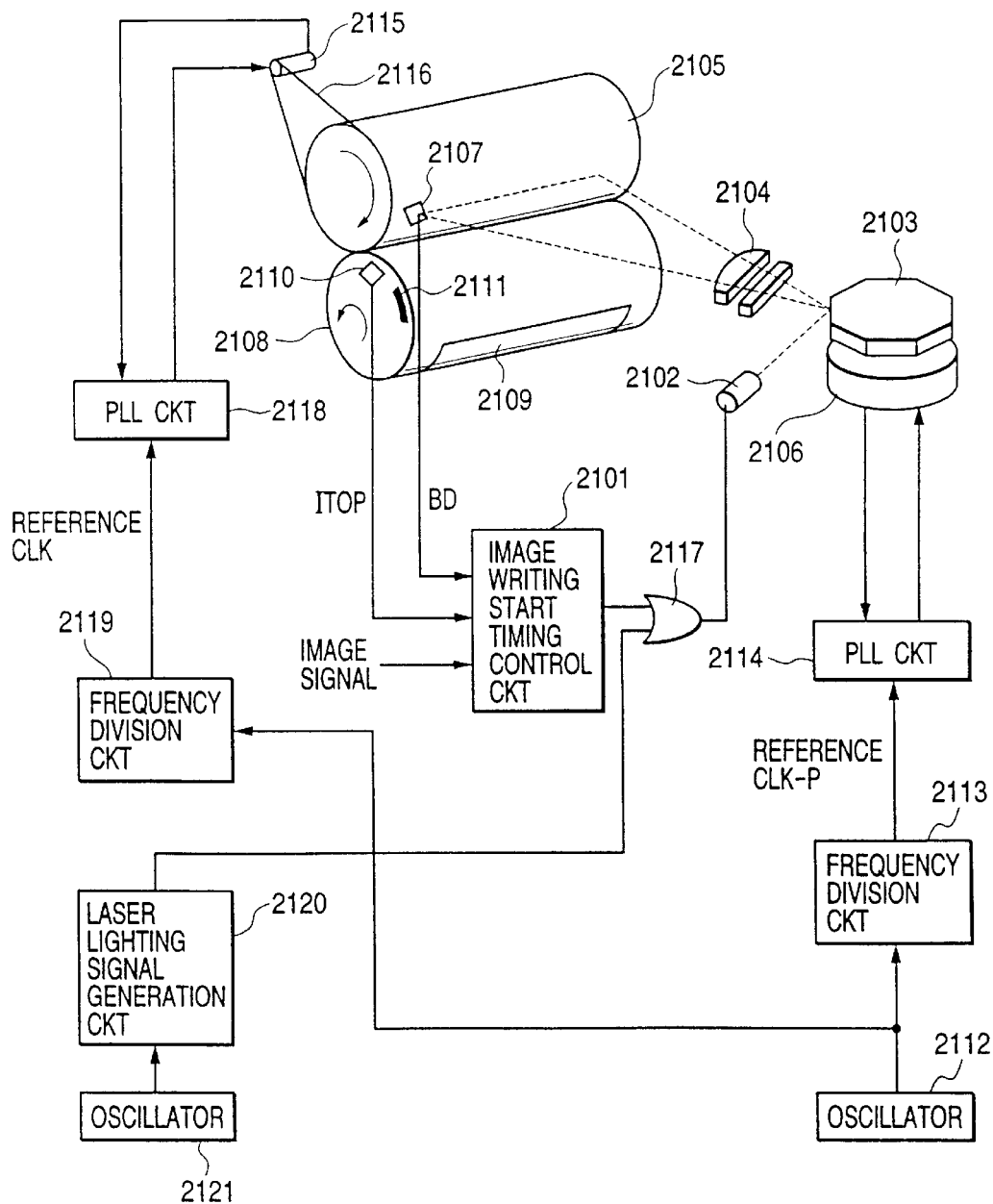
FIG. 31 is a diagram showing the arrangement of a conventional image forming apparatus for driving a polygon motor and a photosensitive drum.
Figure 32:
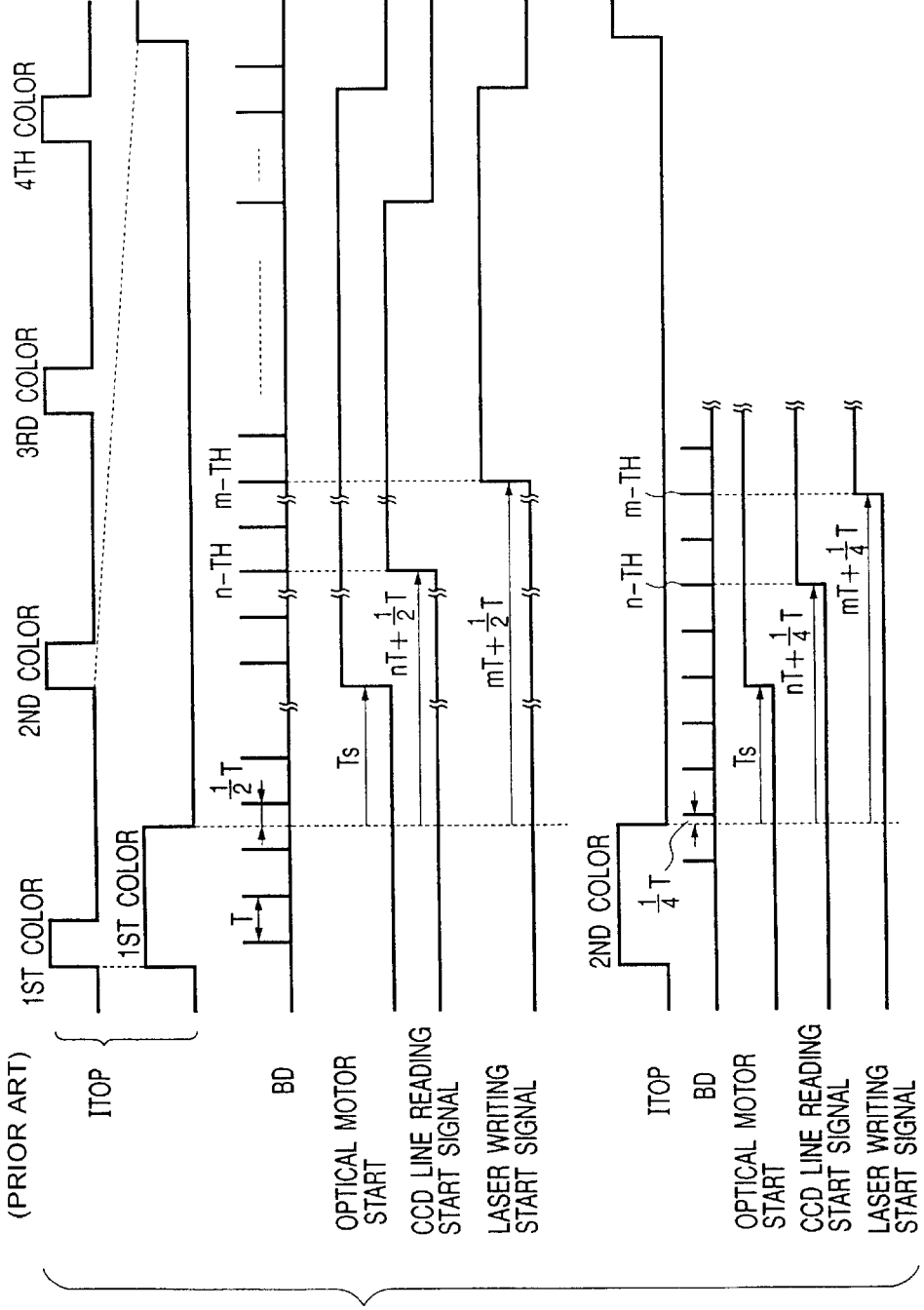
FIG. 32 is a timing chart for explaining the operation performed by the arrangement shown in FIG. 31.
Figure 33:
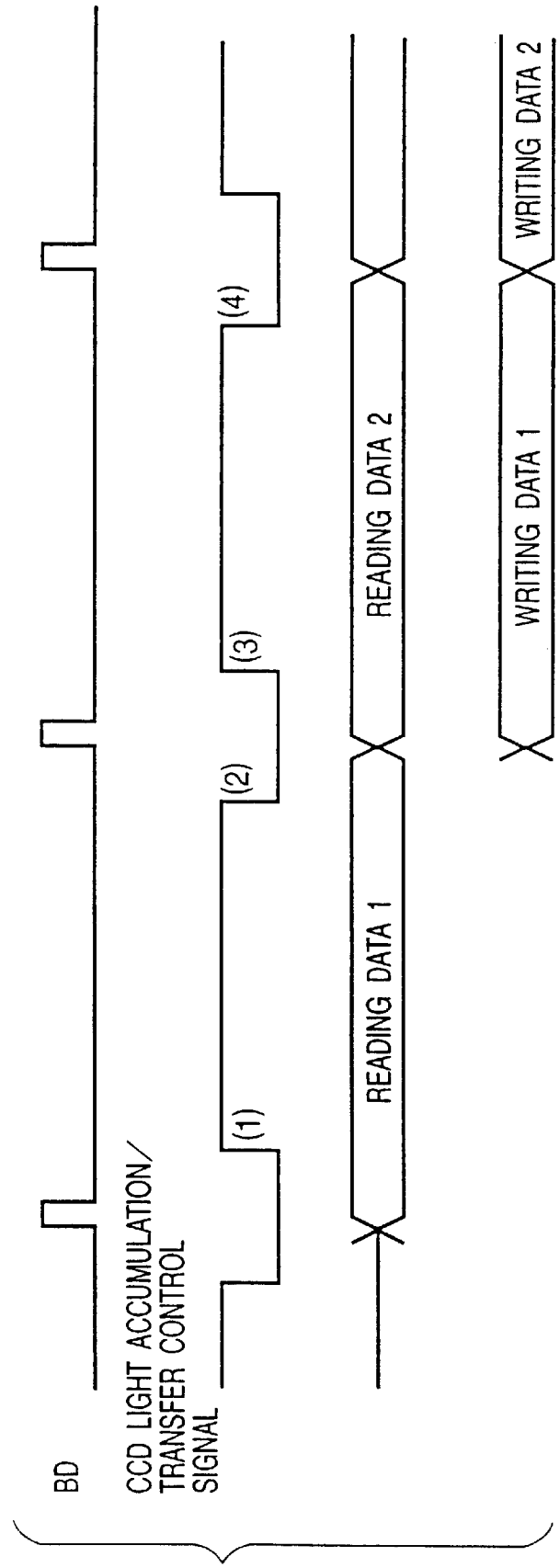
FIG. 33 is a timing chart for explaining the reading operation performed by the line sensor.
Figure 34:
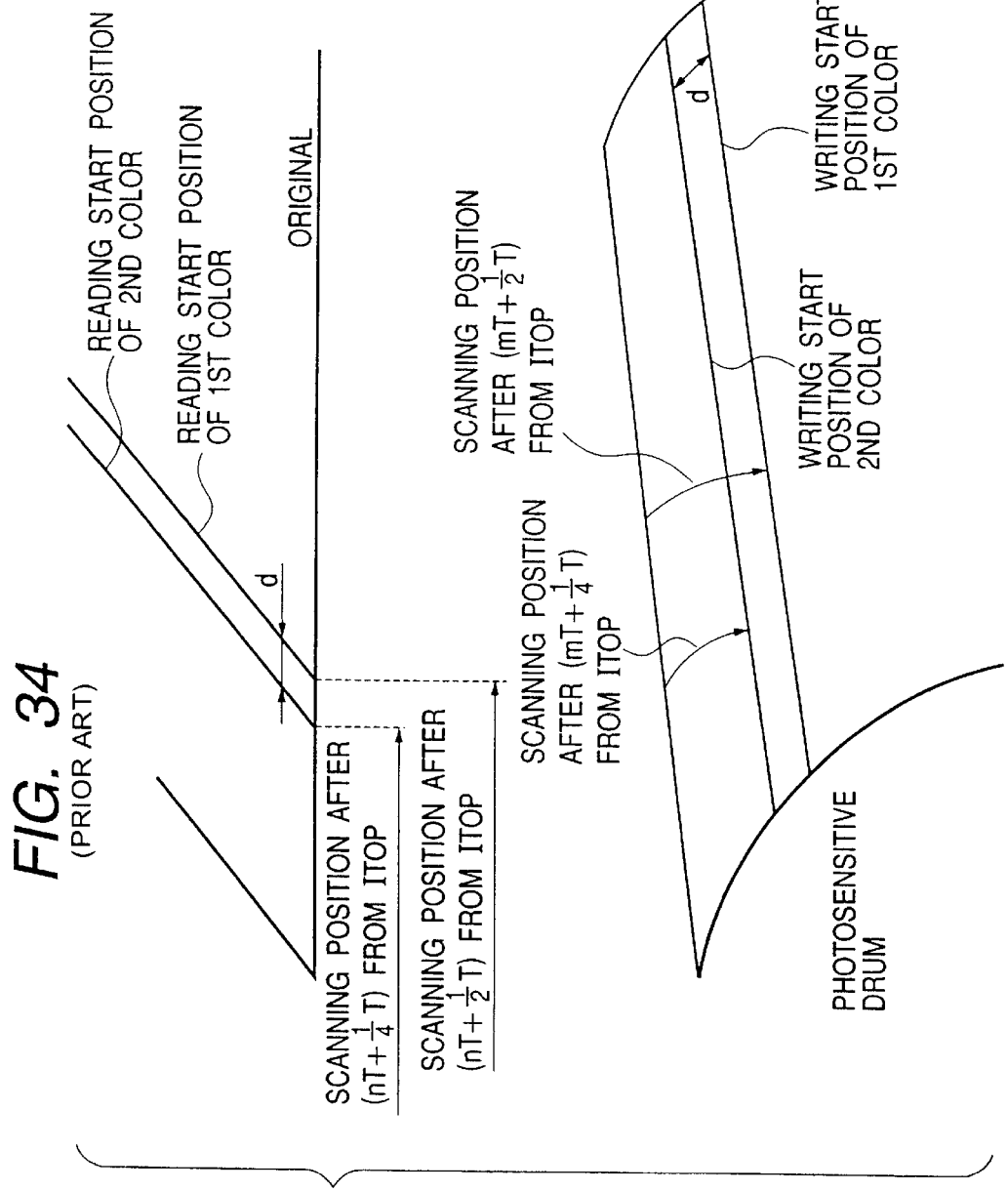
FIG. 34 is a diagram showing the relationship between the original reading start position and the image writing start position of the conventual color image forming apparatus.
Figure 35:
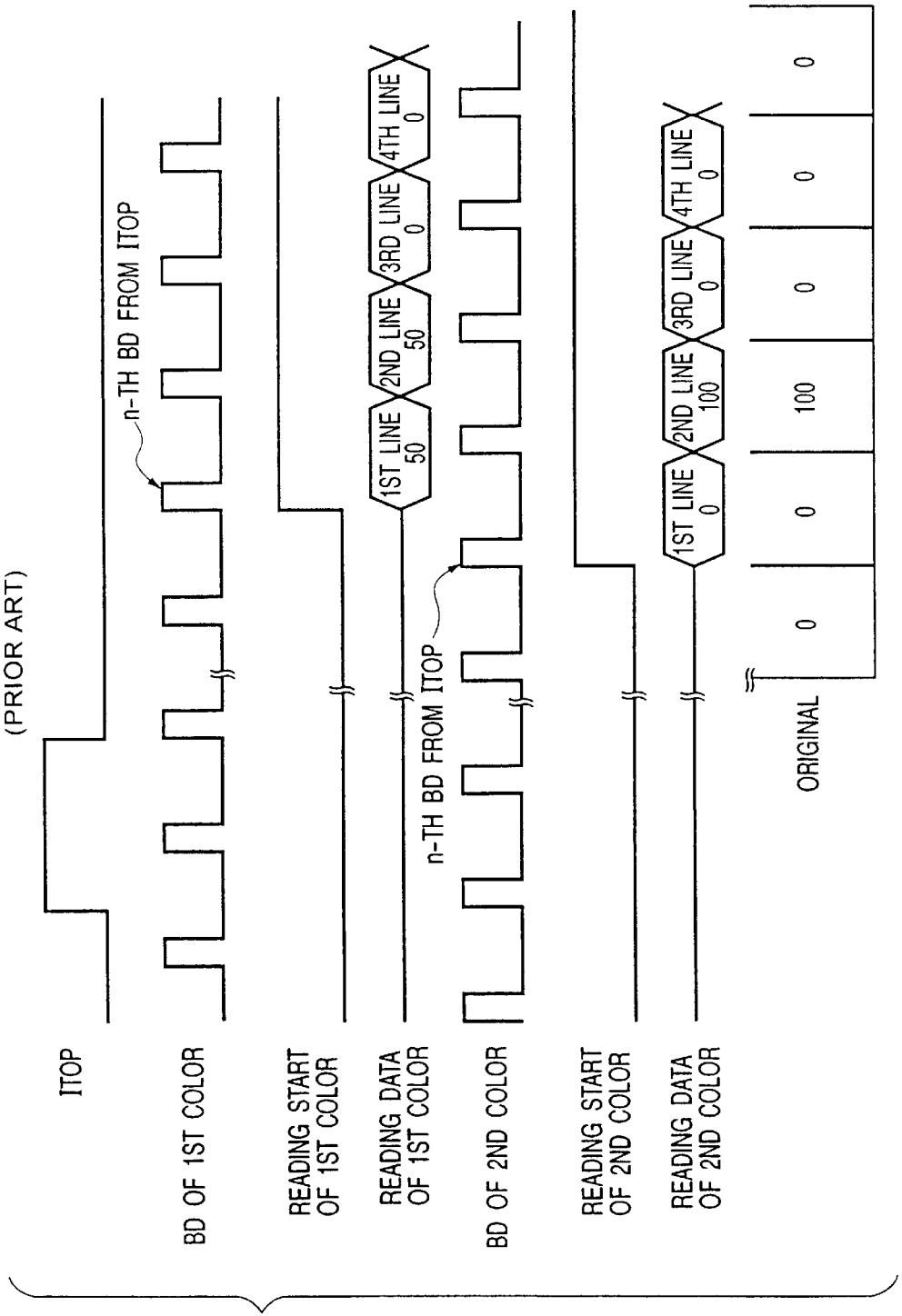
FIG. 35 is a diagram showing the relationship between the original and the line reading position of the line sensor.
Figure 36:
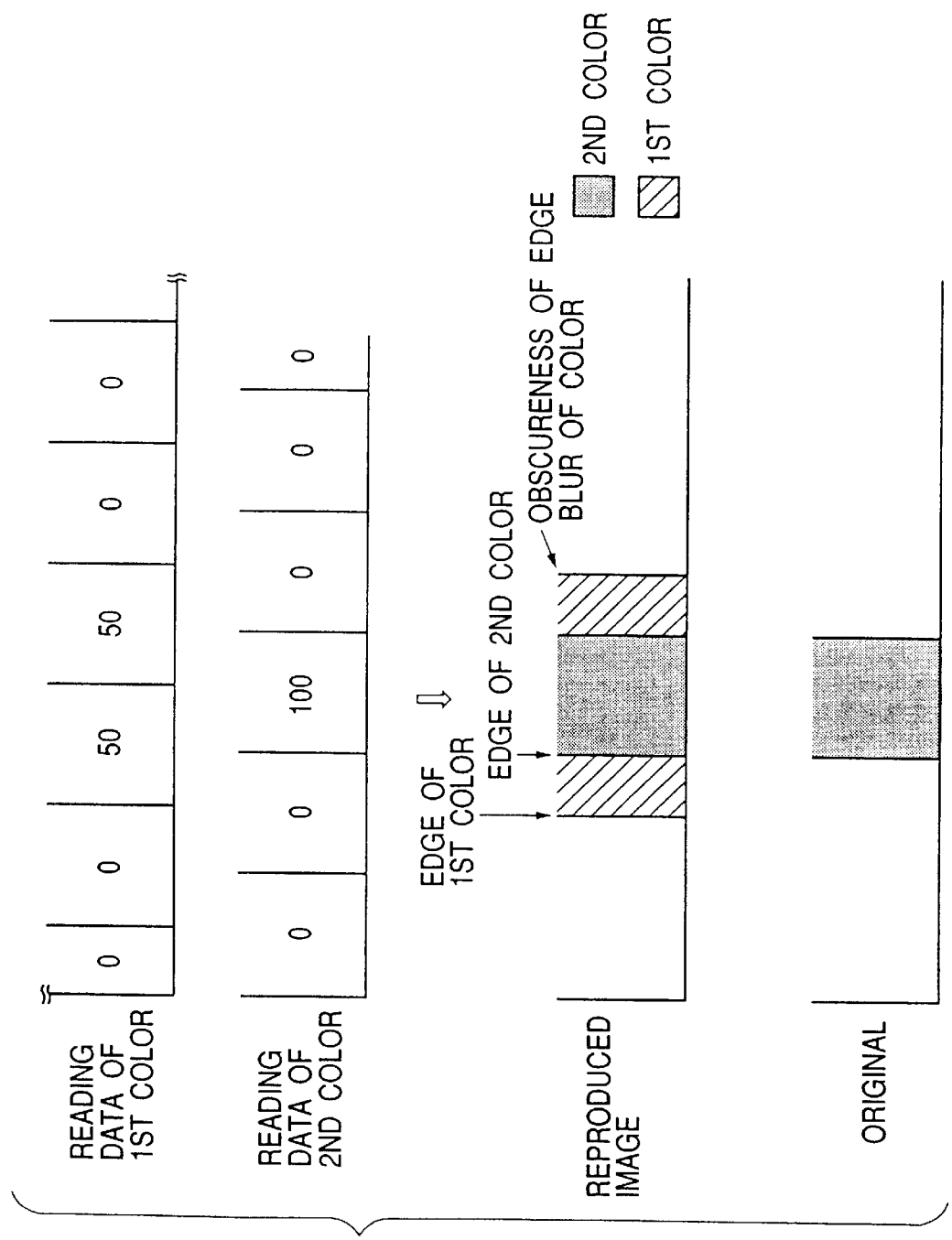
FIG. 36 is a diagram showing the relationship between the obtained image data, a reproduced image and the original image.
Figure 37A:
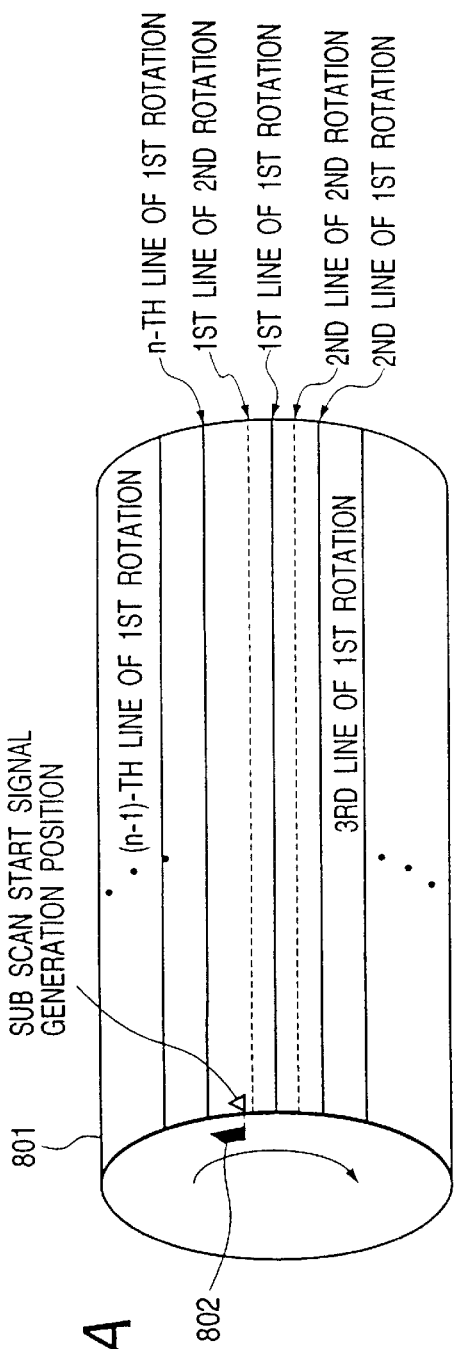
FIGS. 37A and 37B are diagrams showing the relationship, in the conventional color image forming apparatus, between the rotation of the photosensitive drum and the scanning performed with the laser beam.
Figure 37B:
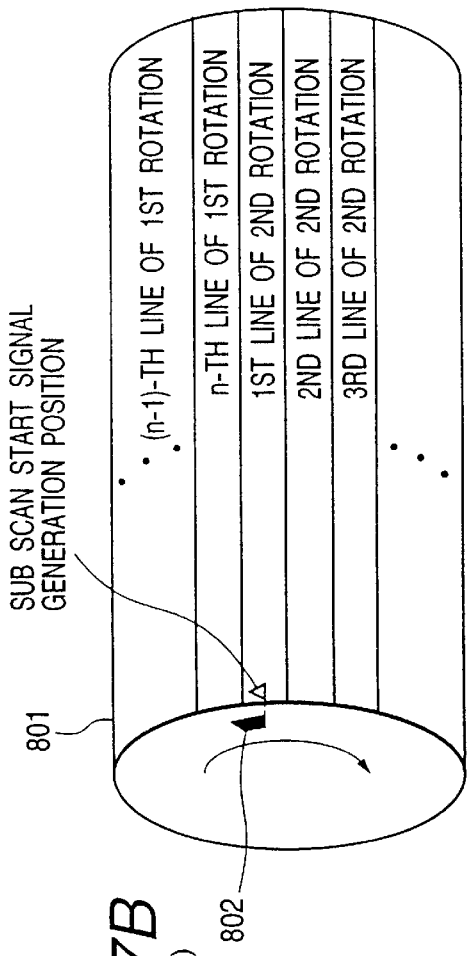
Figure 38:
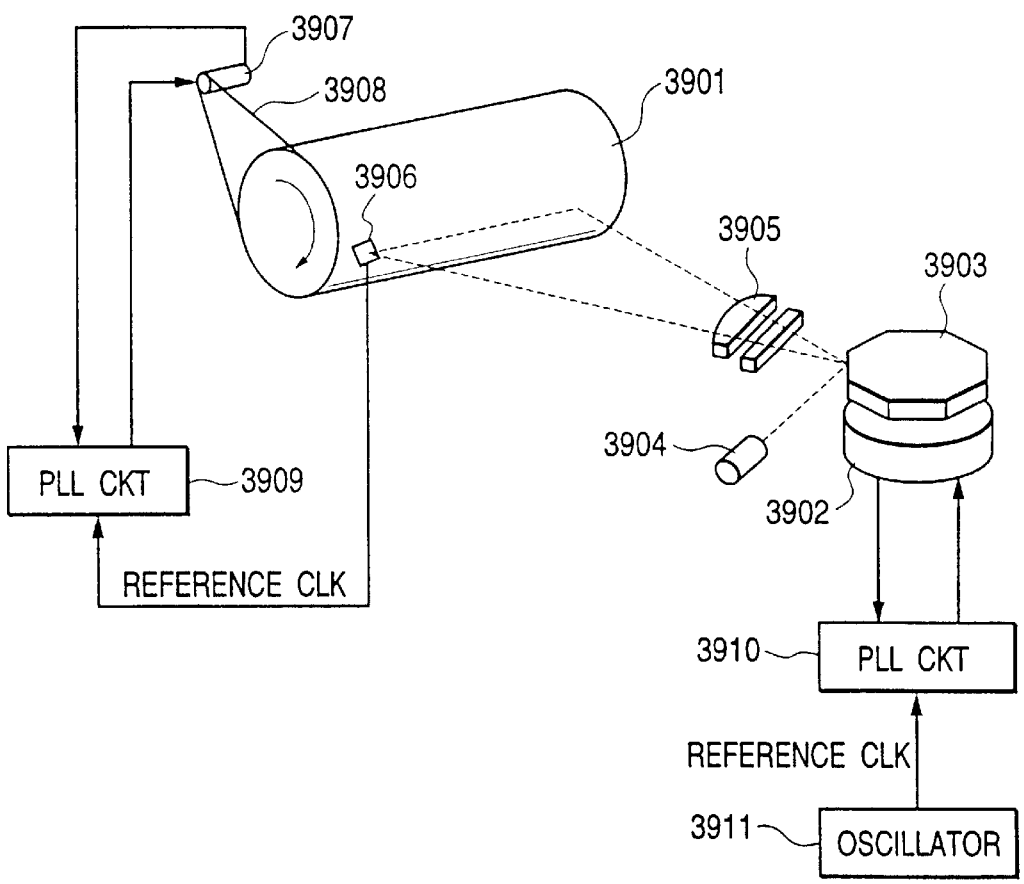
FIG. 38 is a diagram showing an example arrangement for a conventional color image forming apparatus for synchronizing the rotation of a drum motor with the rotation of a scanner motor.
Figure 39:
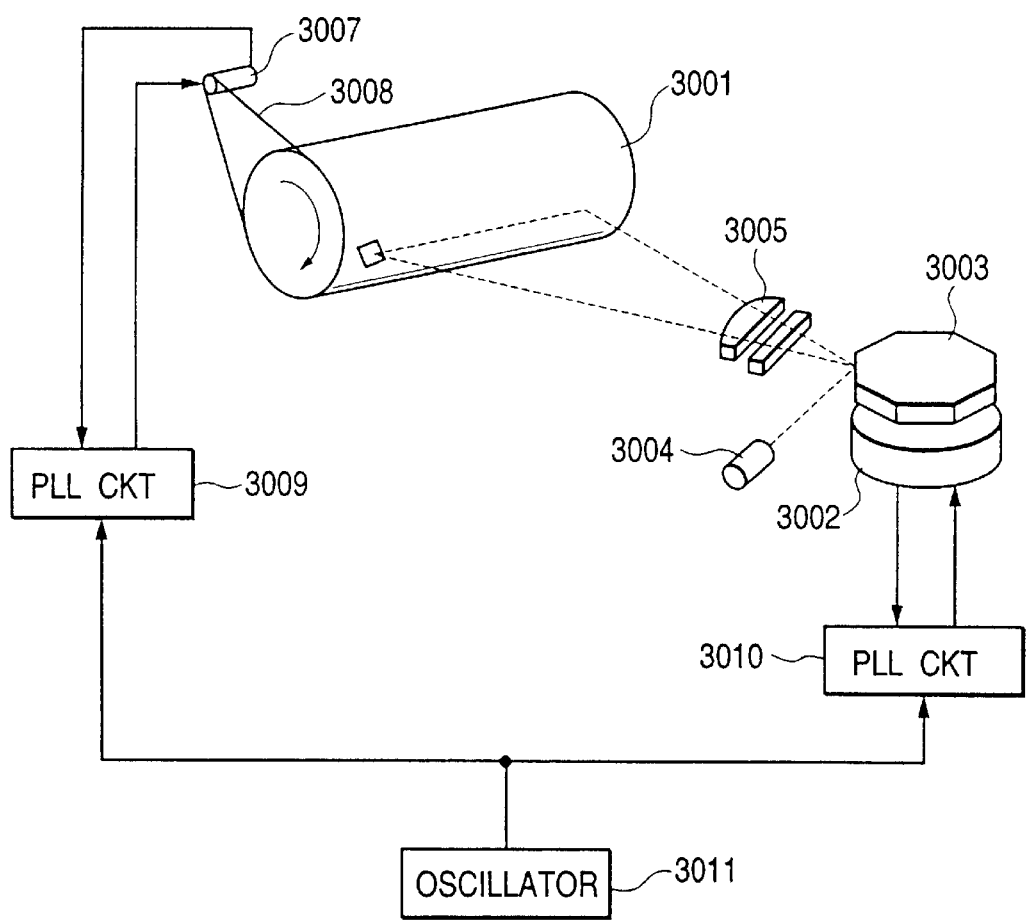
FIG. 39 is a diagram showing another example arrangement for a conventional color image forming apparatus for synchronizing the rotation of a drum motor with the rotation of a scanner motor.
Figure 40:
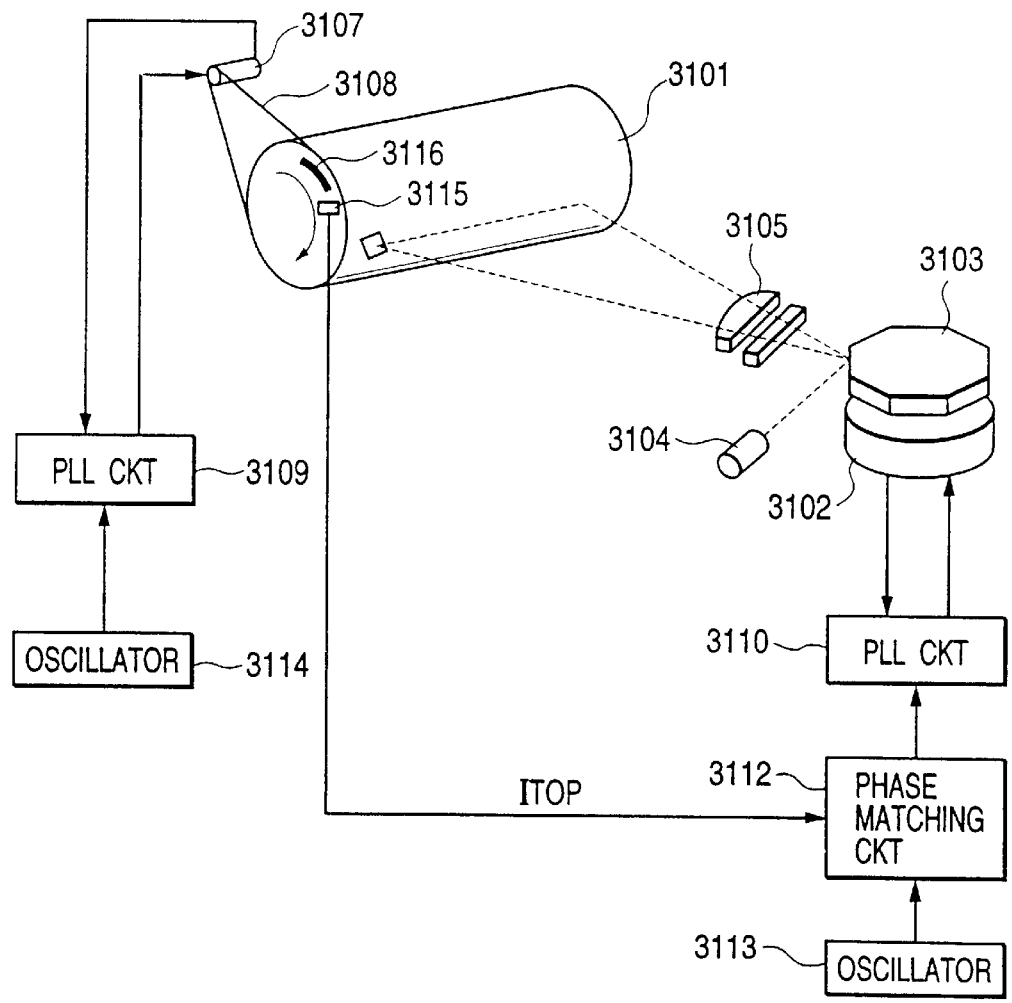
FIG. 40 is a diagram showing an arrangement for a system in a conventional color image forming apparatus for driving a scanner motor and a drum motor.
Figure 41:
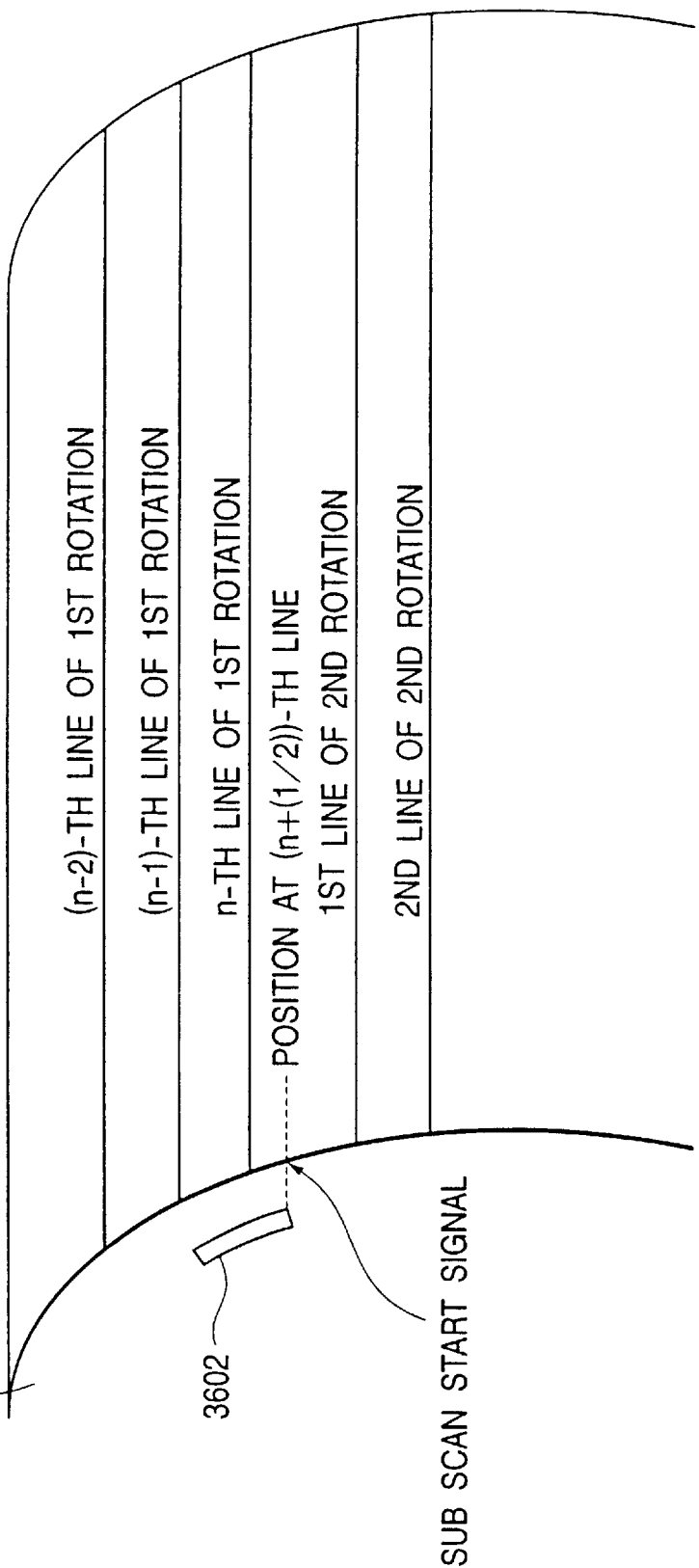
FIG. 41 is a diagram showing the relationship between the main scan line on the photosensitive drum and the timing for the generation of a sub-scan start signal.
Figure 42:
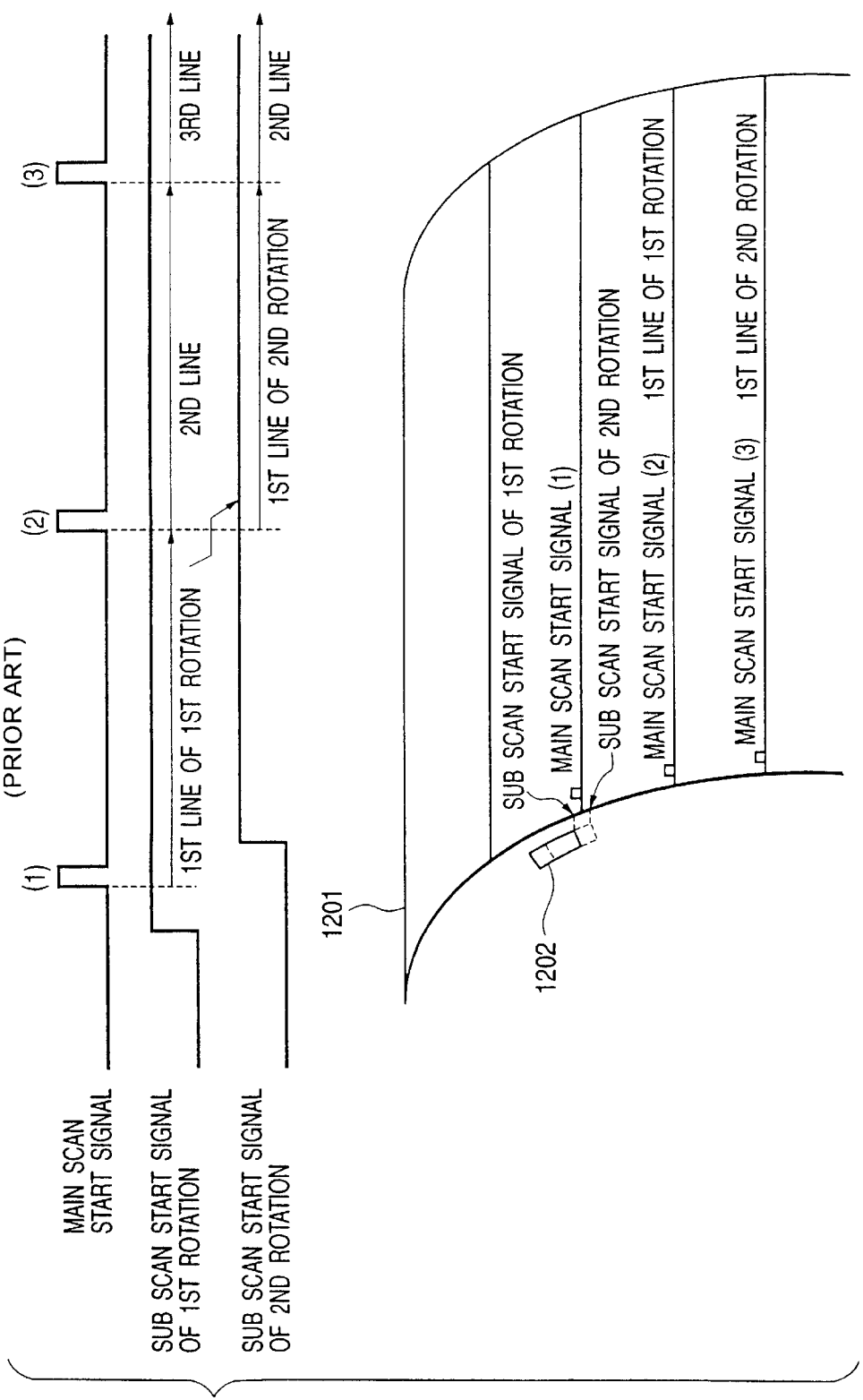
FIG. 42 is a diagram for explaining problems encountered with the conventional color image forming apparatus.

In FIG. 30, (1) is an example where the leading edge of an ITOP signal is detected before the time T/4 (where T denotes a BD signal generation cycle) has elapsed following the generation of a BD signal. Since the phase difference between the leading edge of the ITOP signal and the BD signal is a period indicated by A1, and since A1<T/4, wherein T is a BD signal generation cycle, it is assumed that the leading edge of the ITOP signal was detected before the time T/4 had elapsed following the generation of a BD signal. In addition, since the time T/3 has not yet elapsed following the generation of the preceding BD signal, the detection signal for the leading edge of the ITOP signal is delayed by, for example, a time (T/3−A1). As a result, the detection timing for the leading edge of the ITOP signal can be set for when the time T/3 has elapsed following the generation of the preceding BD signal.

In FIG. 30, (2) is an example wherein the leading edge of an ITOP signal is detected after the time 3T/4 (where T denotes a BD signal generation cycle) has elapsed following the generation of a BD signal. Since the phase difference between the leading edge of the ITOP signal and the BD signal is a period indicated by A2, and since A2>(3T/4), wherein T is a BD signal generation cycle, it is assumed that the leading edge of the ITOP signal was detected after the time 3T/4 had elapsed following the generation of a BD signal. In addition, since the time 2T/3 elapsed following the generation of the preceding BD signal, the detection signal for the leading edge of the ITOP signal is delayed by, for example, a time (4T/3−A2). As a result, the detection timing for the leading edge of the ITOP signal can be set for when the time T/3 has elapsed following the generation of the preceding BD signal.

In FIG. 30, (3) is an example where the leading edge of an ITOP signal is detected after a time T/4 (where T denotes a BD signal generation cycle) has elapsed following the generation of a BD signal. Since the phase difference between the leading edge of the ITOP signal and the BD signal is a period indicated by A3, and since (T/4)<A3<(3T/4), wherein T is a BD signal generation cycle, it is assumed that the leading edge of the ITOP signal was detected during a period of from T/4 to 3T/4 following the generation of a BD signal. In addition, since the time 3T/4 has not yet elapsed following the generation of the preceding BD signal, even though the time T/4 has elapsed, the detection timing for the leading edge of the ITOP signal is adjusted after a time T/4 has elapsed following the generation of the preceding BD signal, i.e., within the safe area, without delaying the detection signal for the leading edge of the ITOP signal.

Figure 29:
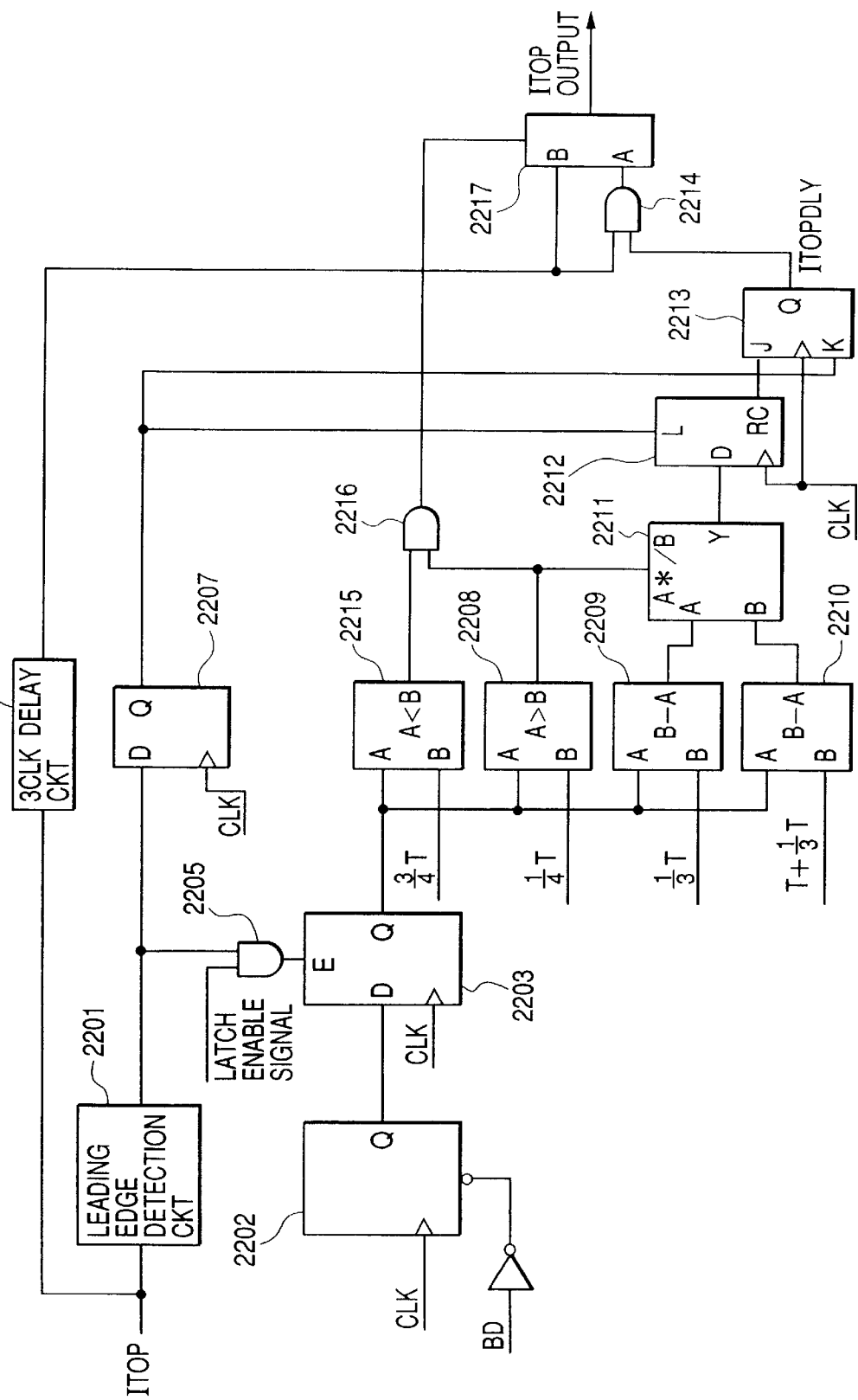
FIG. 29 is a diagram showing a specific arrangement of the phase adjustment circuit according to the eleventh embodiment of the present invention.

FIG. 29 is a diagram showing a specific arrangement for the phase adjustment circuit 2126 for a ninth embodiment, and the phase adjustment process for an ITOP signal and a BD signal for this embodiment will now be described.

In FIG. 29, a leading edge detection circuit 2201 detects the leading edge of an ITOP signal that is received from a sensor 2110 provided in a transfer drum 2108. An up counter 2202 is a free-run counter for which the count value that it holds is cleared each time a BD signal is received from a BD sensor 2107. The count value held by the up counter 2202 is employed as a generation cycle for a BD signal. At the output timing for the leading edge detection circuit 2201, a latch circuit 2203 latches a count value from the up counter 2202. The count data that represents the latched count value is then transmitted to a first comparator 2208, a second comparator 2215, a first subtraction circuit 2209 and a second subtraction circuit 2210 as data representing the period during the BD signal generation cycle required for the leading edge of the ITOP signal to be detected (i.e., data that represents the phase difference between the leading timing of the ITOP signal and the BD signal).

The output of the leading edge detection circuit 2201 and a latch enable signal that is set by a not-shown controller (CPU) are transmitted to an AND gate 2205, and the output of the AND gate 2205 is transmitted to the latch enable terminal LE of the latch circuit 2203. During the period in which the latch enable signal is at level L, the count value of the up counter 2202 is not latched, even when the leading edge of the ITOP signal is detected.

The count data latched by the latch circuit 2203 are transmitted to the first comparator 2208, the second comparator 2215, the first subtraction circuit 2209 and the second subtraction circuit 2210.

The first and the second comparators 2208 and 2215 each compare the count value represented by the count data with a value that is set by the CPU, i.e., in this embodiment, for the first comparator 2208 T/4 is set and for the second comparator 2215 3T/4 is set, where T denotes a count value that represents a BD signal generation cycle (a well known numerical value that is uniformly determined by the processing speed of the apparatus and the image resolution). When the count value indicated by the count data is greater than the value T/4 set by the CPU, the first comparator 2208 outputs a signal at level H to a selector 2211 and an AND gate 2216 at the succeeding stage. When the count value is smaller than T/4, the first comparator 2208 outputs a signal at level L. When the count value indicated by the count data is smaller than the value 3T/4 set by the CPU, the second comparator 2215 outputs a signal at level H to the AND gate 2216 at the succeeding stage. When the count value is greater than 3T/4, the second comparator 2215 outputs a signal at level L.

Specifically, when a signal at level L is output by the first comparator 2208, it means that the count value represented by the count data is smaller than the value T/4 set by the CPU. Therefore, it is assumed that, as in (1) of FIG. 30, the leading edge of the ITOP signal during the first rotation of the drum is detected before a period that is ¼ of the BD signal generation cycle has not yet elapsed since the BD signal was generated. When a signal at level L is output by the second comparator 2215, it means that the count value represented by the count data is greater than the value 3T/4. Therefore, it is assumed that, as in (2) of FIG. 30, the leading edge of the ITOP signal during the first revolution of the drum is detected after a period that is ¾ of the BD generation cycle has elapsed since the BD signal was generated. Further, when a signal at level H is output by the first and the second comparators 2208 and 2215, it means that the count value represented by the count data is greater than the value T/4 and smaller than 3T/4. Therefore, it is assumed that, as in (3) of FIG. 30, the leading edge of the ITOP signal during the first rotation of the drum is detected during a period of from ¼ to ¾ of the BD signal generation cycle since the BD signal was generated.

The first subtraction circuit 2209 subtracts the count value represented by the count data from a value that is set by the CPU, i.e., in this embodiment, T/3, where T denotes a count value that represents a BD signal generation cycle (a well known numerical value that is uniformly determined by the processing speed of the apparatus and the image resolution). The results obtained by the subtraction are regarded as data that represent a delay time of T/3 (where T denotes a BD signal generation cycle) between the detection timing of the leading edge of the ITOP signal and the generation timing of the next BD signal. When, for example, the count value T of the BD signal generation cycle is "100" and the count value held by the up counter 2202 is "20", and when the leading edge of the ITOP signal is detected by the leading edge detection circuit 2201, the ITOP signal is delayed by a time equivalent to "13" (=T/3−20). As a result, the ITOP signal can be generated at a timing differing by the time T/3 (T is a BD generation cycle) from the generation timing for the next BD signal.

The second subtraction circuit 2210 subtracts the count value represented by the count data from a value that is set by the CPU, i.e., in this embodiment, 4T/3 (=T+T/3), where T denotes a count value that represents a BD signal generation cycle (a well known numerical value that is uniformly determined by the processing speed of the apparatus and the image resolution). The results obtained by the subtraction are regarded as data that represent a delay time of 4T/3 (where T denotes a BD signal generation cycle) between the detection timing for the leading edge of the ITOP signal and the generation timing for of the next BD signal. When, for example, the count value T of the BD signal generation cycle is "100" and the count value held by the up counter 2202 is "20", and when the leading edge of the ITOP signal is detected by the leading edge detection circuit 2201, the ITOP signal is delayed by a time equivalent to "53" (=4T/3−80). As a result, the ITOP signal can be generated at a timing differing by a time T/3 (T is a BD generation cycle) from the generation timing for the next BD signal.

The outputs of the first and the second subtraction circuits 2209 and 2210 are transmitted to a selector 2211. The selector 2211 employs the output of the first comparator 2208 to select one of the outputs of the first and the second subtraction circuits 2209 and 2210, and outputs the selected data to the data terminal D of a down counter 2212. Specifically, when the signal from the first comparator 2208 is at level L, the output of the first subtraction circuit 2209 is selected and transmitted to the data terminal D of the down counter 2212. When the signal from the first comparator 2208 is at level H, the output of the second subtraction circuit 2210 is selected and transmitted to the terminal D.

The output of the leading edge detection circuit 2201 is synchronized with the reference clock CLK by a flip-flop 2207, and they are transmitted together to the load terminal L of the down counter 2212. At the output timing for the flip-flop 2207, the down counter 2212 loads data from the selector 2211, and, in synchronization with the reference clock CLK, begins to decrement the count value indicated by the received data. When the count value reaches 0, the count end signal is output by the output terminal RC to a J-K flip-flop 2213 at the succeeding stage. The period during which the count value is decremented by the down counter 2212 corresponds to a delay time for the ITOP signal for adjusting the phases of the ITOP signal and the BD signal, which will be described later.

The J-K flip-flop 2213 is operated in synchronization with the reference clock CLK, and is reset at the output timing for the flip-flop 2207, i.e., at the leading edge of the ITOP signal. An ITOPDLY signal output by the output terminal Q is set to level L, and the level L state is maintained until it is reset at the output timing for the down counter 2212. That is, the ITOPDLY signal is maintained at level L until the delay time has elapsed following the leading edge of the ITOP signal.

In order to adjust the phases of the ITOP signal and the BD signal, the ITOP signal is delayed a predetermined period of time (in this embodiment, a time equivalent to three reference clocks CLK) by a 3CLK delay circuit 2206. The delayed ITOP signal and the ITOPDLY signal output by the J-K flip-flop 2213 are output via an AND gate 2214 to a selector 2217 at the succeeding stage.

Further, in order to adjust the phases of the BD signal and the ITOP signal, the ITOP signal is delayed by a 3CLK delay circuit 2206 a predetermined time (in this embodiment, three reference clocks CLK). The delayed ITOP signal is then transmitted to the other input terminal of the selector 2217. Upon receipt of the signal from the AND gate 2216, the selector 2217 selects the ITOP signal output by the AND gate 2214) or the ITOP signal output by the 3CLK delay circuit 2206.

That is, the output of the AND gate 2216 goes to level H only when the count value A held by the up counter 2202 falls to within the range represented by T/4<A<3T/4 (T is a count value for the BD signal generation cycles). In this case, as shown in (3) of FIG. 30, the leading edge of the ITOP signal for the first revolution of the photosensitive drum is detected during a period (i.e., within the safe area in FIG. 30) that is ¼ to ¾ of the BD signal generation cycle following the generation of the BD signal. Therefore, the selector 2217 selects and outputs an ITOP signal received from the 3CLK delay circuit 2206. In another case, i.e., when the count value A held by the up counter 2202 is A<T/4 or A>3T/4, the output of the AND gate 2216 goes to level L. Thus, as shown in (1) or (2) of FIG. 30, the leading edge of the ITOP signal for the first revolution of the photosensitive drum is detected outside a period (i.e., outside the safe area in FIG. 30) that is ¼ to ¾ of the BD signal generation cycle following the generation of the BD signal. Therefore, the selector 2217 selects and outputs an ITOP signal received from the AND gate 2214. And as a result, the generation time for the ITOP signal can be adjusted so that it is in the center of the BD signal generation cycle that is shifted at least a period T/4 (T is a BD signal generation cycle) away from the generation of the BD signal.

In this embodiment, for the first revolution of the photosensitive drum, the latch enable signal is set to level H by a CPU (not shown); the phase difference between the BD signal and the ITOP signal is detected; and a time to delay the ITOP signal is set so that the ITOP signal is generated in the center of the BD signal generation cycle. For the second and following revolutions, the latch enable signal is set to level L, and the delay time for the ITOP signal, which is set in the first revolution, is maintained. With this arrangement, the generation time for the ITOP signal is adjusted to the center of the BD signal generation cycle, and for the second and following revolutions, the phase difference between the ITOP signal and the BD signal is maintained. Therefore, fluctuation of the phase difference occurs only when there is a change in the rotation accuracy of the drum motor 2115.

In this embodiment, the detection timing for the leading edge of the ITOP signal is delayed up to a time that is shifted by a time T/4 (T is a BD signal generation cycle) away from the generation timing for the preceding or succeeding BD signal. However, such detection timing may be delayed up to a time shifted by a time T/3 to T/2 away from the generation timing for the preceding or succeeding BD signal, so that the same effects can be obtained. Specifically, even if the phase difference between the ITOP signal and the BD signal is the maximum time of T/n (T is a BD signal generation cycle and n is a two or greater integer), one of the times T/n to T/2 can be selected, and the detection timing for the leading edge of the ITOP signal can be delayed up to a time shifted a selected period from the generation timing of the preceding or succeeding BD signal. In this manner, the same effects can be obtained.

Furthermore, in this embodiment, when during the first revolution of the photosensitive drum the leading edge of the ITOP signal is detected before a time T/4 (T is a BD signal generation cycle) has elapses following the generation of the BD signal, based on the delay time that is set in accordance with the phase difference, the ITOP signal generated for each revolution is delayed until a time T/3 has elapsed following the generation of the preceding BD signal. However, the same effects can be obtained if the ITOP signal is delayed until a time T/3 has elapsed following the generation of the succeeding BD signal.

As described above, according to this embodiment, when, during the first revolution of the photosensitive drum, the leading edge of the ITOP signal is detected before a time T/4 (T is a BD signal generation cycle) has elapsed since the BD signal was generated, based on the delay time that is set in accordance with the phase difference, an ITOP signal generated for each rotation is delayed until the time T/3 has elapsed following the generation of the preceding BD signal. When the leading edge of the ITOP signal is detected after the time 3T/4 has elapsed since the BD signal was generated, based on the delay time that is set in accordance with the phase difference, the ITOP signal is delayed until after the time T/3 has elapsed following the generation of the succeeding BD signal. When the leading edge of the ITOP signal is detected during a period of T/4 to 3T/4 since the BD signal was generated, the ITOP signal generated for each rotation is not delayed. Therefore, the phase difference between the ITOP signal and the BD signal can be adjusted within a short period of time, and the occurrence of missing details in the field images that are formed can be minimized. Further, the position on the photosensitive drum that the laser beam first scans, in accordance with a BD signal that is first detected in the second and following revolutions of the photosensitive drum, can be superimposed on the position on the photosensitive drum that the laser beam first scans, in accordance with a BD signal that is first detected during the first rotation of the photosensitive drum.

Furthermore, in this embodiment, fluctuation of the generation timing of an ITOP signal during each revolution of the photosensitive drum can not occur near the time for the generation of a BD signal, but occurs at the time that is shifted away from the generation timing of a BD signal a period of T/4 to 3T/4. Therefore, the error allowance can be increased relative to the variance in the rotation of the photosensitive drum (i.e., a change due to uneven revolutions of the drum motor). Further, since the rotational precision of the mechanism for driving the drum motor and the photosensitive drum is increased, shifting can be reduced between the field image that is formed during the first rotation of the photosensitive drum and the field images formed during the following rotations, and image quality can be improved. In addition, the ITOP signal whose phase is adjusted is employed to initiate the writing of field images for individual colors on the photosensitive drum. Thus, the phase difference between the ITOP signal and the BD signal is constant for each revolution, and the writing start positions of the field images for the first to the n-th colors can be matched exactly. As a result, a high-quality color image with no color shifting can be formed.

Furthermore, control is exercised not only for the writing of the individual color field images on the photosensitive drum, based on the phase-adjusted ITOP signal, but also for the scanning of the original document using the optical system in the image scanner and for the reading of the original document using the CCD. Therefore, the original document reading positions for the first to the n-th colors can be exactly matched with the writing positions for field images on the photosensitive drum. Further, the difference in the MTF for individual color images can be reduced, and a color image can be formed for which there is no deterioration of the quality due to color blurring and erroneous edge determination.

As described above, the object of the present invention can also be implemented in the following manner: a storage medium in which software program code for implementing functions of the above embodiments is loaded into a computer (CPU or MPU) in an apparatus or in a system, and the program code is read by the computer in the system or the apparatus.

In this case, the software program code accomplishes the functions of the above described embodiment, and a storage medium on which such program code is recorded constitutes the present invention.

A storage medium for supplying such program code can be, for example, a floppy disk, a hard disk, an optical disk, a magneto-optical disk, a CD-ROM, a CD-R, a magnetic tape, a nonvolatile memory card, a ROM, or a EEPROM.

In addition, the present invention also includes not only a case wherein the functions in the previous embodiment can be performed when program code is read and executed by the computer, but also a case wherein, in accordance with an instruction in the program code, an OS (Operating System) running on the computer, or another application software program, interacts with the program code to accomplish the functions in the above embodiments.

Furthermore, the present invention includes a case wherein program code, read from a storage medium, is written in a memory that is mounted on a function expansion board inserted into a computer, or in a function expansion unit connected to a computer, and in consonance with a program code instruction, a CPU mounted on the function expansion board or the function expansion unit performs one part, or all of the actual processing in order to implement the functions in the above described embodiments.

Further, the present invention may be applied to a system constituted by a plurality of apparatuses or to a single apparatus. Further, the present invention can be applied for a case wherein a program is supplied to a system or an apparatus. In this case, a storage medium on which is stored a program represented by software that implements the present invention is loaded into the system or the apparatus, so that the system or the apparatus can accept the effects of the present invention.

In addition, the system or the apparatus may download a program, represented by software that implements the present invention, from a database on a network by using a communication program, so that the system or the apparatus can accept the effects of the present invention.

The present invention is not limited to the above embodiments, and can be variously modified without departing from the scope of the claims.

What is claimed is:

1. An image forming apparatus which performs image forming a plurality of times in synchronization with plural times of original reading, said image forming apparatus comprising:

an optical system movable to scan an original document in a sub-scan direction;

reading means for reading image data on the original document for each line through the scanning performed by said optical system;

a rotary polygon mirror for deflecting, in a main scan direction, a modulated light beam that is based on said image data for each line that is read by said reading means, so that an image holding member that is rotated in the sub-scan direction is scanned by the deflected light beam and a latent image is formed thereon;

first generation means for determining whether said light beam deflected by said rotary polygon mirror has scanned a predetermined location, and for generating a main scan start reference signal;

second generation means for generating a sub-scan start reference signal in synchronization with the rotation of said image holding member;

first control means for controlling said rotary polygon mirror and said rotary image holding member, so as to maintain a phase difference between said sub-scan start reference signal, produced by said second generation means, and said main scan start reference signal, produced by said first generation means, no matter how many times said rotary image holding member is rotated;

delay means for delaying said sub-scan start reference signal, so that the delayed sub-scan start reference signal generates substantially at the center of a generation period of said main scan start reference signal;

second control means for, in synchronization with said sub-scan start reference signal delayed by said delay means, starting to move said optical system;

third control means for, in synchronization with said main scan start reference signal generated by said first generation means after said delayed sub-scan start reference signal is generated, starting the reading of the original document by said reading means; and fourth control means for, in synchronization with said main scan start reference signal generated by said first generation means after said reading means has started to read the image data, starting to use said light beam to form a latent image.

2. An image forming apparatus according to claim 1, wherein said first control means drives said rotary polygon mirror and said image holding member, so that a cycle of said sub-scan start reference signal generated by said second generation means is an integer times a cycle of said main scan start reference signal generated by said first generation means.

3. An image forming apparatus according to claim 1, wherein said first control means drives said image holding member based on said main scan start reference signal generated by said first generation means.

4. An image forming apparatus according to claim 1, further comprising:
third generation means for generating a predetermined pulse signal,
wherein said first control means drives said rotary polygon mirror and said image holding member based on said predetermined pulse signal generated by said third generation means.

5. An image forming apparatus according to claim 1, wherein said first control means drives said rotary polygon mirror based on said sub-scan start reference signal generated by said second generation means.

6. A control method for an image forming apparatus which performs image forming a plurality of times in synchronization with plural times of original reading, said image forming apparatus including an optical system movable to scan an original document in a sub-scan direction, a reading device for reading image data for each line obtained through the scanning performed by said optical system, a rotary polygon mirror for deflecting, in a main scan direction, a light beam that is modulated based on said image data for each line that are read by said reading device, so that an image holding member that is rotated in the sub-scan direction is scanned by the deflected light beam and a latent image is formed thereon, said control method comprising:

a first drive step of driving said rotary polygon mirror and said rotary image holding member, so as to maintain a phase difference between a sub-scan start reference signal, produced in synchronization with the rotation of said image holding member, and a main scan start reference signal, produced upon detecting the scanning of a predetermined location by a light beam deflected by said rotary polygon mirror, no matter how many times said rotary image holding member is rotated;

a delay step of delaying said sub-scan start reference signal, so that the delayed sub-scan start reference signal generates substantially at the center of a generation period of said main scan start reference signal;

a second drive step of starting the movement of said optical system in synchronization with said delayed sub-scan start reference signal;

a reading step of reading the original document for each line by said reading device in synchronization with said main scan start reference signal after said sub-scan start reference signal is generated; and a forming step of forming a latent image using said light beam in synchronization with said main scan start reference signal after said reading device has started to read the image data.

7. An image forming apparatus which performs image forming a plurality of times in synchronization with plural times of original reading, and which forms a composite full-color image by superimposing a plurality of screen images, said image forming apparatus comprising:

an optical system movable to scan an original document in a sub-scan direction;

original reading means for employing a line sensor to scan the original document a plurality of times and for outputting image data acquired during each scan by moving said optical system;

light beam generation means for generating a light beam based on said image data output by said original reading means;

image holding member driving means for rotating an image holding member;

a rotary polygon mirror for, while rotating, reflecting said light beam emitted by said light beam generation means, so as to scan said image holding member that is rotated by said image holding member driving means;

main scan start signal generating means for generating a main scan start signal that indicates a rotation timing for said rotary polygon mirror;

sub-scan start signal generation means for generating a sub-scan start signal that indicates a rotation timing for said image holding member;

detection means for detecting a phase difference between said sub-scan start signal and said main scan start signal at a predetermined timing; and delay means for delaying said sub-scan start signal for a delay time according to the phase difference detected by said detection means, so that the delayed sub-scan start signal generates substantially at the center of a generation period of said main scan start signal, wherein said delay means delays each sub-scan signal generated every time said image holding member rotates after said predetermined timing, for a same time as said delay time, and wherein a start of the relative movement between said optical system and said original document is controlled in accordance with said sub-scan start signal delayed by said delay means, and a start of a main scan by said line sensor is controlled in accordance with said main scan start signal generated by said main scan start signal generation means after said delayed sub-scan start signal is generated.

8. An image forming apparatus according to claim 7, wherein said main scan start signal generation means generates an integer number of main scan start signals while said image holding member is rotated once by said image holding member drive means.

9. An image forming apparatus according to claim 7, wherein said predetermined timing is a generation timing for said sub-scan start signal for said sub-scan start signal generation means employed before a first image forming process.

10. An image forming apparatus according to claim 7, wherein said first timing is a generation timing for said sub-scan start signal for said sub-scan start signal generation means for an image forming process for a first color.

* * * * *

UNITED STATES PATENT AND TRADEMARK OFFICE
CERTIFICATE OF CORRECTION

PATENT NO. : 6,642,949 B2
DATED : November 4, 2003
INVENTOR(S) : Nozaki et al.

It is certified that error appears in the above-identified patent and that said Letters Patent is hereby corrected as shown below:

Column 3,
Line 56, "position 'B1" should read -- position "B"' --;
Line 66, "points 'B1'" should read -- points "B"' --.

Column 10,
Line 44, "stat" should read -- start --.

Column 16,
Line 56, "phased" should read -- phase --.

Column 24,
Line 62, "line scan line" should read -- scan line --.

Column 31,
Line 33, "flip-flip" should read -- flip flop --.

Column 52,
Line 4, "including" should read -- including: --.

Signed and Sealed this

Tenth Day of August, 2004

JON W. DUDAS
*Acting Director of the United States Patent and Trademark Office*